US008860835B2

(12) United States Patent
Kelly et al.

(10) Patent No.: US 8,860,835 B2
(45) Date of Patent: Oct. 14, 2014

(54) DECREASING IMAGE ACQUISITION TIME FOR COMPRESSIVE IMAGING DEVICES

(75) Inventors: Kevin F. Kelly, Houston, TX (US); Richard G. Baraniuk, Houston, TX (US); Lenore McMackin, Austin, TX (US); Robert F. Bridge, Austin, TX (US); Sujoy Chatterjee, Austin, TX (US); Tyler H. Weston, Austin, TX (US)

(73) Assignee: InView Technology Corporation, Austin, TX (US)

( * ) Notice: Subject to any disclaimer, the term of this patent is extended or adjusted under 35 U.S.C. 154(b) by 640 days.

(21) Appl. No.: 13/197,304

(22) Filed: Aug. 3, 2011

(65) Prior Publication Data

US 2012/0038786 A1 Feb. 16, 2012

Related U.S. Application Data

(63) Continuation-in-part of application No. 13/193,553, filed on Jul. 28, 2011, now Pat. No. 8,570,405, and a continuation-in-part of application No. 13/193,556, filed on Jul. 28, 2011, now Pat. No. 8,570,406.

(60) Provisional application No. 61/372,826, filed on Aug. 11, 2010.

(51) Int. Cl.
H04N 5/228 (2006.01)
G02B 26/08 (2006.01)
H04N 5/335 (2011.01)
H04N 5/341 (2011.01)

(52) U.S. Cl.
CPC ............ *G02B 26/0833* (2013.01); *H04N 5/335* (2013.01); *H04N 5/3415* (2013.01)
USPC ....................................... 348/222.1; 348/262

(58) Field of Classification Search
CPC ............... H04N 5/335; H04N 5/232

USPC ............................................. 348/222.1, 262
See application file for complete search history.

(56) References Cited

U.S. PATENT DOCUMENTS 5,546,128 A 8/1996 Nakagakiuchi et al.
2003/0029989 A1* 2/2003 Stettner et al. ............. 250/208.1
(Continued)

FOREIGN PATENT DOCUMENTS

WO 2010/042486 4/2010

OTHER PUBLICATIONS

International Search Report and Written Opinion in Application No. PCT/US2011/046940 dated Oct. 6, 2011, 11 pages.

(Continued)

*Primary Examiner* — Nelseon D. Hernández Hernández
(74) *Attorney, Agent, or Firm* — Meyertons Hood Kivlin Kowert & Goetzel, P.C.; Jeffrey C. Hood; Mark K. Brightwell

(57) ABSTRACT

Mechanisms for increasing the rate of acquisition of compressed/encoded image representations are disclosed. An imaging system may deliver subsets of a modulated light stream onto respective light sensing devices. The light sensing devices may be sampled in parallel. Samples from each light sensing device may be used to construct a respective sub-image of a final image. The parallelism allows compressed images to be acquired at a higher rate. The number of light sensing devices and/or the number of pixels per image may be selected to achieve a target image acquisition rate. In another embodiment, spatial portions of the incident light stream are separated and delivered to separate light modulators. In yet another embodiment, the incident light stream is split into a plurality of beams, each of which retains the image present in the incident light stream and is delivered to a separate light modulator.

36 Claims, 31 Drawing Sheets

(56) References Cited

U.S. PATENT DOCUMENTS

| | | | |
|---|---|---|---|
| 2006/0145077 A1* | 7/2006 | Kim | 250/339.02 |
| 2006/0239336 A1* | 10/2006 | Baraniuk et al. | 375/216 |
| 2010/0013969 A1* | 1/2010 | Ui | 348/294 |
| 2010/0053352 A1 | 3/2010 | Dekel | |
| 2010/0155870 A1* | 6/2010 | Tay et al. | 257/432 |
| 2010/0283881 A1* | 11/2010 | Araki et al. | 348/308 |
| 2011/0062335 A1* | 3/2011 | Franklin | 250/338.1 |

OTHER PUBLICATIONS

Amit Ashok and Mark A. Neifeld, "Compressive Light Field Imaging," Proceedings of SPIE, vol. 7690, Apr. 6, 2010, XP040522839, pp. 76900Q-1-76900Q-12.

Muise, et al., "Compressive and Adaptive Imaging for Target Exploitation," Proceedings of SPIE, vol. 7442, Dec. 31, 2009, XP040S01249, pp. 74420A-1-74420A-15.

Babacan, et al., "Compressive sensing of light fields," 2009 16th IEEE International Conference on Image Processing (ICIP), Nov. 7, 2009, XP031629126, pp. 2337-2340.

Robucci, et al., "Compressive Sensing on a CMOS Separable-Transform Image Sensor," Proceedings of the IEEE, vol. 98, No. 6, Jun. 2010, XP011307931, pp. 1089-1101.

Stenner, et al., "Compressive Measurement for Target Tracking in Persistent, Pervasive Surveillance Applications," Proceedings of SPIE, vol. 7468, XP040501968, Dec. 31, 2009, pp. 746808-1-746808-8.

U.S. Appl. No. 60/673,364, entitled "Method and Apparatus for Optical Image Compression", by Richard Baraniuk, et al., filed Apr. 21, 2005.

Takhar, et al., "A New Compressive Imaging Camera Architecture using Optical-Domain Compression," Proceedings of IS&T/SPIE Computational Imaging IV, Jan. 2006, 10 pages.

David L. Donoho, "Compressed Sensing," Department of Statistics, Stanford University, Sep. 14, 2004, 34 pages.

Justin Romberg and Michael Wakin, "Compressed Sensing: A Tutorial," IEEE Statistical Signal Processing Workshop, Madison, Wisconsin, Aug. 26, 2007, available at http://users.ece.gatech.edu/justin/ssp2007, 128 pages.

* cited by examiner

2300

```
modulate an incident stream of light with a sequence of spatial patterns in order
to produce a modulated light stream, where said modulating is performed by an
array of light modulating elements    2310
```

```
deliver light from each of a plurality of spatial subsets of the modulated light
stream onto a respective one of a plurality of light sensing devices, where the
spatial subsets of the modulated light stream are produced by respective
subsets of the array of light modulating elements, where each subset of the
array of light modulating elements produces the respective spatial subset of the
modulated light stream by modulating a respective spatial subset of the incident
light stream    2320
```

```
generate electrical signals, where each of the electrical signals is generated by a
respective one of the light sensing devices, where each of the electrical signals
represents intensity of a respective one of the spatial subsets of the modulated
light stream as a function of time    2330
```

```
acquire samples of the electrical signals, where the samples include sample
subsets that correspond respectively to the electrical signals, where each
sample subset includes a plurality of samples of the respective electrical signal
2340
```

Fig. 23

| FPA size | | | # of DMD mirrors focused on each FPA element | In X dimension, number of mirrors focused on each FPA pixel | Required DMD size | | | Resultant frame rate | | Resultant frame rate | | Resultant frame rate | |
|---|---|---|---|---|---|---|---|---|---|---|---|---|---|
| Kx | Ky | K | | | Nx | Ny | N | CS sample % = 100% FPA group rate = 120 | | CS sample % = 100% FPA group rate = 200 | | CS sample % = 75% FPA group rate = 120 | |
| 32 | 32 | 1,024 | 4 | 2 | 64 | 64 | 4,096 | 30.0 | FPS | 50.0 | FPS | 40.0 | FPS |
| | | | 9 | 3 | 96 | 96 | 9,216 | 13.3 | FPS | 22.2 | FPS | 17.8 | FPS |
| | | | 16 | 4 | 128 | 128 | 16,384 | 7.5 | FPS | 12.5 | FPS | 10.0 | FPS |
| | | | 25 | 5 | 160 | 160 | 25,600 | 4.8 | FPS | 8.0 | FPS | 6.4 | FPS |
| | | | 36 | 6 | 192 | 192 | 36,864 | 3.3 | FPS | 5.6 | FPS | 4.4 | FPS |
| 64 | 64 | 4,096 | 4 | 2 | 128 | 128 | 16,384 | 30.0 | FPS | 50.0 | FPS | 40.0 | FPS |
| | | | 9 | 3 | 192 | 576 | 110,592 | 13.3 | FPS | 22.2 | FPS | 17.8 | FPS |
| | | | 16 | 4 | 256 | 1024 | 262,144 | 7.5 | FPS | 12.5 | FPS | 10.0 | FPS |
| | | | 25 | 5 | 320 | 1600 | 512,000 | 4.8 | FPS | 8.0 | FPS | 6.4 | FPS |
| | | | 36 | 6 | 384 | 2304 | 884,736 | 3.3 | FPS | 5.6 | FPS | 4.4 | FPS |
| 256 | 256 | 65,536 | 4 | 2 | 512 | 1024 | 524,288 | 30.0 | FPS | 50.0 | FPS | 40.0 | FPS |
| | | | 9 | 3 | 768 | 2304 | 1,769,472 | 13.3 | FPS | 22.2 | FPS | 17.8 | FPS |

```
receive information specifying a target effective rate R_t of acquisition of N-pixel
images for the compressive-imaging device, where N is a number of light
modulating elements in a light modulation unit to be included in the
compressive-imaging device     2710
```

↓

```
determine a value for each of variables R_P and L such that R_P/f(N/L) is greater
than or equal to the target effective rate R_t, where R_P is a maximum pattern
modulation rate of the light modulation unit, where L is a number of light sensing
devices to be included in the compressive-imaging device, where the function f
is a function that maps a positive integer value v to a corresponding number f(v),
where f(v) is greater than or equal to a minimum number of compressive
sensing samples required to reconstruct a v-pixel image    2720
```

↓

```
store the determined values of the variables R_P and L in a memory   2730
```

```
receive information specifying a target effective rate R_t of acquisition of n-pixel
images for a compressive-imaging device, where n is less than or equal to a
number N of light modulating elements in a light modulation unit to be included
in the compressive-imaging device     2760
```

↓

```
determine a value for each of variables R_P, L and n such that R_P/f(n/L) is greater
than or equal to the target effective rate R_t, where R_P is a maximum pattern
modulation rate of the light modulation unit, where L is a number of light sensing
devices to be included in the compressive-imaging device, where f is a function
that maps a positive integer value v to a corresponding number f(v), where f(v) is
greater than or equal to a minimum number of compressive sensing samples
required to reconstruct a v-pixel image    2770
```

↓

```
store the determined values of the variables R_P, L and n in a memory   2780
```

Fig. 27B

2800 receive information specifying a target effective rate $R_t$ of acquisition of N-pixel images for the compressive-imaging device, where N is a number of light modulating elements in a light modulation unit to be included in the compressive-imaging device   2810 determine a value for each of variables $R_G$ and L such that $R_G/f(N/L)$ is greater than or equal to $R_t$, where $R_G$ is a maximum number of sample groups per second to be acquired from an array of L light sensing devices to be included in the compressive-imaging device, where each sample group by definition includes one sample from each of the L light sensing devices, where the function f is a function that maps a positive integer value v to a corresponding number f(v), where f(v) is greater than or equal to a minimum number of compressive sensing samples required to reconstruct a v-pixel image   2820 store the determined values of the variables $R_G$ and L in a memory   2830

Fig. 28A

2850 receive information specifying a target effective rate $R_t$ of acquisition of n-pixel images for a compressive-imaging device, where n is less than or equal to N, where N is a number of light modulating elements in a light modulation unit to be included in the compressive-imaging device   2860 determine a value for each of variables $R_G$, L and n such that $R_G/f(n/L)$ is greater than or equal to $R_t$, where $R_G$ is a maximum number of sample groups per second to be acquired from an array of L light sensing devices to be included in the compressive-imaging device, where each sample group by definition includes a sample from each of the L light sensing devices, where f is a function that maps any positive integer value v to a corresponding number f(v), where f(v) is greater than or equal to a minimum number of compressive sensing samples required to reconstruct a v-pixel image   2870 store the determined values of the variables $R_G$, L and n in a memory   2880

Fig. 28B

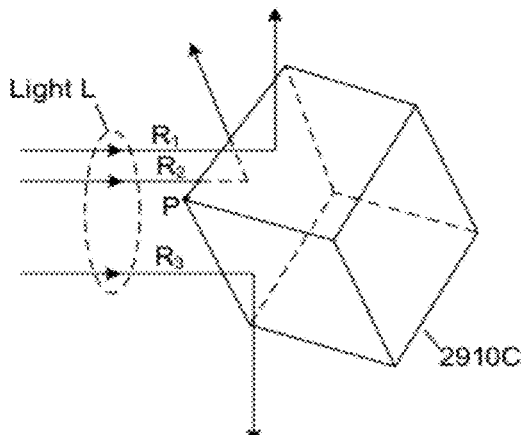
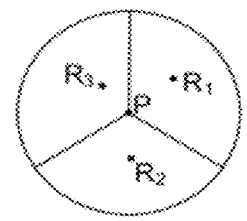

> separate an incident light stream into a plurality of light substreams, where the light substreams correspond respectively to non-overlapping regions of the incident light stream   3310

> modulate the light substreams in order to produce respective modulated light substreams, where each of the light substreams is modulated by a respective one of a plurality of light modulation units, where the action of modulating the light substreams includes modulating each of the light substreams with a respective sequence of spatial patterns in order to produce the respective modulated light substream   3320

> direct light from each of the modulated light substreams onto a respective one of a plurality of light sensing devices   3330

> generate electrical signals, where each of the electrical signals is generated by a respective one of the light sensing devices, where the electrical signal generated by each light sensing device represents intensity of the respective modulated light stream as a function of time   3340

> acquire from each of the light sensing devices a respective sequence of samples of the respective electrical signal, wherein each sample sequence is usable to construct a respective sub-image representing a respective one of the regions of the incident light stream   3350

Fig. 33

DECREASING IMAGE ACQUISITION TIME FOR COMPRESSIVE IMAGING DEVICES

RELATED APPLICATION DATA

This application claims the benefit of priority to U.S. Provisional Application No. 61/372,826, filed on Aug. 11, 2010, entitled "Compressive Sensing Systems and Methods", invented by Richard Baraniuk, Gary Woods, Kevin Kelly, Robert Bridge, Sujoy Chatterjee and Lenore McMackin, which is hereby incorporated by reference in its entirety as though fully and completely set forth herein.

This application is a continuation in part of U.S. application Ser. No. 13/193,553, filed on Jul. 28, 2011 now U.S Pat. No. 8,570,405, invented by Richard Baraniuk, Kevin Kelly, Robert Bridge, Sujoy Chatterjee and Lenore McMackin, titled "Determining Light Level Variation in Compressive Imaging by Injecting Calibration Patterns into Pattern Sequence", which is hereby incorporated by reference in its entirety as though fully and completely set forth herein.

This application is also a continuation in part of U.S. application Ser. No. 13/193,556, filed on Jul. 28, 2011 now U.S Pat. No. 8,570,406, invented by Richard Baraniuk, Kevin Kelly, Robert Bridge, Sujoy Chatterjee and Lenore McMackin, titled "Low-Pass Filtering of Compressive Imaging Measurements to Infer Light Level Variation", which is hereby incorporated by reference in its entirety as though fully and completely set forth herein.

This invention was made with Government support under Contract No. 2009*0674524*000 awarded by the Central Intelligence Agency. The Government has certain rights in the invention.

FIELD OF THE INVENTION

The present invention relates to the field of compressive sensing, and more particularly to systems and methods for decreasing image acquisition time in compressive imaging devices.

DESCRIPTION OF THE RELATED ART

According to Nyquist theory, a signal $x(t)$ whose signal energy is supported on the frequency interval $[-B,B]$ may be reconstructed from samples $\{x(nT)\}$ of the signal $x(t)$, provided the rate $f_S=1/T_S$ at which the samples are captured is sufficiently high, i.e., provided that $f_S$ is greater than $2B$. Similarly, for a signal whose signal energy is supported on the frequency interval $[A,B]$, the signal may be reconstructed from samples captured with sample rate greater than $B-A$. A fundamental problem with any attempt to capture a signal $x(t)$ according to Nyquist theory is the large number of samples that are generated, especially when B (or B-A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image $I(x,y)$ that depends on spatial variables x and y, the image may be reconstructed from samples of the image, provided the samples are captured with sufficiently high spatial density. For example, given samples $\{I(n\Delta x, m\Delta y)\}$ captured along a rectangular grid, the horizontal and vertical densities $1/\Delta x$ and $1/\Delta y$ should be respectively greater than $2B_x$ and $2B_y$, where $B_x$ and $B_y$ are the highest x and y spatial frequencies occurring in the image $I(x,y)$. The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts are the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors $\{R(i)\}$ in the N-dimensional space, where M is larger than K but still much smaller than N. Each projection gives a corresponding real number s(i), e.g., according to the expression $$s(i)=<v,R(i)>,$$

where the notation $<v,R(i)>$ represents the inner product (or dot product) of the vector v and the vector R(i). Thus, the series of M projections gives a vector U including M real numbers. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that $\Phi Tx=U$, where $\Phi$ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from the micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {s(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the discussion of this paragraph that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

One of the challenges in compressive imaging is acquiring the samples of the signal S(t) fast enough to compete with FPA-based cameras that can operate at video rates. (FPA is an acronym for "focal plane array". A focal plane array is an image-sensing device that includes an array of light-sensing elements, typically rectangular, and typically positioned at the focal plane or image plane of an optical system.) For at least some values of N, an N-element FPA can acquire N-pixels images at video rates. If N is large, it may be difficult for the above-described compressive-imaging camera to acquire samples of the signal S(t) at a rate sufficiently high to enable video capture, i.e., the capture of encoded representations of N-pixel images at video rates. Thus, there exists a need for mechanisms capable of increasing the rate at which compressive-imaging devices can acquire encoded images.

SUMMARY

In one set of embodiments, an imaging system may include a light modulation unit, two or more light sensing devices, an optical subsystem and a sampling subsystem.

The light modulation unit is configured to modulate an incident stream of light with a sequence of spatial patterns in order to produce a modulated light stream. The light modulation unit includes an array of light modulating elements.

The optical subsystem is configured to deliver light from spatial subsets (regions) of the modulated light stream onto respective ones of the light sensing devices. In other words, each light sensing device receives light primarily from the respective spatial subset of the modulated light stream. The spatial subsets of the modulated light stream are produced by respective subsets of the array of light modulating elements. Each subset of the array of light modulating elements produces the respective spatial subset of the modulated light stream by modulating a respective spatial subset of the incident light stream. The light sensing devices are configured to generate respective electrical signals, where each of the electrical signals represents intensity of the respective spatial subset of the modulated light stream as a function of time.

The sampling subsystem is configured to acquire samples of the electrical signals, preferably in parallel. The samples include sample subsets that correspond respectively to the electrical signals. In other words, each sample subset comprises samples of the respective electrical signal. The sample subsets are usable to reconstruct respective sub-images of a final image that represents the incident light stream. Because the sub-images are smaller than the final image, the number of samples of each electrical signal needed to reconstruct the respective sub-image is significantly smaller than the number of samples a single-pixel camera would have to acquire to reconstruct the final image. Thus, the time required to acquire the compressed data-equivalent of the final image is significantly reduced. In video applications, this means that the imaging system may acquire compressed images at a higher frame rate than a single-pixel camera.

In another set of embodiments, an imaging system may include a pre-modulation optical subsystem, a plurality of light modulation units, a plurality of light sensing devices, and a plurality of analog-to-digital converters (ADCs).

The pre-modulation optical subsystem is configured to receive an incident light stream and separate the incident light stream into a plurality of light substreams. The light substreams correspond respectively to non-overlapping regions of the incident light stream. Thus, the incident light stream is divided spatially.

The light modulation units are configured to respectively modulate the light substreams in order to generate respective modulated light substreams. Each of the light modulation units is configured to modulate the respective light substream with a respective sequence of spatial patterns in order to produce the respective modulated light substream. Each of the light modulation units includes a respective array of light modulating elements.

The light sensing devices are configured to respectively receive the modulated light substreams and generate respective electrical signals. The electrical signal generated by each light sensing device represents intensity of the respective modulated light substream as a function of time.

The ADCs are configured to sample the electrical signals, preferably in parallel. Each ADC is configured to configured to capture a sequence of samples of the electrical signal generated by a respective one of the light sensing devices. The sample sequence captured by each ADC is usable to construct a respective sub-image representing a respective one of the regions of the incident light stream. The sub-image may be joined together to form the final image.

The imaging system may also include a plurality of post-modulation optical subsystems configured to direct light from respective ones of the modulated light substreams onto respective ones of the light sensing devices.

Various additional embodiments are described in U.S. Provisional Application No. 61/372,826, which is hereby incorporated by reference in its entirety as though fully and completely set forth herein.

BRIEF DESCRIPTION OF THE DRAWINGS

A better understanding of the present invention can be obtained when the following detailed description of the preferred embodiments is considered in conjunction with the following drawings.

FIG. 23 illustrates an embodiment of a method for parallelizing the acquisition of a compressed image representation.

FIG. 26B is a table illustrating the number of image frames per second attainable from the system 2500 for different values of group rate, and number of light modulating elements (e.g., micromirrors) per FPA element. FPA is an acronym for focal plane array.

FIGS. 27A and 27B illustrate embodiments of methods for designing a compressive-imaging device in order meet a target effective rate of image acquisition, especially for compressive-imaging devices that are to include a dedicated A/D converter per light sensing device.

FIGS. 28A and 28B illustrate embodiments of methods for designing a compressive-imaging device in order meet a target effective rate of image acquisition, especially for compressive-imaging device that are to include a focal plane array.

FIG. 32A shows an embodiment of an object 2910C having reflective faces (or surfaces) that meet at a point P, being used to separate the incident light stream into three sub-streams.

FIG. 32B shows the pattern of separation as seen along a central axis of the incident light beam, according to one embodiment.

FIG. 33 shows one embodiment of a method 3300 for parallelizing the acquisition of compressive-sensing samples for an image.

Figure 1:
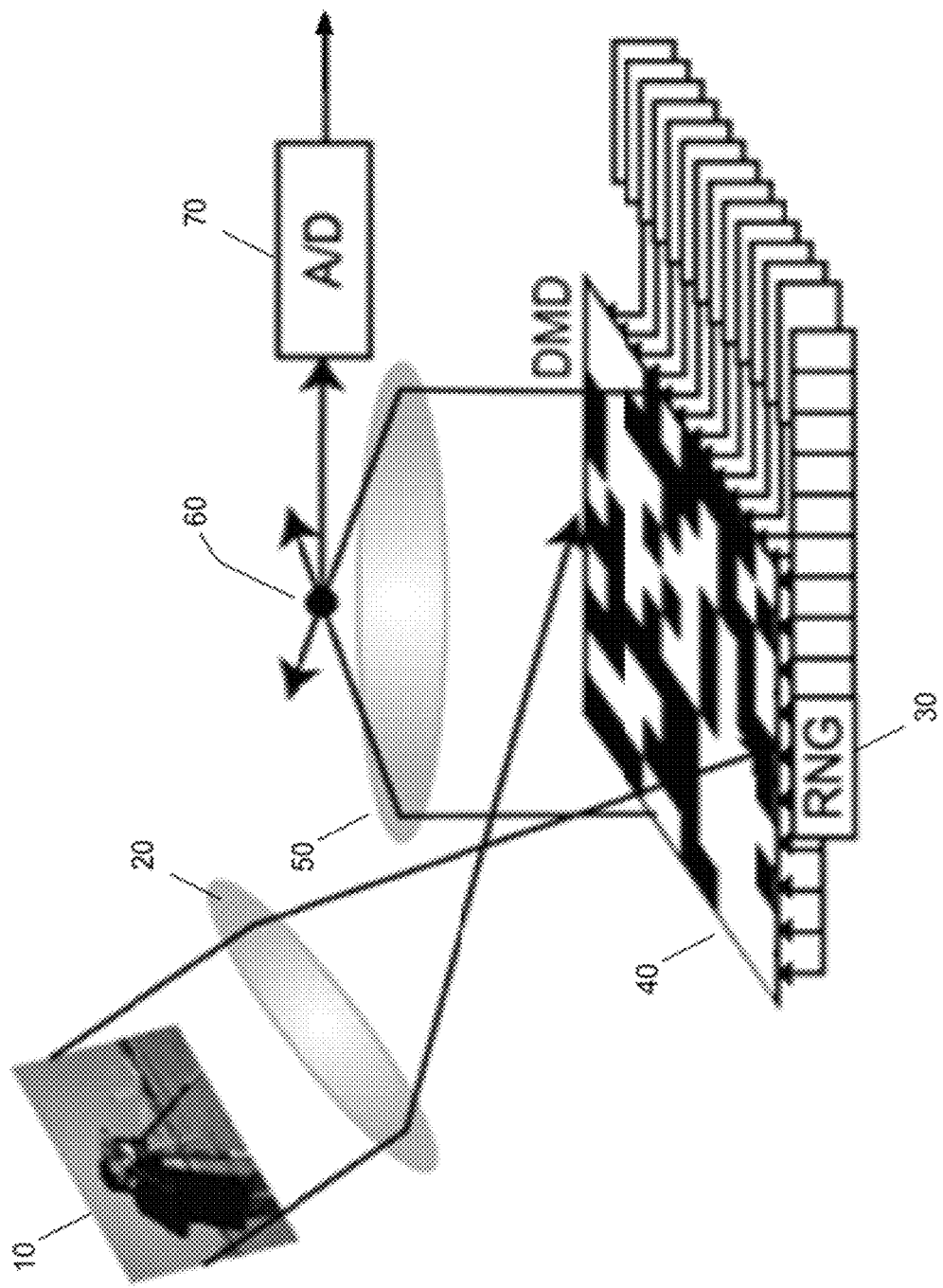
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patent applications provide teachings regarding compressive sensing and compressive imaging:

U.S. Provisional Application No. 60/673,364 entitled "Method and Apparatus for Optical Image Compression," filed on Apr. 21, 2005;

U.S. Provisional Application No. 60/679,237 entitled "Method and Apparatus for Reconstructing Data from Multiple Sources," filed on May 10, 2005;

U.S. Provisional Application No. 60/729,983 entitled "Random Filters for Compressive Sampling and Reconstruction," filed on Oct. 25, 2005;

U.S. Provisional Application No. 60/732,374 entitled "Method and Apparatus for Compressive Sensing for Analog-to-Information Conversion," filed on Nov. 1, 2005;

U.S. Provisional Application No. 60/735,616 entitled "Method and Apparatus for Distributed Compressed Sensing," filed on Nov. 10, 2005;

U.S. Provisional Application No. 60/759,394 entitled "Sudocodes: Efficient Compressive Sampling Algorithms for Sparse Signals," filed on Jan. 16, 2006;

U.S. patent application Ser. No. 11/379,688 entitled "Method and Apparatus for Compressive Imaging Device", filed on Apr. 21, 2006; and U.S. patent application Ser. No. 12/791,171 entitled "Method and Apparatus for Compressive Imaging Device", filed on Jun. 1, 2010.

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
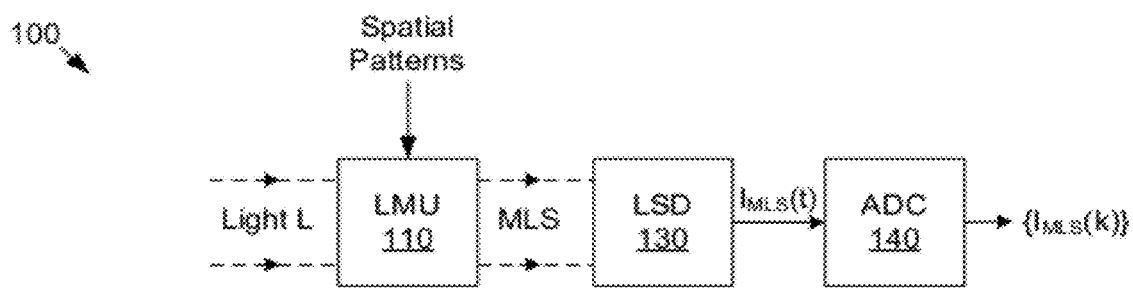
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

The light sensing device 130 is configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers, e.g., transimpedance amplifiers (TIAs), to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence) based on any construction algorithm known in the field of compressive sensing. (For video sequence construction, the samples may be partitioned into contiguous subsets, and then the subsets may be processed to construct corresponding images.)

In some embodiments, the samples $\{I_{MLS}(k)\}$ may be used for some purpose other than, or in addition to, image (or video) construction. For example, system 100 (or some other system) may operate on the samples $\{I_{MLS}(k)\}$ to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$, or parameters derived from that sample set, being similar to one of a collection of stored sample sets (or parameter sets).

In some embodiments, the light sensing device 130 may include an amplifier, e.g., a transimpedance amplifier (TIA), to amplify the analog electrical signal prior to A/D conversion.

In some embodiments, the light sensing device 130 includes exactly one light sensing element. For example, the single light sensing element may be a photodiode.

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing element 130 may include a bi-cell photodiode.) Each light sensing element generates a corresponding signal representing intensity of the corresponding spatial portion as a function of time. Each signal may be digitized (e.g., by a corresponding ADC) to obtain a corresponding sequence of samples. Each sequence of samples may be processed to recover a corresponding sub-image. The sub-images may be joined together to form a whole image.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity configuring any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity configuring any of these embodiments may use newer light sensing technologies (e.g., based on new materials or combinations of materials) that are not yet mature enough to be manufactured into focal plane arrays (FPA) with large pixel count. For example, new detector materials such as superlattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In some embodiments, a filter may be placed in front of the light sensing device 130 to restrict the modulated light stream to a specific range of wavelengths or polarization. Thus, the signal $I_{MLS}(t)$ generated by the light sensing device 130 may be representative of the intensity of the restricted light stream.

For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
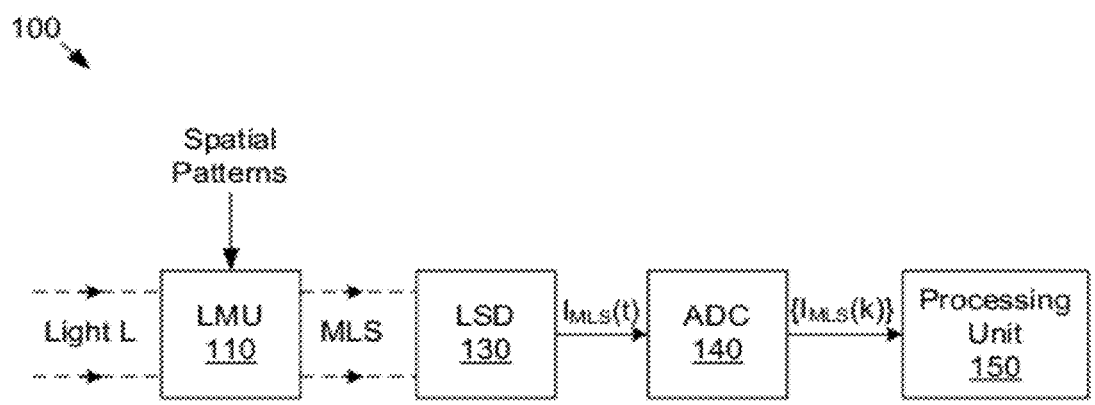
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected microprocessors), a programmable hardware element such as a field-programmable gate array (FPGA), an application specific integrated circuit (ASIC), or any combination such elements. The processing unit 150 may be configured to perform one or more functions such as image/video construction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video construction algorithm. In one embodiment, system 100 is configured to transmit the samples $\{I_{MLS}(k)\}$ to some other system through a communication channel. (In embodiments where the spatial patterns are randomly-generated, system 100 may also transmit the random seed(s) used to generate the spatial patterns.) That other system may operate on the samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video construction. System 100 may allow a user to choose a desired algorithm and/or a desired transformation for performing the image/video construction.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) construction in user-acceptable time. In this embodiment, the system 100 may store and/or transmit the samples $\{I_{MLS}(k)\}$ so that another agent, more plentifully endowed with processing resources, may perform the image/video construction based on the samples.

Figure 2C:
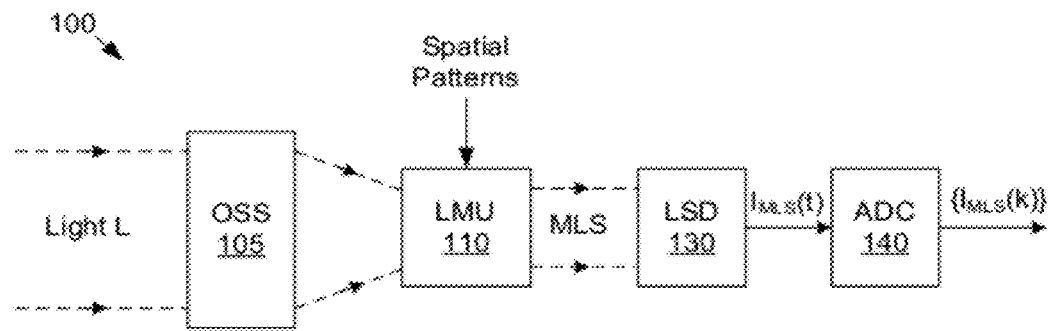
FIG. 2C illustrates an embodiment of system 100 that includes an optical subsystem 105 to focus received light L onto the light modulation unit 110.
Figure 2D:
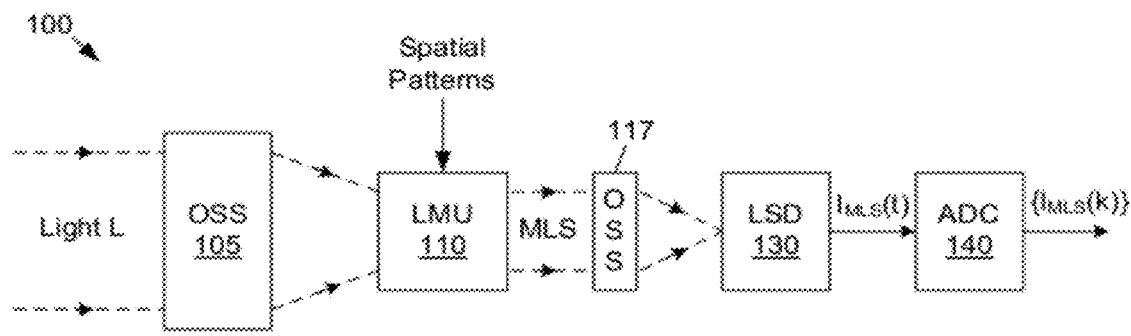
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense, at any given time, the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
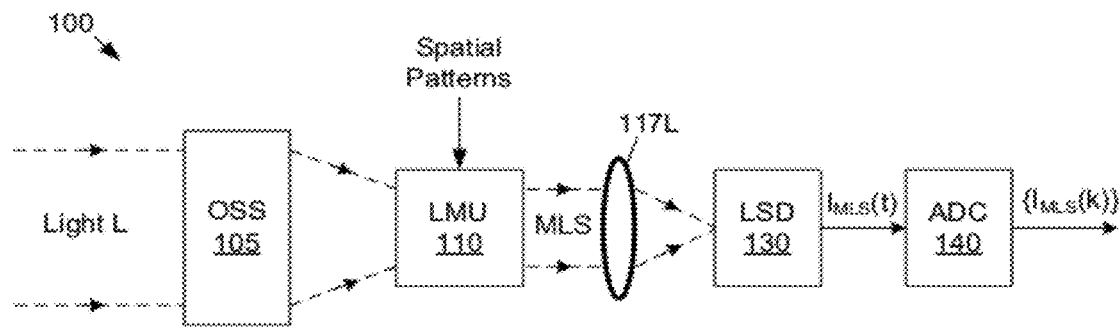
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to construct a corresponding image for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, wherein each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to construct a corresponding image for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to construct a corresponding image for the corresponding wavelength range.

Figure 2F:
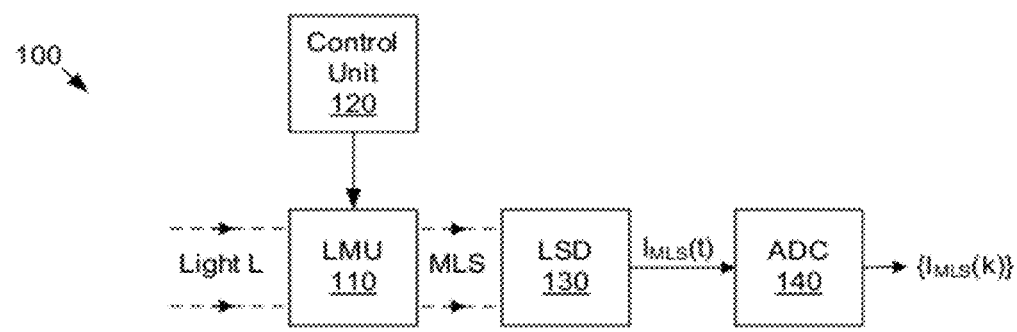
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiments, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying constructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$,} and B={$b_i$} in the same N-dimensional space, A and B are said to be incoherent if their coherence measure $\mu(A,B)$ is sufficiently small. The coherence measure is defined as:

$$\mu(A, B) = \max_{i,j} |\langle a_i, b_j \rangle|.$$

The number of compressive sensing measurements (i.e., samples of the sequence {$I_{MLS}(k)$} needed to construct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1−p of giving the value zero. (For example, in one embodiment p=1/2.) In some embodiments, the elements of each pattern are generated by a series of draws from a Gaussian random variable.)

The system 100 may be configured to operate in a compressive fashion, where the number of the samples {$I_{MLS}(k)$} captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different application domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with a microscope, a telescope, a robot, a security system, a surveillance system, a fire sensor, a node in a distributed sensor network, etc.

In some embodiments, system 100 is configured as a spectrometer.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a video sequence) so that the image (or video sequence) can be displayed on a display surface (e.g., screen).

Figure 3A:
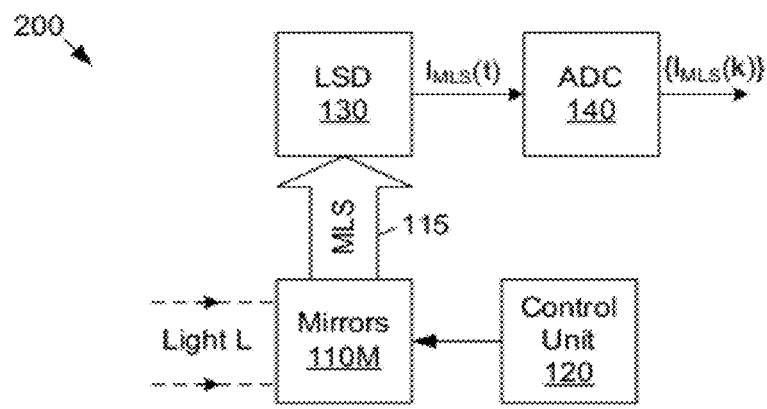
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
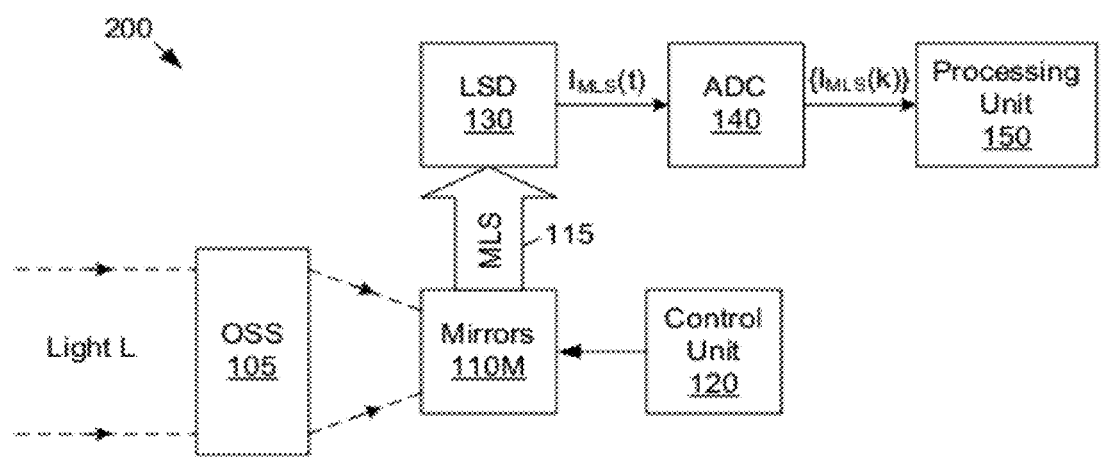
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
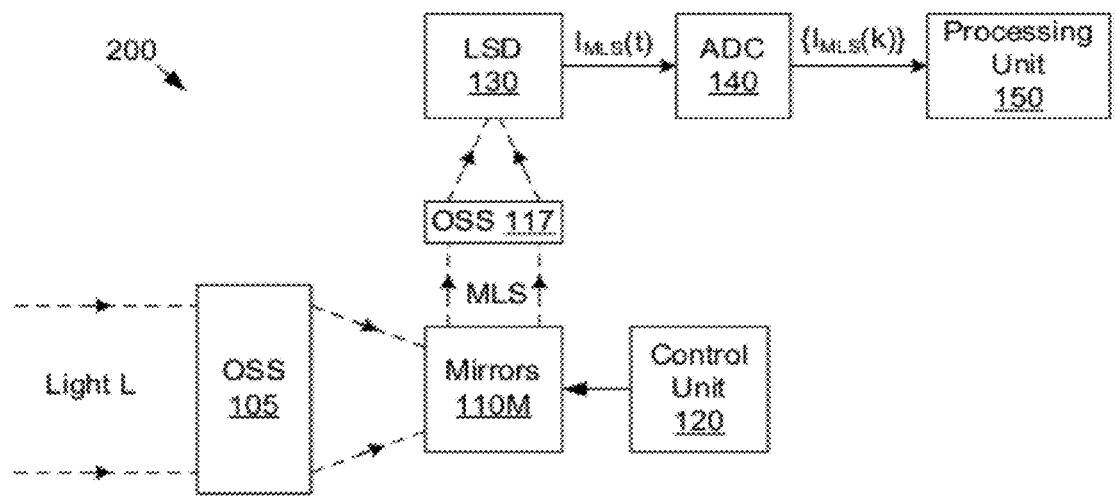
FIG. 4 shows an embodiment of system 200 that includes the optical subsystem 117 to direct or focus or concentrate the modulated light stream MLS onto the light sensing device 130.
Figure 5A:
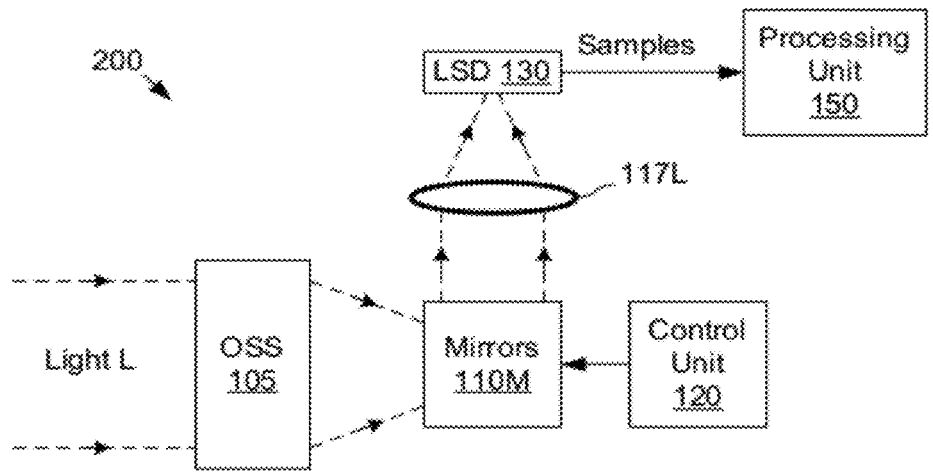
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
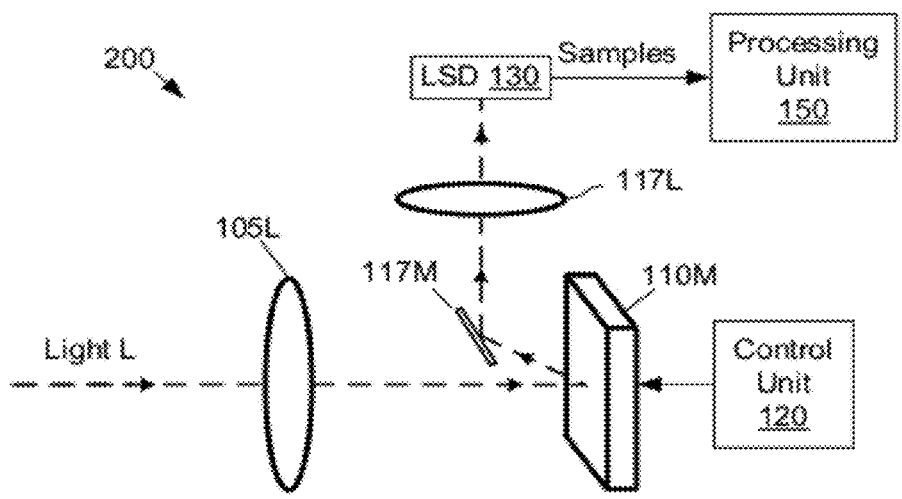
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
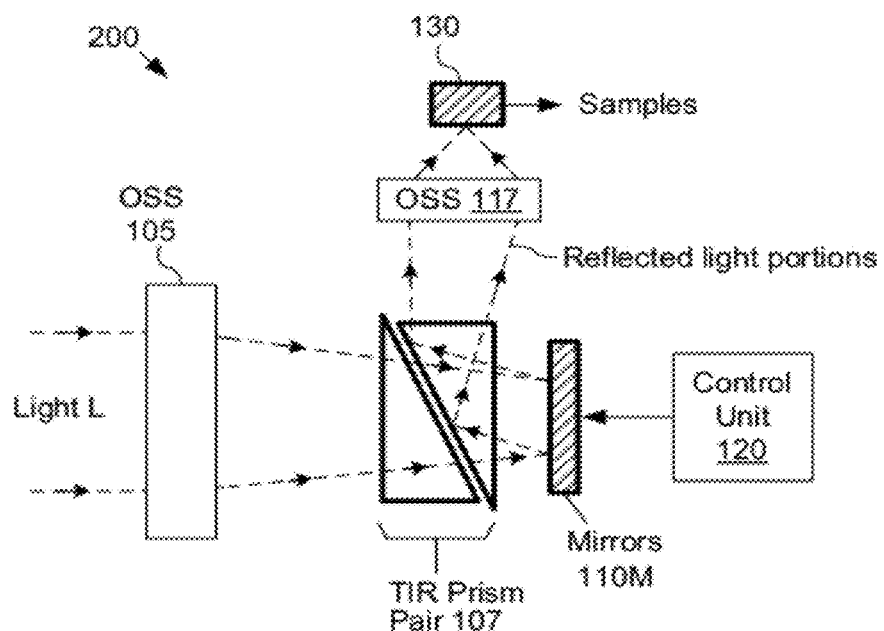
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Figure 6:
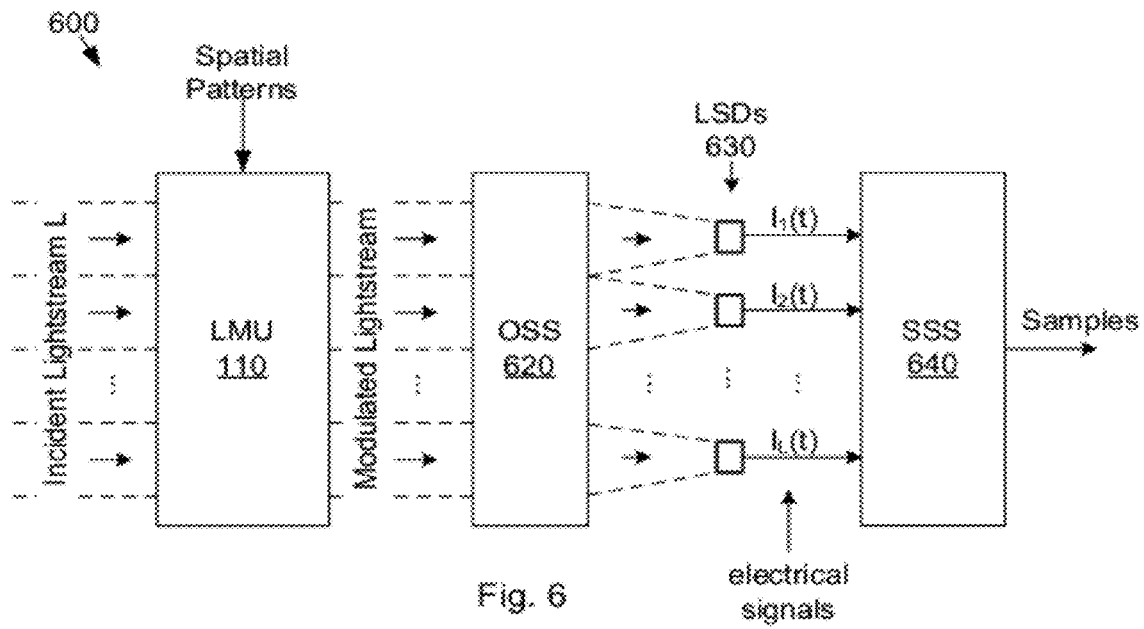
FIG. 6 shows one embodiment of system 600 for parallelizing the acquisition of a compressed representation of an image.

Delivering Spatial Subsets of Modulated Light Stream to Two or More Light Sensing Elements, to Decrease Image Acquisition Time In one set of embodiments, a system 600 for operating on light may be configured as shown in FIG. 6. System 600 includes the light modulation unit 110 as described above, and also includes an optical subsystem 620, a plurality of light sensing devices (collectively referenced by item number 630), and a sampling subsystem 640. (Furthermore, any subset of the features, embodiments and elements discussed above with respect to system 100 and system realization 200 may be incorporated into system 600.)

As described above, the light modulation unit 110 is configured to modulate an incident stream of light L with a sequence of spatial patterns in order to produce a modulated light stream MLS. The light modulation unit includes an array of light modulating elements. The light modulation unit 110 may be realized in any of the various ways described above in connection with system 100 and system realization 200. (In particular, the fact that FIG. 6 shows light entering at the left side of the LMU and exiting the right side is not meant to limit the LMU to transmissive embodiments.)

The optical subsystem 620 is configured to deliver light from each of a plurality of spatial subsets of the modulated light stream onto a respective one of the light sensing devices 630. (The linear arrangement of the light sensing devices in FIG. 6 is not meant to be limiting. Various other arrangements, especially two-dimensional arrangements, are possible.) (The fact that the light sensing devices in FIG. 6 are shown as being separated from each other is not meant to be limiting. In some embodiments, the light sensing devices are physically adjacent (or contiguous), arranged in an array, or in close proximity to one another.) In other words, light from a first subset of the modulated light stream is delivered onto a first light sensing device; light from a second subset of the modulated light stream is delivered onto a second light sensing device; and so on. The spatial subsets of the modulated light stream are produced by respective subsets of the array of light modulating elements. Each subset of the array of light modulating elements produces the respective spatial subset of the modulated light stream by modulating a respective spatial subset of the incident light stream. The light sensing devices 630 are configured to generate respective electrical signals. Each of the electrical signals represents intensity of the respective spatial subset of the modulated light stream as a function of time.

By saying that light from a given spatial subset of the modulated light stream is "delivered" onto the respective light sensing device means that most of the flux (i.e., photons) arriving at the respective light sensing device comes from the spatial subset. However, it should be understood that the systems and methods described herein tolerate a small amount of light crossover in the delivery of light from spatial subsets of the modulated light stream onto the respective light sensing devices. Light crossover occurs when a photon of a given spatial subset arrives a light sensing device other than the respective light sensing device (e.g., when a photon from the first spatial subset arrives at the second light sensing device). Light crossover might occur, e.g., for photons produced from the light modulation unit along the boundaries of the spatial subsets, e.g., due to imperfections in the optical subsystem 620. Crossover for a given light sensing device might be defined as the ratio of the amount of light power received at the light sensing device from spatial subsets other than the respective spatial subset to the amount of light power received at the light sensing device from the respective spatial subset. The crossover for a given system might be defined, e.g., as the maximum crossover taken over all the light sensing devices.

In different embodiments, different amounts of crossover may be tolerated, e.g., depending on the targeted quality of image/video reconstruction. For example, in different sets of embodiments, the maximum crossover may be required, respectively, to be less than $1/2$, less than $1/4$, less than $1/8$, less than $1/32$, less than $1/128$, less than $1/1024$, less than $1/4096$, less than $1/16384$.

Furthermore, the "delivery" of light from a given spatial subset of the modulated light stream onto the respective light sensing device does not require that 100% of the photons from the spatial subset arrive at the respective light sensing device (or that 100% of the photons that arrive be converted into electrical charge). Small amounts of light loss may be unavoidable. It is perhaps preferable that the percentage of light loss be uniform from one spatial subset to the next. In some embodiments, the percentage of light loss may be determined per spatial subset by calibration, and then, used to compensate the measurements obtained from each light sensing device, in an attempt to obtain compensated values that approximate the measurements that would have been obtained from a perfectly uniform system. In some embodiments, or, under strong ambient light conditions, significant amounts of light loss may be tolerated.

In some embodiments, the spatial subsets of the modulated light stream are defined in terms of the light sensing device that detects the largest percentage of the photons traversing a given point on a given cross section of the modulated light stream. For example, taking a cross section of the modulated light stream at or near the plane of the light modulating array, a point in that cross section may be assigned to the $k^{th}$ spatial subset if the $k^{th}$ light sensing device detects more of the photons that traverse that point than any other one of the light sensing devices. The subsets of the array of light modulating elements and the subsets of the incident light stream may be similarly defined.

In some embodiments, the spatial subsets of the modulated light stream may be non-overlapping subsets when viewed in a given cross section. Furthermore, the spatial subsets may cover the extent of the cross section. Likewise, the subsets of the array of the light modulating elements may be non-overlapping subsets and cover the entirety of the array.

In some embodiments, the spatial subsets of the modulated light stream may be uniform in size and shape. (Likewise, the subsets of the array of light modulating elements may be uniform in size and shape.) However, in other embodiments, the spatial subsets (and the array subsets) may have sizes and/or shapes that are non-uniform. For example, in one embodiment, subsets at or near the center of the array of light modulating elements may be smaller in diameter (or area), and thus, packed more densely, than subsets at or near the boundary of the array.

In some embodiments, the spatial subsets of the modulated light stream and the subsets of the array of light modulating elements are simply connected regions. A region is said to be "simply connected" when any two points in the region are connected by a path that lies entirely within the region, and, any such path between two points in the region can be continuously deformed, staying within the region, into any other such path between the two points. As a consequence, a simply connected region doesn't have any holes and doesn't include separated pieces.

In some embodiments, the spatial subsets of the modulated light stream and the subsets of the array of light modulating elements are convex regions. In one embodiment, the spatial subsets and the array subsets are rectangles (e.g., squares). In another embodiment, at least some of the subsets are hexagons.

In some embodiments, the subsets of the array of light modulating elements are defined by a Voronoi tessellation of the array based on a discrete set of points in the plane of the array, where the set of points includes one point for each of the light sensing devices.

The sampling subsystem 640 is configured to acquire samples of the electrical signals generated respectively by the light sensing devices 630. The samples include sample subsets that correspond respectively to the electrical signals. Each sample subset includes a plurality of samples of the respective electrical signal. In the discussion below, the electrical signals are denoted as $I_1(t), I_2(t), \ldots, I_L(t)$, where L is the number of the light sensing devices, and the sample subsets are denoted as $\{I_1(k)\}, \{I_2(k)\}, \ldots, \{I_L(k)\}$. The number L is greater than one but less than N, where N is the number of light modulating elements in the array of light modulating elements.

In various embodiments, the number N may take a wide variety of values. For example, in different sets of embodiments, N may be, respectively, in the range [64, 256], in the range [256, 1024], in the range [1024,4096], in the range $[2^{12}, 2^{14}]$, in the range $[2^{14}, 2^{16}]$, in the range $[2^{16}, 2^{18}]$, in the range $[2^{18}, 2^{20}]$, in the range $[2^{20}, 2^{22}]$, in the range $[2^{22}, 2^{24}]$, in the range $[2^{24}, 2^{26}]$, in the range from $2^{26}$ to infinity. The particular value used in any given embodiment may depend on one or more factors specific to the embodiment.

Likewise, the number L may take any of a wide variety of values. For example, in different sets of embodiments, L may be, respectively, in the range [2,4], in the range [4,8], in the range [8,16], in the range [16,32], in the range [32,64], in the range [64, 256], in the range [256,1024], in the range [1024, 4096], in the range $[2^{12}, 2^{14}]$, in the range $[2^{14}, 2^{16}]$, in the range $[2^{16}, 2^{18}]$, in the range $[2^{18}, 2^{20}]$, in the range $[2^{20}, 2^{22}]$, in the range $[2^{22}, 2^{24}]$, in the range $[2^{24}, 2^{26}]$.

Furthermore, the ratio N/L make take any of a wide of values, e.g., any value in the range from 2 to N/2. In different sets of embodiments, the ratio N/L may be, respectively, in the range [2,4], in the range [4,8], in the range [8,16], in the range [16,64], in the range [64,256], in the range [256,1024], in the range [1024,4096], in the range $[4096, 2^{14}]$, in the range $[2^{14}, 2^{16}]$, in the range $[2^{16}, 2^{18}]$, in the range $[2^{20}, 2^{22}]$, in the range $[2^{22}, 2^{24}]$, in the range from $2^{24}$ to infinity.

As noted above, the samples acquired by the sampling subsystem 640 include a sample subset for each of the electrical signals. In some embodiments, each sample subset is acquired over the same window in time, or, approximately the same window in time.

In some embodiments, the samples of each subset are acquired at the same rate. In other embodiments, not all the sample subsets are acquired at the same rate.

In some embodiments, each of the sample subsets is acquired at the same rate, and, the samples $I_1(k), I_2(k), \ldots, I_L(k)$ corresponding to same time index value k are acquired at the same time $t_k$, or at least, close together in time. The samples $I_1(k), I_2(k), \ldots, I_L(k)$ corresponding to the same time index value k may be referred to herein as a "sample group".

In some embodiments, each sample group $\{I_1(k), I_2(k), \ldots, I_L(k)\}$ corresponds to a respective one of the patterns of the sequence of spatial patterns. In particular, the sample $I_j(k)$, $j=1, 2, 3, \ldots, L$, may represent an inner product between (a) the restriction of a time-slice of the incident light stream to the $j^{th}$ subset of the array of light modulating elements and (b) the restriction of a $k^{th}$ one of the spatial patterns to the $j^{th}$ subset.

Figure 7:
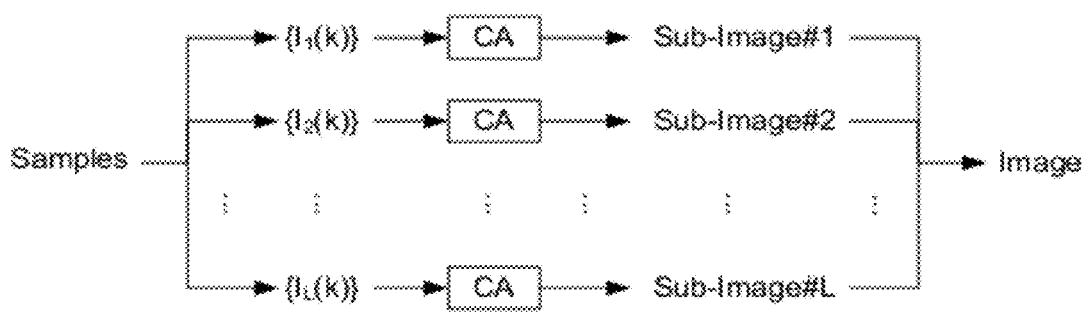
FIG. 7 show how the sample subsets acquired by system 600 may be used to construct respective sub-images of a complete image, where the complete image represents the incident light stream.

Each of the L sample subsets is usable to construct a respective sub-image of an image, as suggested in FIG. 7. (See also FIG. 14.) (CA is an acronym for "construction algorithm".) In other words, the sample subset $\{I_1(k)\}$ is usable to construct a first sub-image; the sample subset $\{I_2(k)\}$ is usable to construct a second sub-image; and so on. Each sub-image represents a respective one of the spatial subsets of the incident light stream (over the time interval of acquisition). The sub-images may be joined together to form the image. The image may represent the whole of the incident light stream (or the portion of the incident light stream that impinges upon the array of light modulating elements) over the time interval of acquisition. The number of pixels in each sub-image may equal the number of light modulating elements in the respective subset of the array of light modulating elements. Each pixel of the $j^{th}$ sub-image may correspond to a respective one of the light modulating elements in the $j^{th}$ subset of the array. Thus, the final image may be in an N-pixel image, with each of the N pixels corresponding to a respective one of the N light modulating elements of the array. In some embodiments, each sub-image is N/L pixels in size. However, in other embodiments, the sub-images may be non-identically sized.

Each sub-image may be constructed using the respective sample subset and the restriction of the sequence of spatial patterns to the corresponding subset of the array of light modulating elements. For example, to construct the first sub-image, the construction algorithm operates on the first sample subset (obtained from the first light sensing device) and the spatial patterns restricted to the first subset of the array of light modulating elements. The construction of the sub-images may be performed by system 600 and/or by some other system. In the latter case, system 600 may send the sample subsets to the other system. The sub-images may be constructed using any image construction algorithm known in the field of compressive sensing, or any combination of such algorithms.

In some embodiments, each sample subset is a compressed representation of the corresponding sub-image, i.e., the number of samples $m_{SS}$ in the sample subset is smaller than the number of pixels $n_{PSI}$ in the corresponding sub-image. For example, in different embodiments, the ratio of $m_{SS}/n_{PSI}$ may be, respectively, less than or equal to 0.8, less than or equal to 0.6, less than or equal to 0.4, less than or equal to 0.3, less than or equal to 0.2, less than or equal to 0.1, less than or equal to 0.05, less than or equal to 0.025. In some embodiments, no compression is achieved, i.e., $m_{SS}$ is greater than or equal to $n_{PSI}$. (Such might be the case when the ratio N/L is small or when the signal-to-noise ratio is small.)

Suppose that the L light sensing devices receive light, respectively, from L equal-sized non-overlapping subsets of the array of N light modulating elements. (See FIG. 14 for an example of the L=4 case.) Each of the L sample subsets is then usable to construct an N/L pixel sub-image of an N-pixel image. The L sample subsets are referred to collectively as an encoded data representation of the N-pixel image (or simply as an "encoded image") because they are usable to produce the N-pixel image by the above-described process. The number of samples $m_{SS}$ in each sample subset is selected to be greater than or equal to the minimum number $m_{N/L}$ of compressive-sensing measurements required to reconstruct an N/L-pixel image with given accuracy. (These compressive-sensing measurements are inner products between the N/L-pixel image and N/L-element measurement vectors.) If the sample groups are acquired at a rate of $R_G$ groups per unit time, and each sample group corresponds to a respective one of the spatial patterns, the time required to obtain the encoded data representation of the N-pixel image is $m_{SS}/R_G$. Because the minimum number $m_{N/L}$ decreases as L increases, a system designer may decrease the time required to acquire the encoded data representation by increasing L. In particular, the designer may select L and $m_{SS}$ so that $m_{SS} \geq m_{N/L}$ and so that $m_{SS}/R_G$ is less than or equal to a target time of acquisition for the encoded image. In practice, one does not need to know the minimum $m_{N/L}$ exactly. It suffices if one has an upper bound $U^{N/L} \geq m_{N/L}$ (e.g., an upper bound determined empirically, or based on theoretical considerations, or based on a worst case assumption such as $N/L \geq m_{N/L}$) and the upper bound decreases significantly with increasing L. In that case, the value of L may be selected so that $m_{SS} = U_{N/L}$ and $U_{N/L}/R_G$ is less than or equal to the target acquisition time. In one embodiment, $U_{N/L}$ is defined by $U_{N/L} = U_N/L$, where $U_N$ is an upper bound on the minimum number of compressive sensing measurements required to reconstruct an N-pixel image.

As noted above, the final image may be an N-pixel image. More generally, the final image may be an n-pixel image, where n is less than or equal to N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_V$, where $k_H$ and $k_V$ are positive integers, would give an effective resolution equal to $N/(k_H k_V)$. In one alternative embodiment, cells near the center of the array may have smaller sizes than cells near the periphery of the array.

Assuming that the effective resolution of the array of light modulating elements is n, with $n \leq N$, that the above-described cells are uniformly-sized, and that each light modulating element "sees" an equal portion of the array of light modulating elements, then each subset of the array includes n/L effective elements, and each of the L sample subsets is usable to construct a respective n/L-pixel sub-image. The L sub-images may then be stitched together to form the n-pixel image. Thus, the L sample subsets are referred to collectively as an encoded representation of the n-pixel image (or simply as an "encoded image"). The number of samples $m_{SS}$ in each sample subset may be set to a value greater than or equal to the minimum number $m_{n/L}$ of compressive-sensing samples required to reconstruct an n/L-pixel image. If the sample groups are acquired at a rate of $R_G$ groups per unit time, and each sample group corresponds to a respective one of the spatial patterns, the time required to acquire the encoded representation of the n-pixel image is $m_{SS}/R_G$. Because $m_{n/L}$ decreases as n/L decreases, $m_{n/L}$ may be decreased by increasing L and/or by decreasing n. Thus, a system designer may select L and $m_{SS}$ so that $m_{SS} \geq m_{n/L}$ and so that $m_{SS}/R_G$ is less than or equal to a target time of acquisition for the encoded image. Furthermore, system 600 may adjust (e.g., dynamically adjust) the acquisition time for an encoded image (or the frame rate for a sequence of encoded images, in the case of video) by adjusting the value of n. The value of n may be adjusted by changing the sequence of spatial patterns being supplied to the light modulation unit 110.

In some embodiments, the sampling subsystem 640 may oversample the electrical signals relative to the rate at which the spatial patterns are applied by the light modulation unit 110. Oversampling means acquiring two or more sample groups per spatial pattern. In other words, for each electrical signal, the sampling subsystem may acquire more than one sample per spatial pattern. For each electrical signal, the two or more samples per spatial pattern may be combined (e.g., by averaging) to obtain a single refined sample per spatial pattern. This combining may be performed prior to construction of the sub-images. Sampling subsystem 640 may be configured to perform this combining The construction algorithm preferably uses the refined samples. Thus, with an oversampling factor of $c_{OS} > 1$, the sampling subsystem 640 may gather $c_{OS}m_{SS}$ samples of each electrical signal. Then the $c_{OS}m_{SS}$ samples may be processed to obtain $m_{SS}$ refined samples. The $m_{SS}$ refined samples of each electrical signal may be used to construct the corresponding sub-image.

As described above, the light modulation unit 110 modulates the incident light stream with a sequence of the spatial patterns. Let $R_P$ denote the maximum rate (in spatial patterns per unit time) that the light modulation unit 110 can attain. In some embodiments, the rate $R_P$ may be slower than the rate $R_G$ at which sample groups are acquired, i.e., the rate at which each electrical signal is sampled. (For example, this condition may hold for a system that includes a separate ADC per light sensing device, or for a system that has a small number of light sensing devices per ADC.) Thus, the rate $R_P$ may be the limiting factor when attempting to meet a desired acquisition time for an encoded representation of an n-pixel image, $n \leq N$. However, recall from above that the minimum number $m_{n/L}$ of compressive-sensing samples required to reconstruct an n/L-pixel image with given accuracy decreases as L increases (and as n decreases). Thus, the number $m_{SS}$ of samples in each sample subset and the number L of light sensing devices may be selected so that $m_{SS}$ is greater than or equal to $m_{n/L}$ and $m_{SS}/R_P$ is less than or equal to a target acquisition time, or equivalently, so that $R_P/m_{SS}$ is greater than or equal to a target frame rate.

As described above, the sampling subsystem 640 acquires samples of the electrical signals, where the samples include L sample subsets acquired respectively from the L light sensing device 630. Each sample subset is usable to construct a respective n/L-pixel sub-image, where $n \leq N$. The sampling subsystem 640 may be configured so that the number $m_{SS}$ of samples per sample subset is a programmable parameter. (In some embodiments, the number $m_{SS}$ is dynamically programmable, i.e., can be changed while the system 600 is acquiring the encoded images, e.g., between one encoded image and the next. This feature allows the system 600 to achieve different tradeoffs between image quality and acquisition time for the samples. Larger values of $m_{SS}$ imply higher image quality but longer acquisition time (or lower frame rate). Conversely, smaller values of $m_{SS}$ imply lower image quality but shorter acquisition time (or higher frame rate). The system 600 (e.g., processing unit 150) may provide a user interface through which a user may control the tradeoff between image quality and acquisition time.

Figure 8:
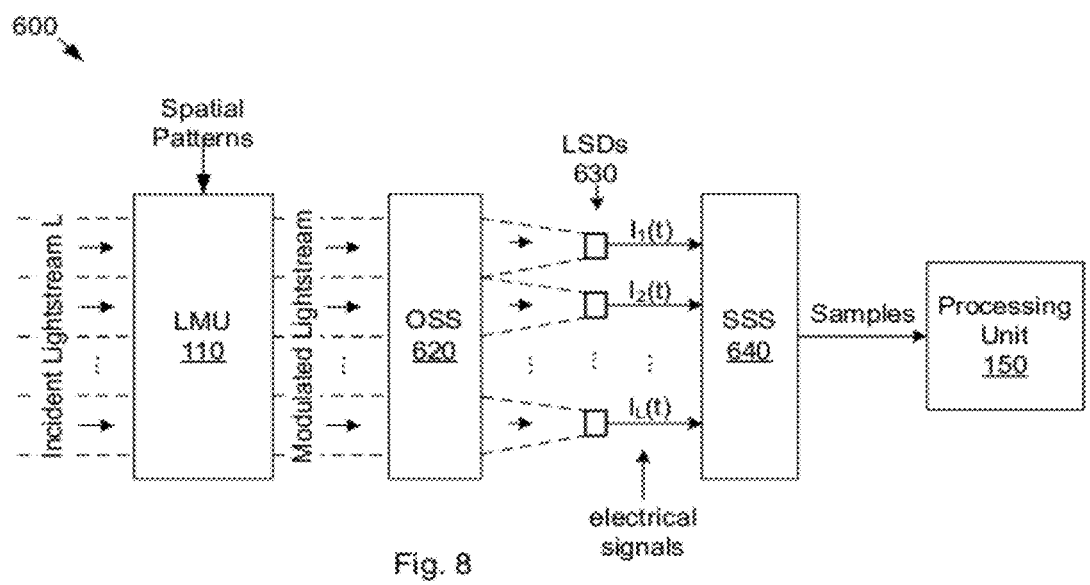
FIG. 8 shows an embodiment of system 600 that includes the processing unit 150.

In some embodiments, system 600 may include the processing unit 150 described above, e.g., as shown in FIG. 8. The processing unit may be configured to operate on each sample subset to construct the respective sub-image using any of the image construction algorithms known in the field of compressive sensing. (The processing unit may also join the sub-images to form the final image.)

In some embodiments, system 600 may transmit the sample subsets to a remote system through a communication channel, e.g., as variously described above. The remote system may then construct the sub-images from the sample subsets. In some embodiments, system 600 is configured for low power consumption, and thus, may not be capable of constructing the sub-images in user-acceptable time. (The construction algorithms are typically computationally intensive.)

In some embodiments, the sampling subsystem 640 may be configured to acquire the samples of the electrical signals in groups, where each of the groups includes at least one (or exactly one) sample of each of the electrical signals. Each of the groups may correspond to a respective one of the spatial patterns, i.e., may be captured in response to the light modulation unit's assertion of a respective one of the spatial patterns. The spatial pattern may be held constant during the acquisition of the group.

The sampling subsystem 640 may acquire the groups of samples at a group rate of $R_G$ groups per unit time. In some embodiments, the maximum group rate $R_G$ may be lower than the maximum pattern modulation rate $R_P$. (For example, this rate condition may hold for system embodiments where the number L of light sensing devices is significantly larger than the number of ADCs.) Thus, the acquisition time for an encoded image may be determined by the ratio $m_{SS}/R_G$, where $m_{SS}$ is the number of groups acquired for the encoded image (or equivalently, the number of samples per sample subset). However, recall that the minimum number $m_{n/L}$ of compressive sensing samples required to reconstruct an n/L-pixel image with given accuracy decreases as L increases (and as n decreases). Thus, a system designer may select the value of L sufficiently large so that $m_{SS} \geq m_{n/L}$, and, $m_{SS}/R_G$ is less than or equal to a target acquisition time, or, equivalently, $R_G/m_{SS}$ is greater than or equal to a target frame rate.

Figure 9:
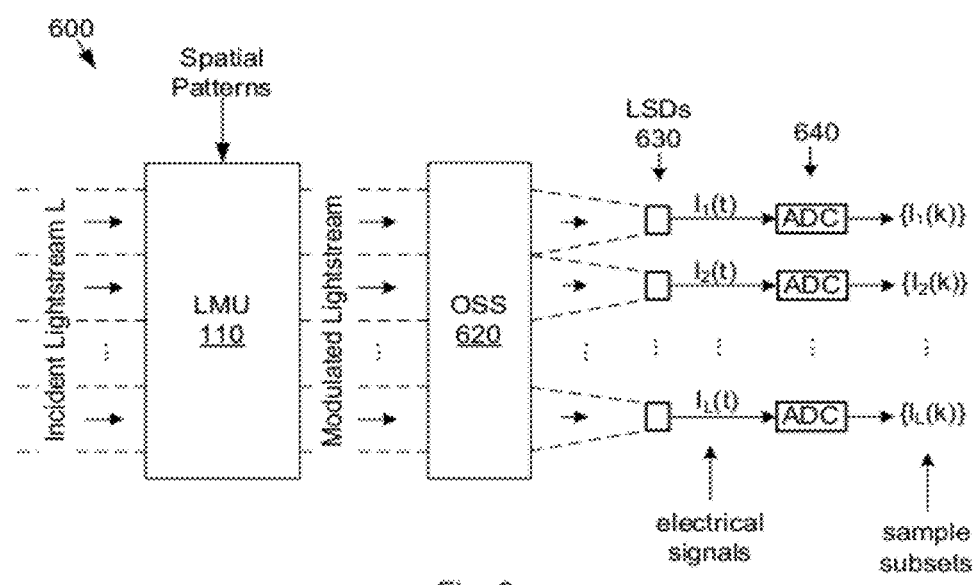
FIG. 9 illustrates an embodiment of system 600 that includes one analog-to-digital converter (ADC) per light sensing device (LSD).

In some embodiments, the sampling subsystem 640 may include a plurality of analog-to-digital converters (ADCs), e.g., as shown in FIG. 9. Each of the ADCs is configured to acquire the samples of the electrical signal generated by a respective one of the light sensing devices. In other words, each ADC acquires a corresponding one of the sample subsets $\{I_1(k)\}, \{I_2(k)\}, \ldots, \{I_L(k)\}$.

In some embodiments, the ADCs may be configured to operate in parallel, e.g., by virtue of being clocked by the same sample conversion clock.

In some embodiments, each ADC includes its own preamplifier, e.g., a preamplifier with controllable gain.

In some embodiments, the ADCs acquire samples in synchronization with the application of spatial patterns.

In some embodiments, the ADCs are configured so they each have the same bit resolution, i.e., the number of bits per sample from each ADC is the same. However, in other embodiments, some of the ADCs may have different bit resolutions by design.

Figure 10:
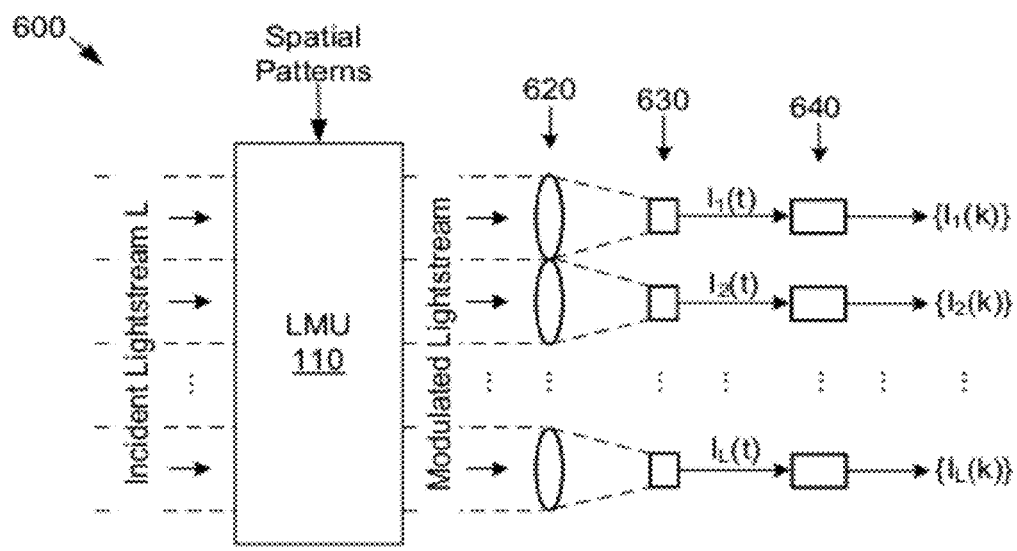
FIG. 10 illustrates an embodiment of system 600 that includes a plurality of lenses to direct modulated light to respective ones of the light sensing devices.
Figure 11:
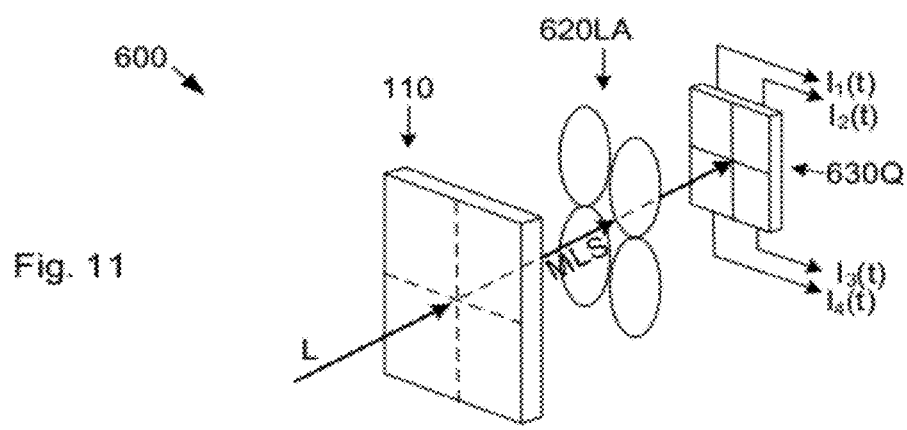
FIG. 11 illustrates an embodiment of system 600 including a 2×2 array of lenses (or lenslets) that directs modulated light onto a 2×2 array of light sensing elements.

In some embodiments, the optical subsystem 620 includes a plurality of lenses, e.g., as shown in FIG. 10. Each of the lenses is configured to direct the light from a respective one of the spatial subsets of the modulated light stream onto a light sensing surface of a respective one of the light sensing devices 630. The one-dimensional arrangement of the lenses shown in FIG. 10 is not meant to be limiting. Various other arrangements, especially two-dimensional arrangements, are also contemplated. For example, in the embodiment of FIG. 11, the optical subsystem 620 includes a 2×2 lenslet array 620LA that directs light onto a 2×2 array 630Q of light sensing elements. (The 2×2 array of light sensing elements may be integrated into a quadrant photodiode.) Each lenslet of the lenslet array directs (e.g., concentrates) light from a corresponding quadrant of the modulated light stream MLS onto a corresponding one of the light sensing elements, e.g., onto a corresponding quadrant of a quadrant photodiode. More generally, the lenslet array may have any desired number of lenslets and any desired geometric configuration. In some embodiments, the array of light sensing elements may agree in number and geometric configuration with the lenslet array. For example, if the lenslet array is an $L_H \times L_V$ rectangular array, with $L_H$ and $L_V$ being integers greater than one, the array of light sensing elements may also be an $L_H \times L_V$ rectangular array. As another example, if the lenslet array is a hexagonal array, the light sensing array may also be hexagonal. However, in other embodiments, the array of light sensing elements and the lenslet array do not agree in number or geometry. For example, in one embodiment, each lenslet may direct light onto a corresponding group of two or more light sensing elements.

Figure 12:
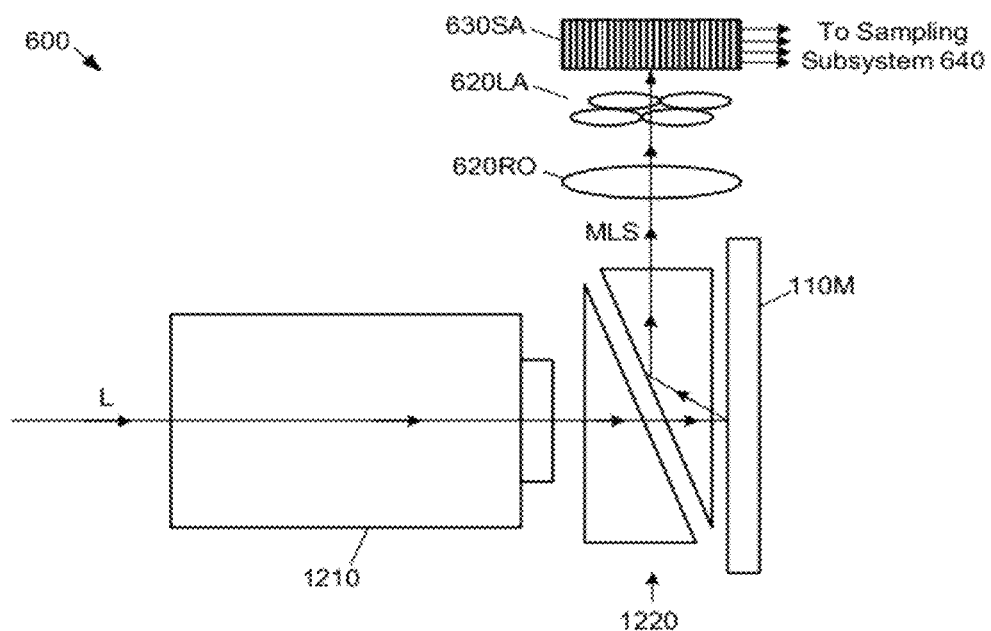
FIG. 12 illustrates an embodiment of system 600 including relay optics 620R0, lenslet array 620LA and sensor array 630SA.

FIG. 12 shows an embodiment of system 600 where the light modulation unit 110 is realized by the array of mirrors 110M (e.g., a DMD), and the optical subsystem 620 includes image relay optics 620RO and the lenslet array 620LA. The lenslet array 620LA directs spatial subsets of the modulated light stream onto respective light sensing elements of the sensor array 630SA. (In one embodiment, the sensor array 630SA is a quadrant photodiode. However, a wide vareity of other embodiments are contemplated.) The electrical signals generated by the sensor array 630SA are sampled by the sampling subsystem 640. Note also that FIG. 12 includes an optical subsystem 1210 and a TIR prism pair 1220. (The optical subsystem 1210 focuses the incident light stream L onto the array of mirrors 110M. The optical subsystem may be a lens, e.g., a camera lens.) (See the above discussion regarding the TIR prism pair 107 of FIG. 5C.) As described above, the lenslet array 620LA may have any desired number of lenslets and any desired geometric arrangement of lenslets.

Figure 13:
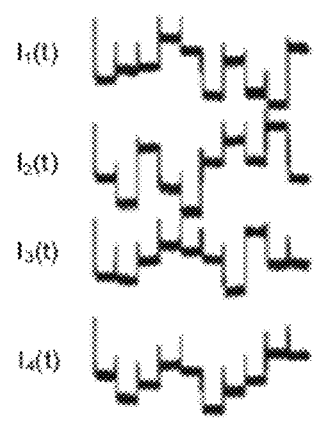
FIG. 13 illustrates an example of the electrical signals generated by the light sensing devices in one embodiment.

FIG. 13 shows example waveforms for the electrical signals $I_1(t)$, $I_2(t)$, $I_3(t)$ and $I_4(t)$ in a case where the light modulation unit 110 is a DMD. These example waveforms are not meant to limit the scope of meaning of the term "electrical signal" as used herein. In other embodiments, the waveforms may have different features, e.g., different transient behavior upon transitions between spatial patterns.

Figure 14:
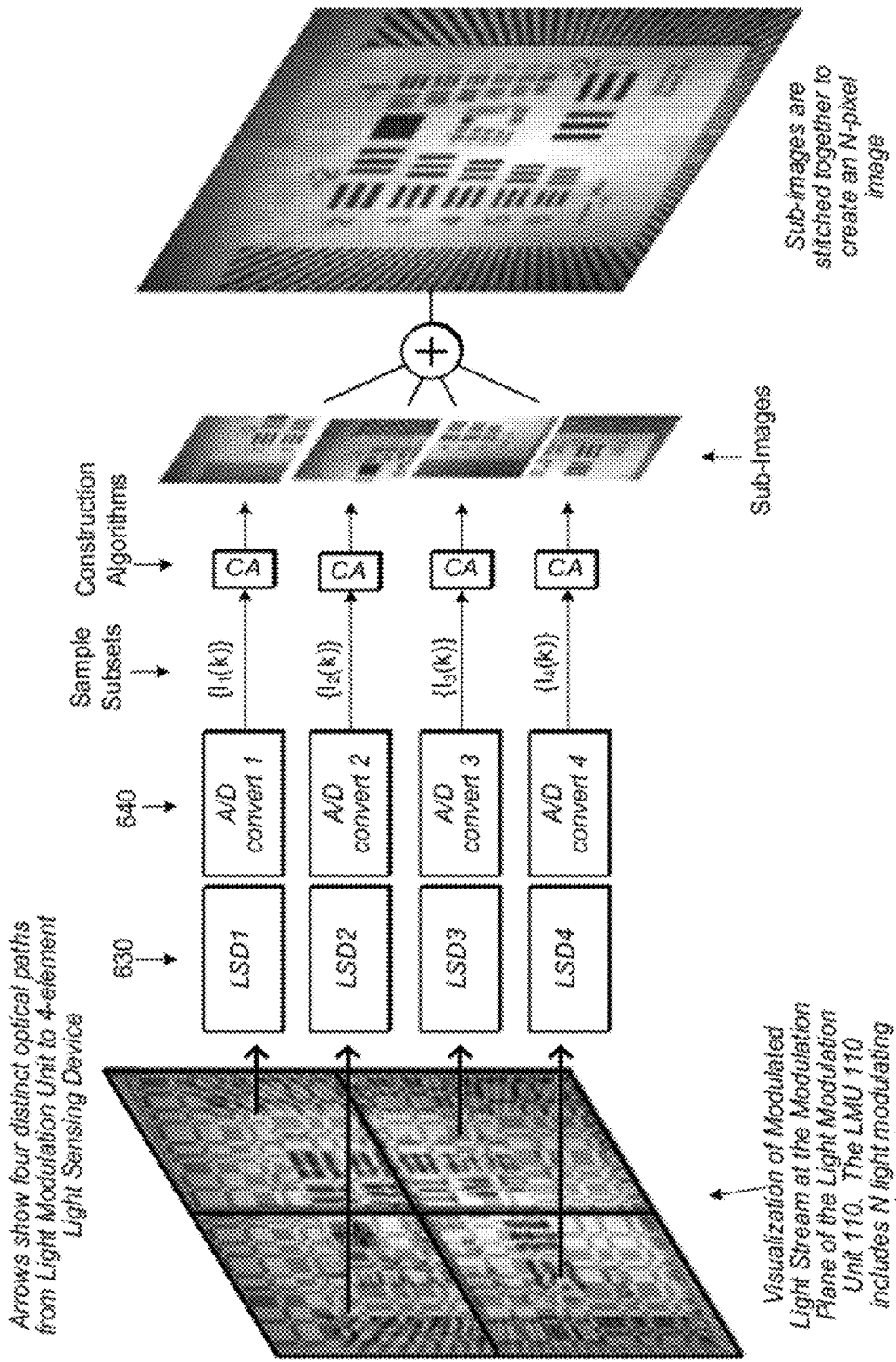
FIG. 14 illustrates how four quadrants of the light modulating array (at left) may be mapped to four corresponding light sensing devices, and the corresponding sample subsets may be used to construct four corresponding sub-images, which being joined together represent the image carried by the incident light stream (not shown; see FIG. 6).

FIG. 14 illustrates one embodiment of the processes of sample acquisition and image construction in a case where there are four light sensing devices LSD1-LSD4. At the left is a visualization of the modulated light stream at the modulation plane of the light modulation unit 110 (at a snapshot in time). The light modulation unit includes N light modulating elements. The four light sensing devices receive light from four respective quadrants of the modulation plane. The electrical signal generated by each light sensing device is sampled to generate a respective sample subset. (See the A/D convert blocks.) Each sample subset is processed by a construction algorithm (CA) to generate a respective sub-image. (The construction algorithm may be any construction algorithm known in the field of compressive sensing.) The sub-images are stitched together to form an N-pixel image.

Figure 15:
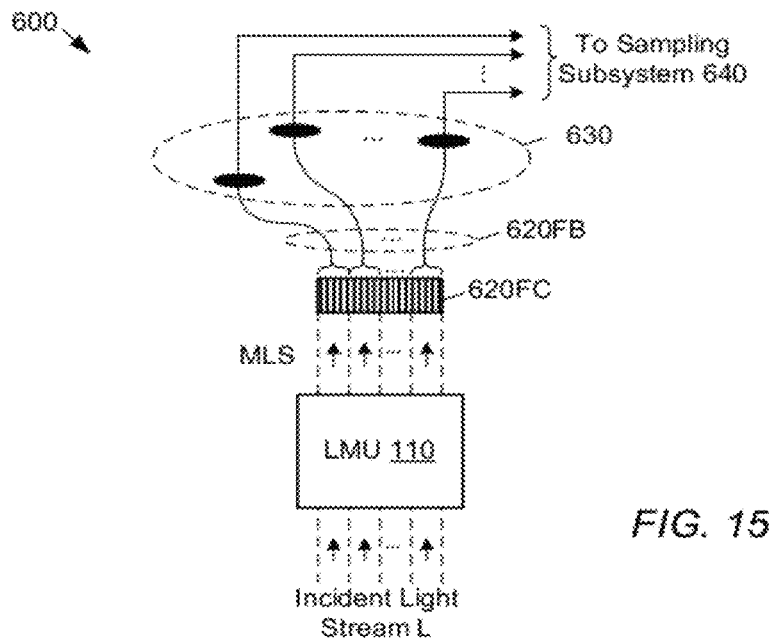
FIG. 15 shows an embodiment of system 600 that includes a fiber coupling device 620FC and a plurality 620FB of fiber bundles to deliver spatial subsets of the modulated light stream to respective light sensing devices.

In some embodiments, the optical subsystem 620 may include a fiber coupling device 620FC and a plurality of optical fiber bundles 620FB, e.g., as shown in FIG. 15. The fiber coupling device is configured to couple light from each of the spatial subsets of the modulated light stream onto a respective one of the fiber bundles. Each fiber bundle is configured to deliver the light from the respective spatial subset onto a light sensing surface of a respective one of the light sensing devices 630. Because light is delivered by means of optical fiber bundles, the light sensing devices 630 need not be physically adjacent or located near each other. A system designer may position the light sensing devices at any set of locations that are convenient, and then, select appropriate lengths for the optical fiber bundles so that they will reach those locations.

In some embodiments, each fiber bundle is a single optical fiber.

In some embodiments, the fiber coupling device includes a set of L fiber tapers. Each fiber taper is configured to conduct light from a respective one of the spatial subsets of the modulated light stream onto a respective one of the fiber bundles (or optical fibers).

Figure 16:
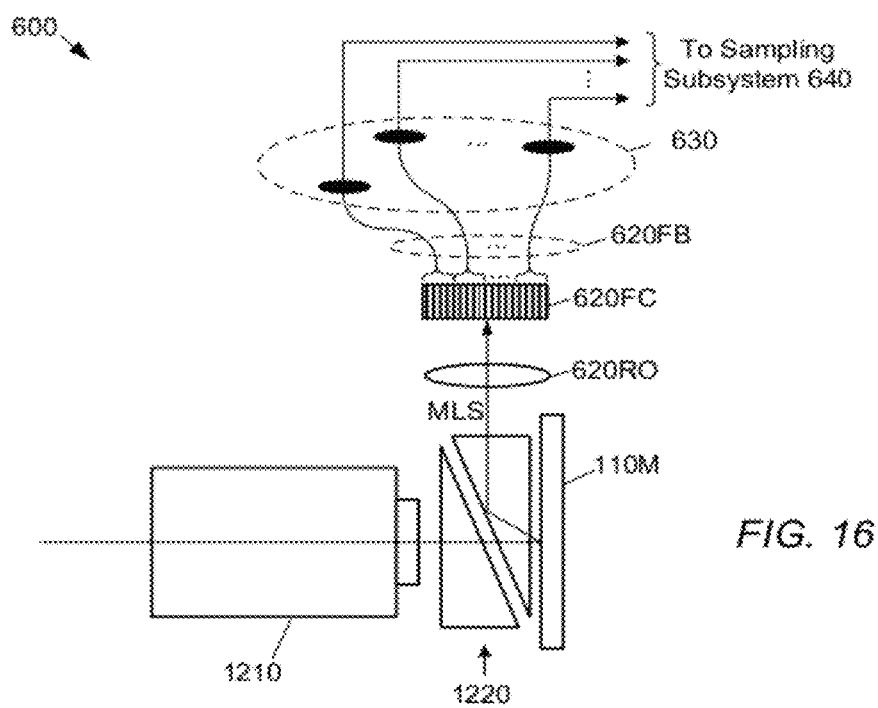
FIG. 16 shows an embodiment of the system 600 that include a TIR prism pair 1220 and digital micromirror device 110M.

FIG. 16 shows an embodiment of system 600 where the light modulation unit 110 is realized by the array of mirrors 110M (e.g., a DMD), and the optical subsystem 620 includes image relay optics 630RO, the fiber coupling device 620FC and the fiber bundles 620FB.

Figure 17A:
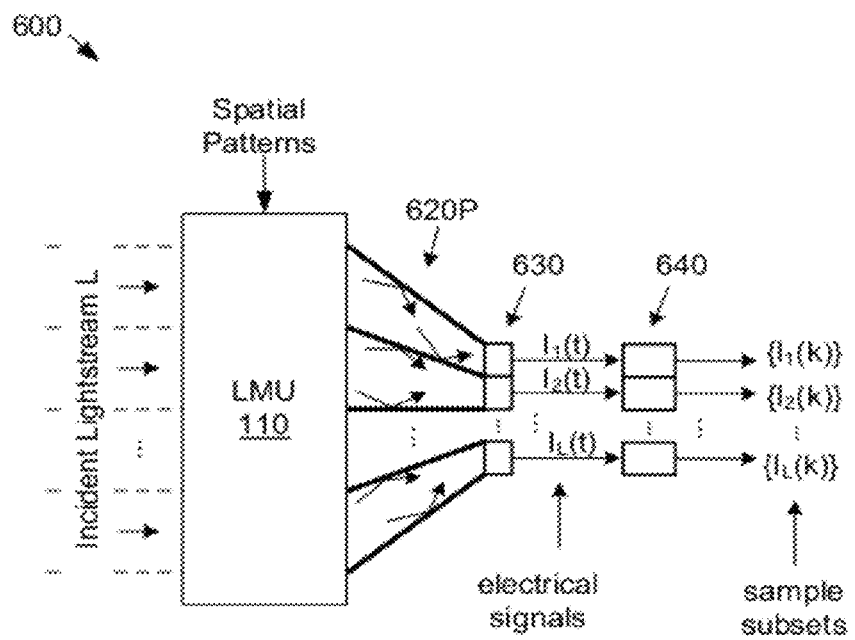
FIG. 17A illustrates an embodiment of system 600 that include a plurality of light pipes to deliver spatial subsets of the modulated light stream to respective light sensing devices.

In some embodiments, the optical subsystem 620 includes a plurality of light pipes 620P (e.g., hollow tubes or tunnels or guides) whose internal surfaces are reflective, e.g., as suggested in FIG. 17A. Each light pipe has two open ends. A first end of each pipe couples (or, is in close proximity) to a corresponding subset of the array of light modulating elements so that modulated light the array subset enters the pipe. A second end of each pipe couples (or, is in close proximity) to the light sensing surface of a corresponding light sensing device so that modulated light from the corresponding array subset is delivered to that light sensing surface. Each light pipe serves as a waveguide to guide the light from the corresponding spatial subset to the corresponding light sensing device. The internal surfaces of the pipes may be polished.

Figure 17B:
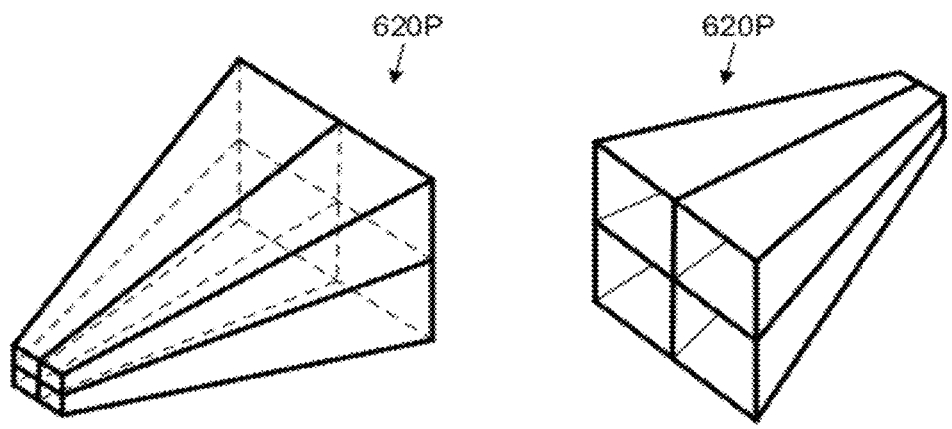
FIG. 17B illustrates one embodiment of the light pipes, in two different views.

FIG. 17B shows an embodiment of the light pipes 620P configured to guide light from four quadrants of the array of light modulating elements onto four respective light sensing devices. In other embodiments, the light pipes 620P may include desired any number of pipes in any desired geometric arrangement.

It should be understood that the term "pipe", as used herein, includes within its scope of meaning the possibility that the cross section or diameter of a pipe may vary along its length.

In one set of embodiments, the light sensing devices are arranged in an array ("the light sensing array").

The light sensing array may be smaller in area (or diameter) than the array of light modulating elements. Thus, in some embodiments, the optical subsystem 620 may be configured to concentrate the modulated light stream onto the light sensing array. See, e.g., FIGS. 18 and 19. The diameter (or the cross sectional area) of the modulated light beam decreases as it moves from the array of light modulating elements to the light sensing array. (The optical subsystem 620 may include one or more lenses and/or one or more mirrors to achieve the concentrating action.) The optical subsystem may also be configured so that the modulated light stream comes into focus at the light sensing array.

Alternatively, the light sensing array may be of the same size as the array of light modulating elements. Thus, in some embodiments, the optical subsystem 620 may be configured to maintain the size of the modulated light stream as it moves from the array of light modulating elements to the light sensing array. The optical subsystem may also be configured so that the modulated light stream comes into focus at the light sensing array.

As yet another alternative, the light sensing array may be larger in size than the array of light modulating elements. Thus, the optical subsystem 620 may be configured to increase the size of the modulated light stream as it moves from the array of light modulating elements to the light sensing array. The optical subsystem may also be configured so that the modulated light stream comes into focus at the light sensing array.

Figure 18:
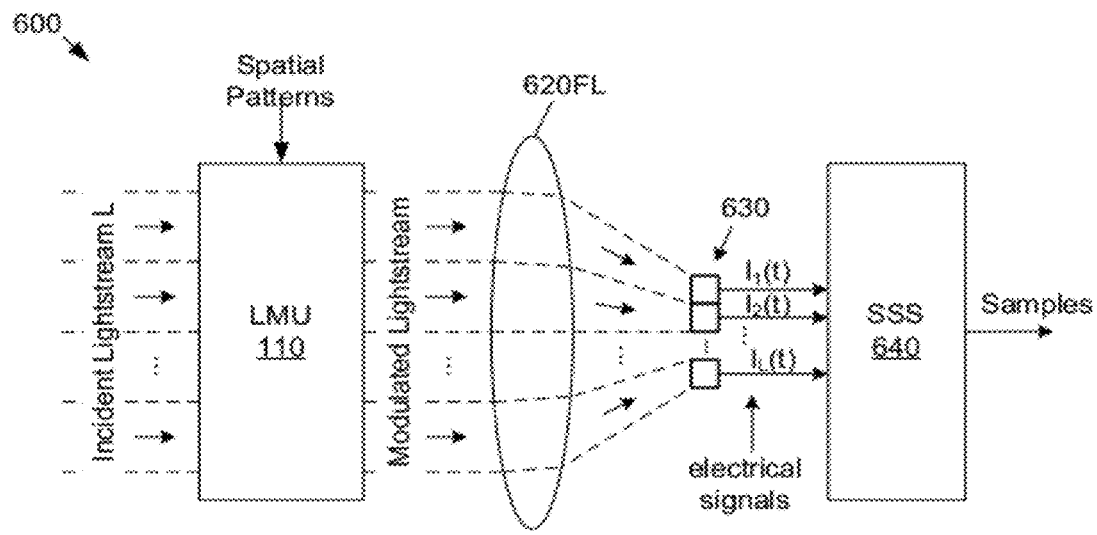
FIG. 18 illustrates an embodiment of system 600 where lens 620FL concentrates the modulated light stream onto the light sensing devices 630.
Figure 19:
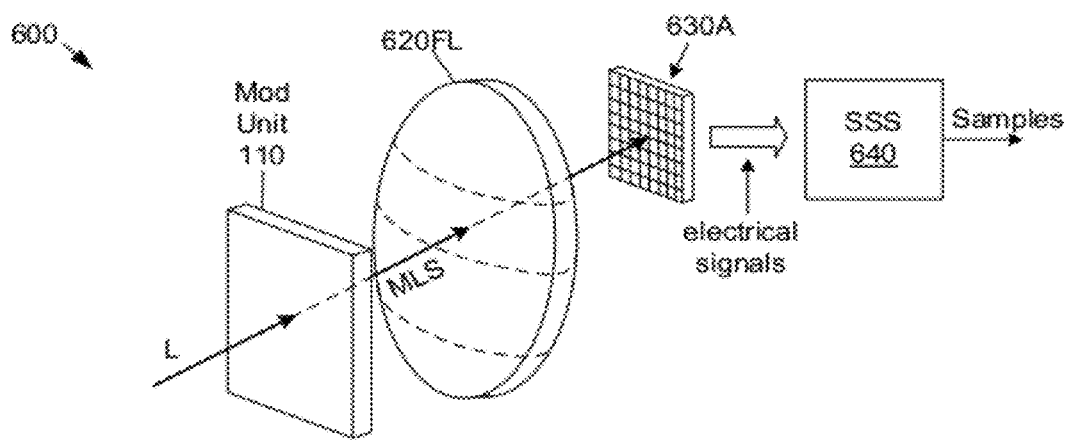
FIG. 19 illustrates an embodiment of system 600 where lens 620FL concentrates the modulated light stream onto the light sensing array 630A.

In some embodiments, the optical subsystem 620 includes a focusing lens 620FL, e.g., as shown in FIG. 18. The light sensing devices 630 may be located at an image plane of the focusing lens. Furthermore, an object plane of the focusing lens may coincide with a modulating plane of the light modulation unit 110. The focusing lens focuses the modulated light stream onto the light sensing devices. Each light sensing device receives light from a corresponding spatial portion of the array of light modulating elements. FIG. 19 shows an embodiment where the light sensing devices 630 are arranged in an 8×8 array 630A (e.g., an array fabricated on an integrated circuit). The samples obtained from each light sensing device may be used to construct $1/64^{th}$ of the final image. While FIG. 19 shows an 8×8 array of light sensing devices, in other embodiments, the array may have any desired dimensions and any desired geometric configuration. In an embodiment that uses an $L_H \times L_V$ array, where $L_H$ and $L_V$ are positive integers, the samples obtained from each array element are used to construct one sub-image among $L_H*L_V$ sub-images. The $L_H*L_V$ sub-images are stitched together to form the final image. The product $L=L_H*L_V$ may be less than the number N of light modulating elements in the light modulation unit 110.

In some embodiments, the light sensing devices 630 may be configured so that they each have the same sensitivity to light. However, in other embodiments, the light sensing devices may have differing light sensitivities by design.

Figure 20:
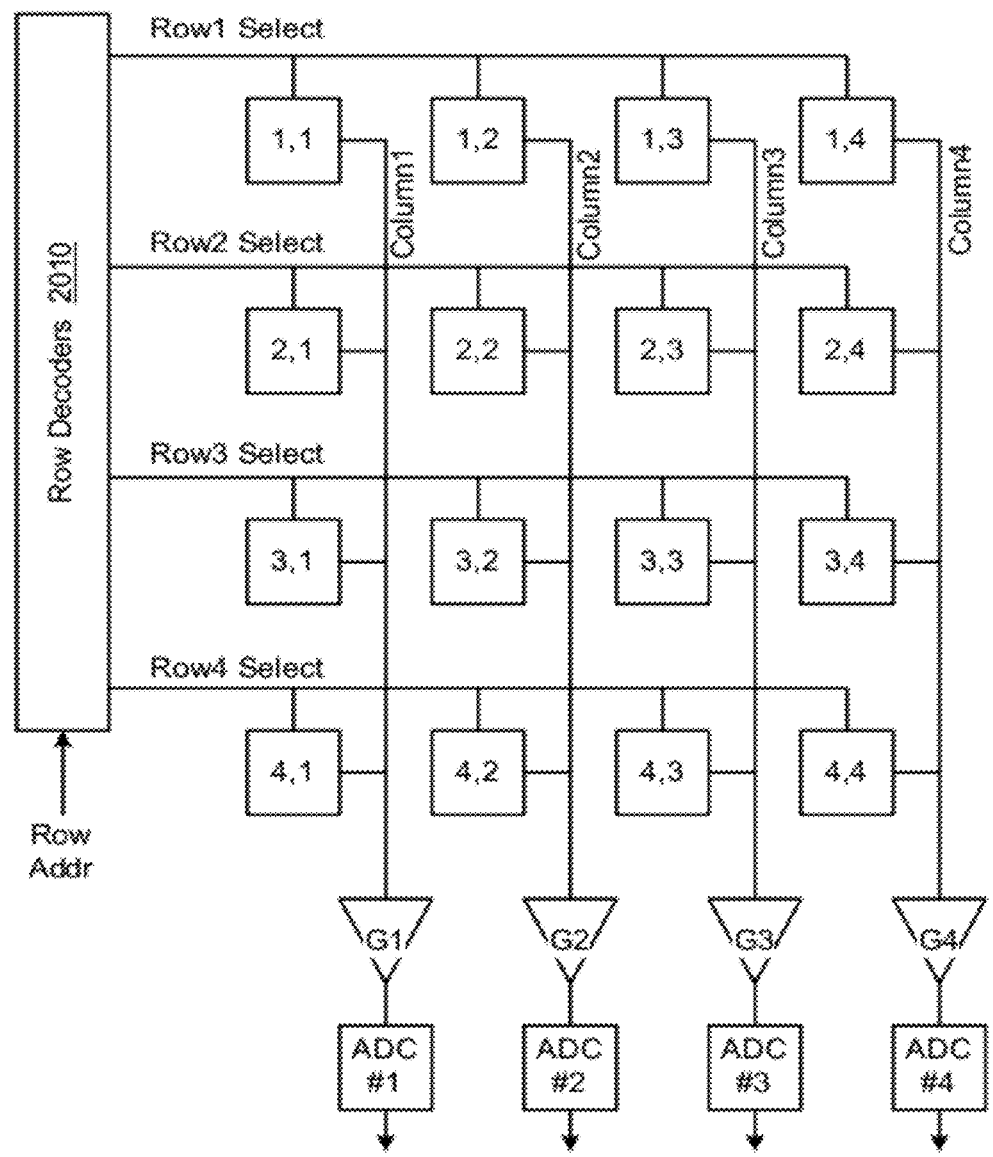
FIG. 20 illustrates an embodiment of a circuit for reading rows of samples from an array of light sensing devices.

As described above, the light sensing devices 630 may be arranged in a rectangular array. In some embodiments, the sampling subsystem 640 may include one ADC per column of the array, e.g., as shown in FIG. 20. Thus, a whole row of sensor values may be read from the array in parallel. (The blocks indicated by integer pairs i,j are the light sensing devices.) (The term "sensor" is used here as a synonym for "light sensing device".) The row decoders 2010 are configured to select one of the rows in response to received row address data. The light sensing devices of the selected row then output their voltage signals (or current signals or charge signals) respectively to column amplifiers G1-G4. The converters ADC#1-ADC#4 then digitize (sample) the respective amplified signals in parallel. A controlling agent (e.g., processing unit 150) may drive the row address so that the rows are read out in a cyclic fashion. While FIG. 20 shows a 4×4 array of light sensing devices, the described principle generalizes to arrays having any number of rows and any number of columns.

Figure 21:
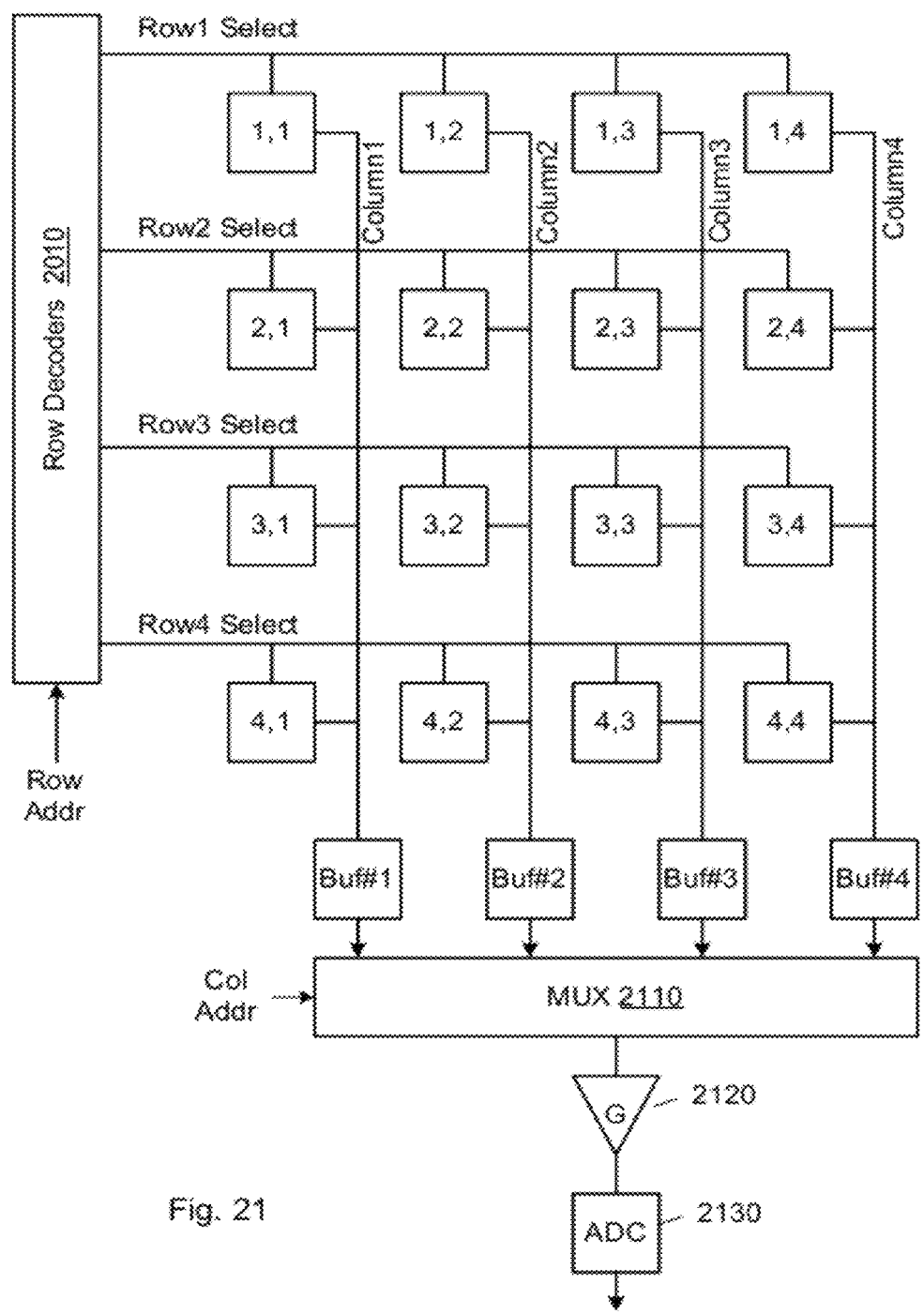
FIG. 21 illustrates an embodiment of a circuit for reading samples from an array of light sensing devices.

In some embodiments, the whole array of light sensing devices share a single ADC, e.g., as suggested in FIG. 21. The light sensing devices of a selected row transfer their voltage signals (or charge signals) respectively to buffers Buf#1-Buf#4. Multiplexer 2110 transfers a selected one of the buffered signals to its output based on the column address. The selected signal is then amplified by amplifier 2120 and then digitized by ADC 2130. A controlling agent (e.g., processing unit 150) may drive the column address so that the buffered signals of the selected row are digitized sequentially. Furthermore, the controlling agent may drive the row address and column address so that the entire array is digitized, e.g., in a raster fashion. While FIG. 21 shows a 4x4 array of light sensing devices, the described principle generalizes to arrays of any size. In some embodiments, the controlling agent may implement windowing, i.e., the readout of samples from a window that this is smaller than the entire array by appropriate control of the row and column addresses.

In some embodiments, the light sensing devices 630 are incorporated into an integrated circuit ("the sensor IC"). Furthermore, the sampling subsystem 640 may include a readout integrated circuit (ROIC) that is configured for coupling to the sensor IC. In some embodiments, the ROIC may be a prior art ROIC provided by any of various manufacturers. The ROIC may include circuitry designed to read the signals generated by the light sensing devices in the sensor IC. In one embodiment, the ROIC includes the circuitry shown in FIG. 20, minus the array of light sensing devices. In another embodiment, the ROIC includes the circuitry shown in FIG. 20, minus the array of light sensing devices and minus the ADCs. In another embodiment, the ROIC may include the circuitry of FIG. 21, minus the array of light sensing devices.

In another embodiment, the ROIC may include the circuitry of FIG. 21, minus the array of light sensing devices and minus the ADC.

The ROIC may be coupled to the sensor IC by "solder bump bonding", a well known technique in the field of semiconductor assembly.

The ROIC may be implemented using CMOS technology. However, other technologies are possible.

In some embodiments, a sensor IC containing the array of light sensing devices may be physically coupled to a transmissive realization of the light modulation unit 110. In particular, the two may be coupled so that the backside (i.e., the light output side) of the transmissive light modulation unit is directly facing the light-sensing side of the sensor IC. Because the light sensing array is in close proximity to the array of light modulating elements, a high percentage of the light in each spatial subset of the modulated light stream is delivered to its respective light sensing device.

Figure 22A:
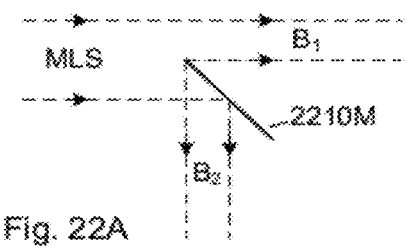
FIGS. 22A through 22F illustrates different ways of separating the modulated light stream into spatial portions.
Figure 22B:
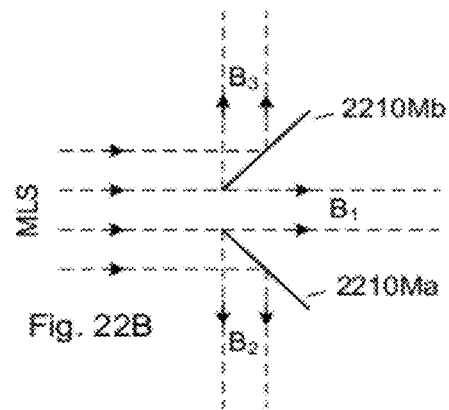
Figure 22C:
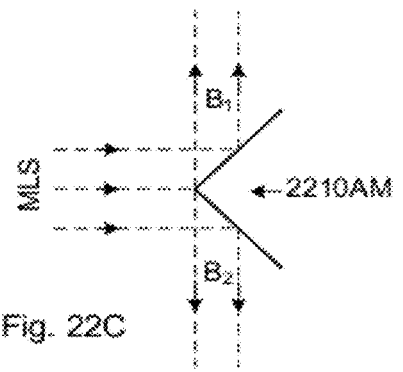
Figure 22D:
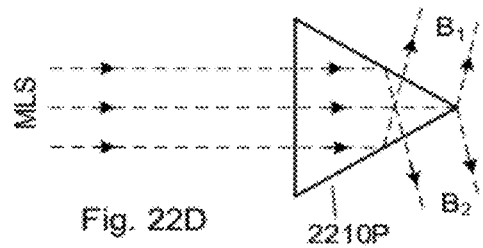
Figure 22E:
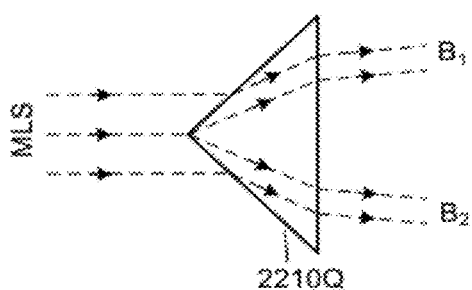
Figure 22F:
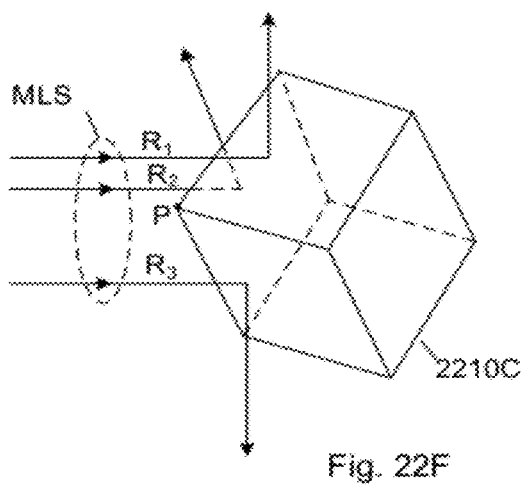

In some embodiments, optical subsystem 620 may include one or more components such as those illustrated in FIGS. 22A-F. FIG. 22A shows the modulated light stream MLS being separated into two sub-streams by a mirror 2210M that blocks a portion (e.g., half) of the modulated light stream. This principle generalizes to any number of mirrors. For example, FIG. 22B shows the modulated light stream being separated into three sub-streams by mirrors 2210Ma and 2210Mb, each of which intercepts a corresponding portion of the modulated light stream. FIG. 22C shows an angled mirror 2210AM being used to separate the modulated light stream into two sub-streams. FIG. 22D shows a prism 2210P being used to separate the modulated light stream into two sub-stream by virtue of total internal reflection off of two surfaces of the prism. FIG. 22E shows a prism 2210Q being used to separate the modulated light stream into two sub-streams based on the refractive properties of the prism 2210Q. FIG. 22F shows a reflective object 2210C having three reflective faces (or surfaces) that meet at a point P being used to separate the modulated light stream into three sub-streams. Representative rays $R_1$, $R_2$ and $R_3$ are shown.

Method 2300

In some embodiments, a method 2300 for operating on light may include the actions shown in FIG. 23.

Action 2310 includes modulating an incident stream of light with a sequence of spatial patterns in order to produce a modulated light stream, e.g., as variously described above. The modulation is performed by an array of light modulating elements, e.g., as variously described above.

Action 2320 includes delivering light from each of a plurality of spatial subsets of the modulated light stream onto a respective one of a plurality of light sensing devices, e.g., as variously described above. The spatial subsets of the modulated light stream are produced by respective subsets of the array of light modulating elements. Each subset of the array of light modulating elements produces the respective spatial subset of the modulated light stream by modulating a respective spatial subset of the incident light stream. The operation of delivering the light from the spatial subsets to the light sensing device may be performed by an optical subsystem, e.g., as variously described above.

Action 2330 includes generating electrical signals, where each of the electrical signals is generated by a respective one of the light sensing devices, e.g., as variously described above. Each of the electrical signals represents intensity of a respective one of the spatial subsets of the modulated light stream as a function of time.

Action 2340 includes acquiring samples of the electrical signals, e.g., as variously described above. The samples include sample subsets that correspond respectively to the electrical signals. Each sample subset includes a plurality of samples of the respective electrical signal.

In some embodiments, each of the sample subsets is usable to construct a respective sub-image of an image, where each sub-image represents a respective one of the spatial subsets of the incident light stream. In other embodiments, the sample subsets may be too small in number of samples to construct sub-images, but may be used to perform any of a variety of inference tasks, as variously described above.

In some embodiments, the method 2300 also includes operating on the sample subsets to construct the respective sub-images.

In some embodiments, the method 2300 also includes transmitting the sample subsets to a receiver through a communication channel, e.g., as variously described above.

As above, let $m_{SS}$ denote the number of samples in each sample subset, N denote the number of the light modulating elements, L denote the number of the light sensing devices, n denote is the number of pixels in the final image, where n is less than or equal to N, and let $R_P$ denote the maximum rate (in spatial patterns per unit time) of pattern modulation by the light modulation unit 110. As described above, the number $m_{n/L}$ of compressive sensing measurements required to reconstruct an n/L-pixel image decreases as L increases. Thus, the value of L may be selected so that $m_{SS} \geq m_{n/L}$, and, $m_{SS}/R_P$ is less than or equal to a target time of acquisition.

In some embodiments, the operation of acquiring the samples of the electrical signals includes acquiring the samples in groups, e.g., as variously described above. The groups may be acquired at a group rate of $R_G$ groups per unit time. Each of the groups includes at least one sample of each of the electrical signals. Each of the groups corresponds to a respective one of the spatial patterns. (In some embodiments, more than one group is acquired per spatial pattern.) In some embodiments, L is selected so that $m_{SS}/R_G$ is less than or equal to a target acquisition time.

Decreasing the Data Sampling Time in a Compressive-Imaging Device

One of the challenges in compressive imaging is acquiring the compressed images fast enough to compete with prior art FPA-based cameras that can operate at video rates. (FPA is an acronym for "focal plane array". A focal plane array is an image-sensing device that includes an array of photodetector elements, typically rectangular, and typically positioned at the focal plane of an optical system.) For at least certain values of N, an N-element FPA can be used acquire N-pixel images at video rates. If N is large enough, it may be difficult for a compressive-sensing camera, such as the camera of FIG. 1, to acquire compressed representations of N-pixel images at video rates. The difficulty arises because of the single photodiode. To reconstruct an N-pixel image with given accuracy requires a certain minimum number of samples of the photodiode signal S(t) to be acquired. While that minimum number is much smaller than N, it is also significantly larger than one. For example, with a compression ratio of $1/10^{th}$, a compressive-imaging camera having a DMD with 1 million micromirrors may acquire a compressed representation of an image of pixel count equal to 1 million by capturing approximately 100,000 samples of the photodiode signal S(t), assuming each sample corresponds to a respective one of the spatial patterns being applied by the DMD 40. If the DMD's maximum rate of modulation is 32,000 patterns per second, then the time required to acquire the compressed image representation is 100,000/32 kHz=3.125 seconds, too slow to allow video acquisition.

The present patent discloses, among other things, a mechanism for reducing the acquisition time for a compressed image representation (or increasing the frame rate for acquiring a sequence of compressed image representations) by introducing hardware parallelism into a compressive-imaging camera. See, e.g., FIG. 14. In one embodiment, the hardware parallelism involves replacing the single photodiode with four light sensing devices, and replacing the single ADC with four ADCs (one ADC per light sensing device). In addition, each light sensing device receives modulated light from a corresponding quadrant of the DMD, and the samples acquired from each light sensing device are used to construct a corresponding sub-image of the final image. Because each light sensing device sees only $\frac{1}{4}^{th}$ of the 1 million micromirror array, the sub-images are each of size (1 million)/4. Consequently, the number of samples per light sensing device required to reconstruct the sub-images decreases approximately by a factor of four, i.e., decreases from 100,000 to 25,000. Assuming each ADC operates at the same sample rate as the ADC in the single photodiode system, the time for acquiring the compressed image representation is reduced by a factor of four: 25,000/32 kHz=0.78 seconds.

More generally, the single photodiode of FIG. 1 may be replaced with L>1 light sensing devices, and the single ADC may be replaced with L light sensing devices (one ADC per light sensing device). Each light sensing device receives modulated light from a corresponding region of an N-element light modulator (not necessarily a DMD and not necessarily N=1 million). Assuming the L regions are equally sized, each light sensing device sees N/L elements of the light modulator. Thus, the L sub-images are each of pixel count N/L. As a first order approximation, the number of samples per light sensing device required to reconstruct the L sub-images decreases by a factor of L, assuming a linear relationship between pixel count and number of sample required for reconstruction. Thus, the time required to acquire the compressed image representation is reduced by a factor of L. (Note, even if the relationship is not exactly linear, the number of samples required for the reconstruction of each sub-image nevertheless decreases significantly as L increases. Thus, the notion of achieving decreased acquisition time by increasing L holds even if the relationship is not linear.) A system designer may then select the value of L to achieve any desired acquisition time.

Figure 24:
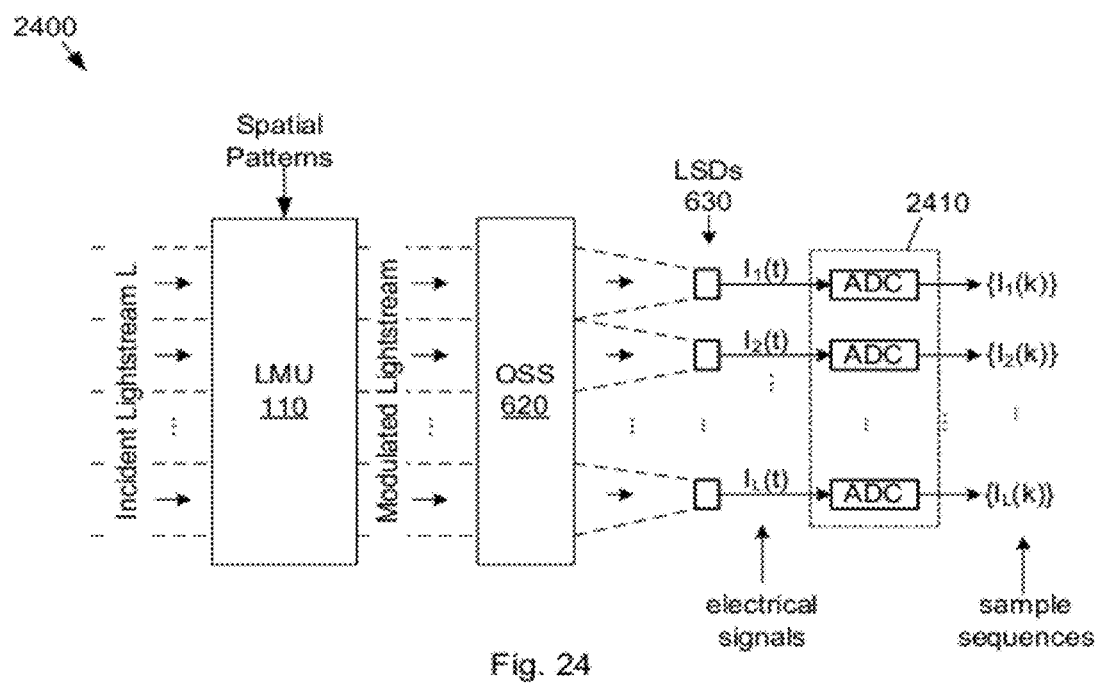
FIG. 24 illustrates one embodiment of a system 2400 including one ADC per light sensing device.

In one set of embodiments, a system 2400 for operating on light may be configured as shown in FIG. 24. The system 2400 may include the light modulation unit 110, the optical subsystem 620 and the plurality of light sensing devices 630 as described above, and may also include a plurality of analog-to-digital converters (ADCs) 2410. (Furthermore, any subset of the features, embodiments and elements discussed above and below may be incorporated into system 2400.)

The light modulation unit 110 is configured to modulate an incident stream of light with a sequence of spatial patterns in order to produce a modulated light stream. The light modulation unit includes an array of light modulating elements as variously described above. In various embodiments, the number of elements N in the array may vary over a wide range, e.g., as described above.

The optical subsystem 620 is configured to direct spatial subsets of the modulated light stream to respective ones of the light sensing devices, i.e., onto the light sensing surfaces of the light sensing devices. The spatial subsets of the modulated light stream are produced by respective non-overlapping regions of the array of light modulating elements. Each region of the array of light modulating elements produces the respective spatial subset of the modulated light stream by modulating a respective spatial subset of the incident light stream. Each of the light sensing devices is configured to generate a respective electrical signal that represents intensity of the respective spatial subset of the modulated light stream as a function of time.

As discussed above, the expression "direct spatial subsets of the modulated light stream to respective light sensing devices" does not require that all the light from each spatial subset arrives at the corresponding light sensing device, or that the light arriving at each light sensing device comes only from the respective spatial subset. Some light loss and loss cross over is tolerated, e.g., depending on the desired accuracy of image reconstruction, or the target manufacturing cost of the system 2400.

In some embodiments, the plurality of light sensing devices is incorporated into a single integrated circuit. In other embodiments, the plurality of light sensing devices may be discrete devices or separately-packaged devices. In some embodiments, the light sensing devices are arranged in an array. In other embodiments, the light sensing devices are arranged in an irregular or non-uniform fashion, or, distributed to separate locations.

Each of the ADCs 2410 is configured to capture a respective sequence of samples of the electrical signal generated by a respective one of the light sensing devices. The sequence of samples captured by each of the ADCs is usable to construct a respective sub-image that represents the corresponding spatial subset of the incident light stream.

In some embodiments, the optical subsystem may include a plurality of lenses, e.g., as variously described above. Each of the lenses is configured to direct a respective one of the spatial subsets of the modulated light stream onto a light sensing surface of a respective one of the light sensing devices.

In some embodiments, the optical subsystem may include a fiber coupling device and a plurality of fiber bundles (or fibers), e.g., as variously described above. The fiber coupling device is configured to couple light from each of the spatial portions of the modulated light stream onto a respective one of the fiber bundles. Each of the fiber bundles is configured to deliver the light from the respective spatial subset of the modulated light stream onto a light sensing surface of a respective one of the light sensing devices.

In some embodiments, the optical subsystem may include a focusing lens, e.g., as variously described above. The plurality of light sensing devices may be located at an image plane of the focusing lens.

In some embodiments, the plurality of ADCs are configured to capture their respective sample sequences synchronously, e.g., in response to a common sampling clock.

In some embodiments, each of the sample sequences has a sample size $m_{SS}$ that is smaller than the number of pixels $n_{PSI}$ in the respective sub-image. The sample size of a sample sequence is the number of samples included in the sample sequence. For example, in different embodiments, the sample size $m_{SS}$ may be, respectively, less than 70% of $n_{PSI}$, less than 60% of $n_{PSI}$, less than 50% of $n_{PSI}$, less than 40% of $n_{PSI}$, less than 30% of $n_{PSI}$, less than 20% of $n_{PSI}$, less than 10% of $n_{PSI}$, less 5% of $n_{PSI}$.

In some embodiments, the ADCs 2410 are configured to acquire the sample sequences over a time interval in which the incident light stream is modulated with $m_P$ of the spatial patterns. Furthermore, the ADCs 2410 may acquire the sample sequences so that each sample sequence includes at least one sample for each of the mp spatial patterns. The number mp is less than the number $n_{PSI}$ of pixels per sub-image. For example, in different embodiments, the number $m_P$ is, respectively, less than 70% of $n_{PSI}$, less than 60% of $n_{PSI}$, less than 50% of $n_{PSI}$, less than 40% of $n_{PSI}$, less than 30% of $n_{PSI}$, less than 20% of $n_{PSI}$, less than 10% of $n_{PSI}$, less than 5% of $n_{PSI}$.

Figure 25:
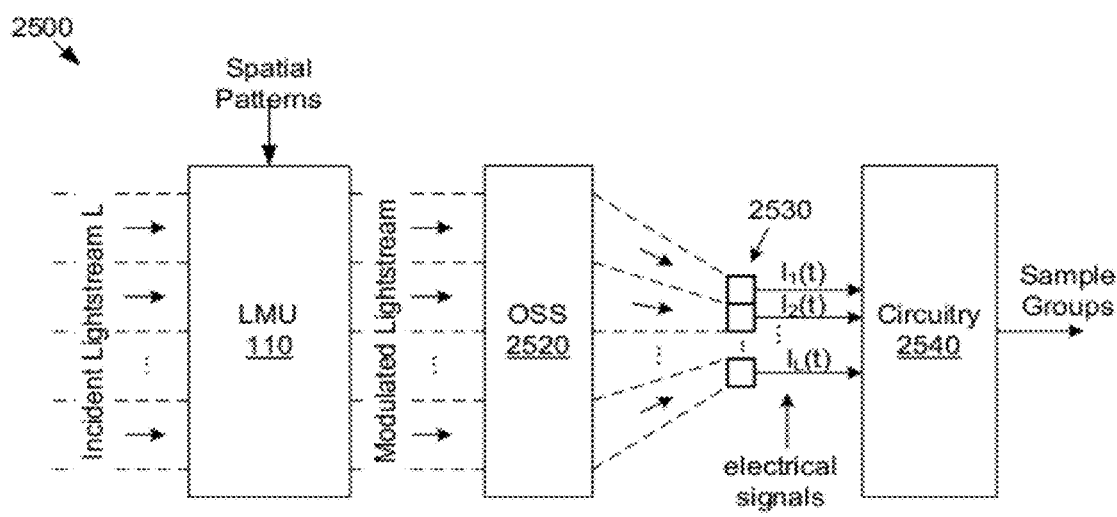
FIG. 25 illustrates an embodiment of a system 2500 including circuitry 2540, which is configured to read groups of samples from the light sensing array 2530.

In one set of embodiments, a system 2500 for operating on light may be configured as shown in FIG. 25. System 2500 may include the light modulation unit 110 as variously described above, and may also include an optical subsystem 2520, an array of light sensing elements 2530 and circuitry 2540. (Any subset of the various embodiments, features and elements described above may be incorporated into system 2500.)

The light modulation unit 110 is configured to modulate an incident stream of light with a sequence of spatial patterns in order to produce a modulated light stream. The light modulation unit includes an array of N light modulating elements. The number N may take any of various values, e.g., as variously described above and below. The number L of light sensing elements in the light sensing array 2530 is less than N and greater than one. The number L may take any of the various values, e.g., as variously described above and below.

In different sets of embodiments, the ratio N/L may be, respectively, in the range [4,9], in the range [9,16], in the range [16,25], in the range [25,36], in the range [36,49], in the range [49,64], in the range [64,256], in the range [256,1024], in the range from 1024 to infinity.

The optical subsystem is configured to focus light from each of a plurality of spatial portions of the modulated light stream onto a respective one of the array of light sensing elements. The spatial portions of the modulated light stream are produced by respective non-overlapping regions of the array of light modulating elements. Each region of the array of light modulating elements produces the respective spatial portion of the modulated light stream by modulating a respective spatial portion of the incident light stream. The L light sensing elements are configured to generate respective electrical signals. Each of the electrical signals represents intensity of the respective spatial portion of the modulated light stream as a function of time.

The circuitry 2540 is configured to read groups of samples from the array of L light sensing elements. Each group of samples includes L samples, i.e., one sample from each of the L electrical signals. In other words, each group includes one sample from each of the L light sensing elements.

In some embodiments, the circuitry 2540 is configured to read the groups at a maximum rate of $R_G$ groups per unit time. Each of the groups corresponds to a respective one of the spatial patterns. The sequence of spatial patterns is configured so that M of said groups are usable to construct an N-pixel image representing the incident light stream.

In some embodiments, M is greater than one and less than or equal to N/L.

In some embodiments, M is less than N/L.

In some embodiments, the value of L is selected to achieve an acquisition time for the M groups that is less than or equal to a target acquisition time.

In some embodiments, the circuitry 2540 is configured to read the groups at a maximum rate of $R_G$ groups per unit time, where each of the groups corresponds to a respective one of the spatial patterns. The sequence of spatial patterns is configured so that subsets of the groups, each being M groups in length, are usable to construct respective N-pixel images. M is greater than one and less than or equal to N/L. The integer L may be selected so that a rate of acquisition of the group subsets is greater than or equal to a target acquisition rate.

In some embodiments, the circuitry 2540 is included in a readout integrated circuit (ROIC), e.g., a ROIC as variously described above. In one embodiment, the array of L light sensing elements is included in a second integrated circuit. The readout integrated circuit may be bump bonded to the second integrated circuit.

In some embodiments, the circuitry 2540 and the array of light sensing elements 2540 are included in a single integrated circuit. In one embodiment, the single integrated circuit is implemented using CMOS technology. For example, the single integrated circuit may be a CMOS image sensor.

FPA-Based Compressive-Imaging Device

In one set of embodiments, the plurality of light sensing devices 640 of system 600 are incorporated (integrated) in a focal plane array (FPA). At least in this context the light sensing devices may be referred to as "elements". The FPA might have any of a wide variety of resolutions, e.g., any resolution of the form $L_x \times L_y$, with $L_x$ and $L_y$ being integers greater than or equal to two. Typical examples of FPA resolution might include 8×8, 16×16, 32×32, 64×64, 128×128, 256×256, 320×256, 640×480, etc. In some embodiments, the rate $R_G$ at which sample groups can be read from the FPA may be slower (e.g., considerably slower) than the maximum pattern modulation rate $R_P$ of the light modulation unit 110, especially when the FPA is large. A sample group may include one sample for each of the light sensing elements in the FPA. Thus, for an FPA with resolution $L_x \times L_y$, each sample group may include $L=L_x*L_y$ samples.

Figure 26A:
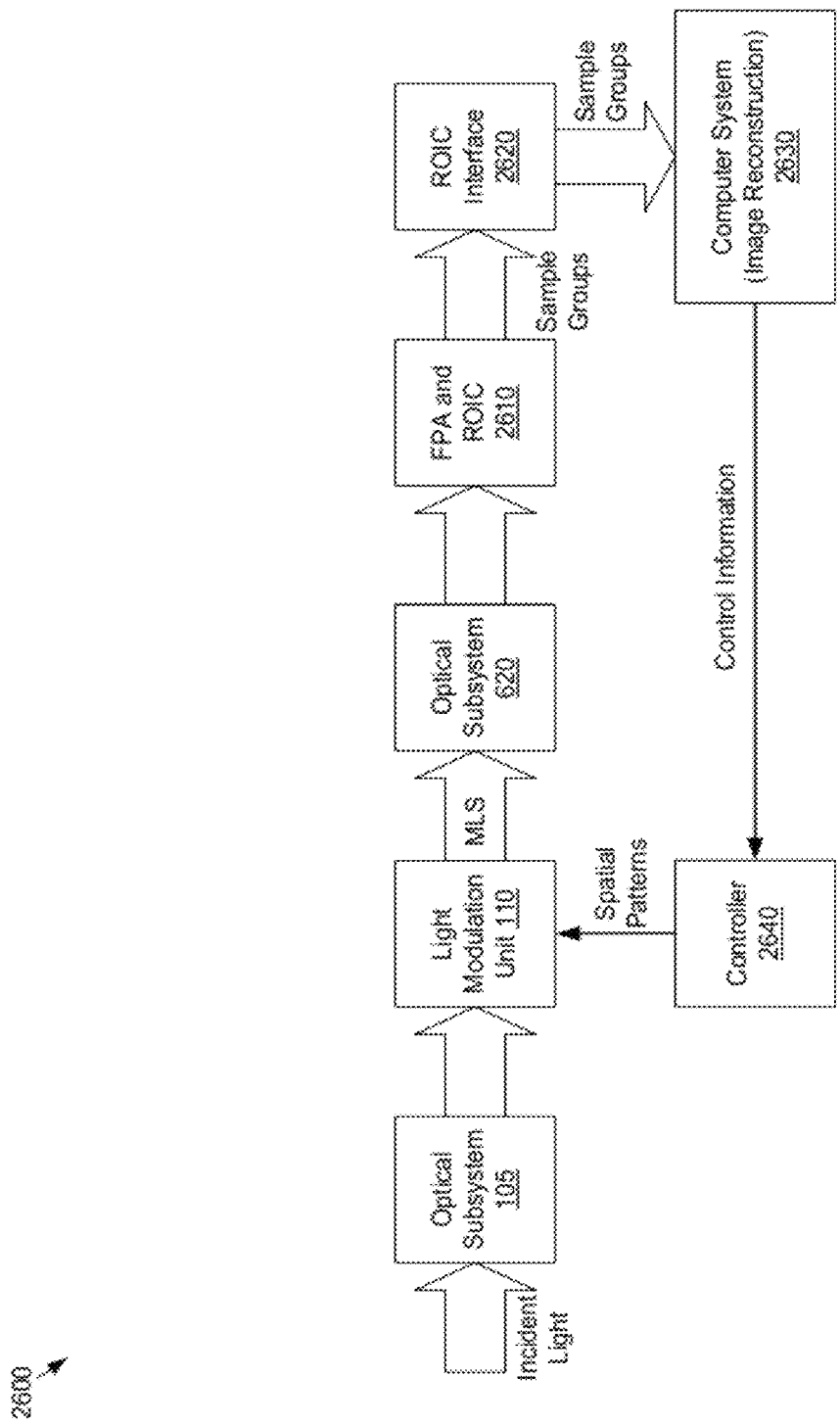
FIG. 26A illustrates one embodiment of a system 2600 for performing compressive imaging.

FIG. 26A shows a conceptual diagram for one embodiment of an FPA-based compressive imaging system 2600. (Imaging system 2600 may also include any subset of the features, embodiments and elements discussed above and below.)

The incident light stream is received by the optical subsystem 105 (e.g., a camera lens) and focused upon the light modulation unit 110 (e.g., a Texas Instruments DLP® micromirror device). The light modulation unit includes an array of N light modulating elements. Each of the N light modulating elements may correspond to an image pixel in the final reconstructed image, so that the pixel count of the final reconstructed image may be determined by the element-count N of the light modulation unit and not the element-count L of the FPA. The light modulation unit 110 receives the incident light stream from the optical subsystem 105 and modulates the incident light stream with sequence of spatial patterns to obtain a modulated light stream MLS, e.g., as variously described above. (In the case of a DLP, the incident light stream is modulated by micromirrors.) The modulated light stream MLS may be focused onto the FPA by the optical subsystem 620, e.g., as variously described above. The FPA has an element count L that is smaller than the element count N of the light modulation unit 110.

The readout integrated circuit (ROIC) reads sample groups from the FPA. The sample groups may be supplied to the computer system 2630 via ROIC interface unit 2620. In some embodiments, the FPA and ROIC may be combined to form a hybrid structure 2610, e.g., by coupling or bonding the two integrated circuits together. The computer system 2630 may operate on a set of the sample groups to reconstruct an N-pixel pixel image. In particular, the computer system 2630 may partition the samples in the sample groups into L sample subsets corresponding respectively to the L light sensing devices, and then reconstruct L sub-images of size N/L based on the respective sample subsets. The L sub-images are then joined together to form the final N-pixel image.

In some embodiments, the system 2600 may acquire sample groups continuously to support video acquisition.

The computer system 2630 may also supply control information to a controller 2640 (e.g., an FPGA-based controller). The controller 2640 controls the light modulation unit, e.g., supplies the sequence of spatial patterns to the light modulation unit 110.

The optical subsystem 620 focuses the modulated light stream onto the FPA so that light from subsets of the array of light modulating elements are received at respective light modulating elements of the FPA. The subsets may be non-overlapping and cover the array of light modulating elements. Each subset may be a contiguous collection of the light modulating elements. For example, in one embodiment, the number of light sensing elements L equals N/9, and the array of light modulating elements is partitioned into 3×3 subsets. Each light sensing element receives light from a respective one of the 3×3 subsets. The samples from each light sensing element are used to reconstruct a respective 9-pixel sub-image. The N/9 sub-images of pixel count 9 are joined together to form the final N-pixel image. Thus, in this embodiment, the system 2600 acquires images that have nine times the resolution of the FPA. Because the pixel count of each sub-image is so small (in this case, equal to 9), the number of samples of each light sensing device required to reconstruct the corresponding 9-pixel sub-image is nine (or perhaps, more than nine in the presence of noise); one experiences no compressive sensing gain. Thus, nine sample groups may be used to reconstruct the entire N-pixel image, and the frame rate (compressed images per second) of the imaging system 2600 is nine times slower than the group rate $R_G$ of the FPA.

The sequence of spatial patterns used to drive the light modulation unit 110 may include nine (or more) spatial patterns. The nine spatial patterns are designed so the restriction of the nine spatial patterns to each subset of the light modulating array gives nine 3×3 patterns that are usable to reconstruct the corresponding 9-pixel sub-image from the nine corresponding samples of the respective electrical signal. For example, in one embodiment, the nine 3×3 patterns correspond to the nine Euclidean basis elements on $R^9$ (nine-dimensional Euclidean space.) Or equivalently, the nine 3×3 patterns each have a different one of the nine light sensing elements turned ON and the remaining eight elements turned OFF. More generally, the nine 3×3 patterns may be defined by any 9×9 invertible matrix, where each of the nine 3×3 patterns corresponds to a different row of the 9×9 invertible matrix.

In some embodiments, each of the nine spatial patterns is spatially periodic, based on the periodic repetition of a corresponding 3×3 pattern. Thus, nine 3×3 patterns may be used to generate the nine spatial patterns.

More generally, the array of light modulating elements may be partitioned into subsets of size $Q_x \times Q_y$, where $Q_x$ and $Q_y$ are positive integers such that $Q=Q_x*Q_y$ is greater than or equal to two. Thus, the number of light sensing elements in the FPA is L=N/Q. Each light sensing element receives light from a respective one of the $Q_x \times Q_y$ subsets. The samples from each light sensing element are used to reconstruct a respective Q-pixel sub-image. The N/Q sub-images of pixel count Q are joined together to form the final N-pixel image. Thus, the system 2600 acquires images that have Q times the resolution of the FPA. If Q is small, the number of samples m of each light sensing device used to reconstruct the corresponding Q-pixel sub-image may be Q or close to Q (or more than Q in the presence of noise). As Q increases, the ratio m/Q decreases because one begins to see the benefit of compressive sensing gain. Thus, Q or fewer sample groups may be used to reconstruct the entire N-pixel image, and the ratio $R_G/Q$ may be taken as a lower bound for the image frame rate (compressed images per second) of the imaging system 2600, where $R_G$ is the group rate of the FPA. If oversampling by factor $c_{OS>}1$ is being employed the lower bound would be inversely scaled: lower bound=$R_G/(c_{OS}Q)$.

In some embodiments, the sequence of spatial patterns used to drive the light modulation unit 110 may include m spatial patterns. The m spatial patterns are designed so the restriction of the m spatial patterns to each subset of the light sensing array gives m patterns of size $Q_x \times Q_y$ that are usable to reconstruct the corresponding Q-pixel sub-image from the m corresponding samples of the respective electrical signal. If Q is small, e.g., less than 64, m may be set equal to Q, and the m patterns of size $Q_x \times Q_y$ may correspond to the Q Euclidean basis elements on $R^Q$, or more generally, to the rows of any Q×Q invertible matrix. If Q is not small, the m patterns of size $Q_x \times Q_y$ may correspond to the rows of any set of m vectors in $R^Q$ that are incoherent relative to the reconstruction vector set to be used for reconstructing the $Q_x \times Q_y$ sub-image.

The table given in FIG. 26B shows possible image frame rates and image resolutions for various FPA sizes, assuming that the FPA has a group rate of 120 groups per second or 200 groups per second. (Frame rate scales with FPA group rate.) Additionally, as the number Q of light modulating elements per FPA element increases to 64 or more, frames rates can be increased by a factor of approximately two because the number of sample groups per image frame can be decreased. While the table assumes the light modulation unit is a DMD, the results given are generally applicable to any type of light modulation unit having N light modulating elements.

In some embodiments, the imaging system 2600 can also be dynamically shifted between different settings of image-resolution vs. frame-rate. For example, using a 32×32 FPA, the imaging system can operate at either 128×128 resolution and 7.5 FPS, or at 192×192 resolution and 3.3 FPS. (FPS is an acronym for "frame per second".)

In some embodiments, the imaging system 2600 may perform image processing on the sample groups prior to image reconstruction. For example, hot spots may be identified in the incident light field based on analysis of the sample groups, and then the identified hot spots may be attenuated or nulled by appropriate control of the spatial patterns. As another example, an object may be tracked based on an analysis of the sample groups. The result of the tracking may be used to control actuators that adjust of the orientation of the camera, e.g., in real time.

Method for Designing a CI Device when Pattern Rate Limited

In one set of embodiments, a computer-implemented method 2700 for designing a compressive-imaging device may involve the actions shown in FIG. 27A. The method may be performed by a computer system, e.g., a computer system including one or more microprocessors.

At 2710, the computer system may receive information specifying a target effective rate $R_I$ of acquisition of N-pixel images for the compressive-imaging device, where N is a number of light modulating elements in a light modulation unit to be included in the compressive-imaging device. For example, the target effective rate may be specified by user input.

The target rate is referred to as being an "effective" image acquisition rate because the compressive-imaging device does not acquire the n-pixel images directly. Rather the compressive-imaging device is configured to acquire sample sets that are usable to reconstruct the respective n-pixel images. Until the n-pixel images are reconstructed from the sample sets, the n-pixel images exist only as transient patterns of light that traverse the optical pathway of the compressive-imaging device.

At 2720, the computer system may determine (e.g., compute) a value for each of variables $R_P$ and L such that $R_P/f(N/L)$ is greater than or equal to the target effective rate $R_I$, where $R_P$ is a maximum pattern modulation rate of the light modulation unit, where L is a number of light sensing devices to be included in the compressive-imaging device. The function f is a function that maps a positive integer value v to a corresponding number f(v), where f(v) is greater than or equal to a minimum number of compressive sensing samples required to reconstruct a v-pixel image.

The function f may have any of a wide variety of functional forms. In some embodiments, the function f may be empirically derived. In some embodiments, the function f may depend on one or more factors such as: the targeted accuracy of reconstruction of the N-pixel images; the class of spatial patterns to be used to drive the light modulation unit; the sparsity-index value of the N-pixel images; etc.

In one embodiment, the function f may conform to the expression $$f(N/L)=M_N/L,$$

where $M_N$ is greater than or equal to a minimum number of compressive sensing samples required to reconstruct a generic N-pixel image, e.g., with given accuracy.

In another embodiment, the function f may have the form:

$$f(v)=c*K_N*\log(v),$$

where c is a positive constant, where $K_N$ is a sparsity index value associated with the generic N-pixel image.

In yet another embodiment, the function f may have the form:

$$f(v)=c*K_v*\log(v),$$

where c is a positive constant, where $K_v$ is a sparsity index value associated with a generic v-pixel image.

At 2730, the computer system may store the determined values of the variables $R_P$ and L in a memory. The determined values of $R_P$ and L at least partially specify a design for the compressive-imaging device.

In some embodiments, the method 2700 may also include displaying the determined value of the variable L and/or the determined value of the variable $R_P$.

In some embodiments, the action of determining a value for each of the variables $R_P$ and L includes: receiving input (e.g., user input) specifying the value for $R_P$; and selecting a minimum value of the variable L subject to the condition that $R_P/f(N/L)$ is greater than or equal to rate $R_I$.

In some embodiments, the action of determining a value for each of the variables $R_P$ and L includes: receiving input (e.g., user input) specifying the value for L, where the specified value of L is greater than one; and selecting a minimum value of the variable $R_P$ subject to the condition that $R_P/f(n/L)$ is greater than or equal to rate $R_I$.

In some embodiments, the function f depends on a selection of a class of spatial patterns to be used by the compressive-imaging device. In one embodiment, the method 2700 also includes receiving user input specifying the class of spatial patterns.

In some embodiments, the function f depends on a target accuracy with which the N-pixel images are to be reconstructed. In one embodiment, the method 2700 also includes receiving user input specifying the target accuracy.

In some embodiments, the function f depends on a specified sparsity index value $K_N$ for the N-pixel images. In one embodiment, the method 2700 includes receiving user input specifying the sparsity index value $K_N$.

In some embodiments, the method 2700 may also include constructing the compressive-imaging device so that the compressive-imaging device includes: the light modulation unit with the N light modulating elements, and the determined number L of light sensing devices, where each of the determined number L of light sensing devices is configured to receive light from a corresponding subset (or subregion) of the N light modulating elements, e.g., as variously described above.

Method 2750

In one set of embodiments, a computer-implemented method 2750 for designing a compressive-imaging device may involve the actions shown in FIG. 27B. The method may be performed by a computer system.

At 2760, the computer system may receive information (e.g., user input) specifying a target effective rate $R_I$ of acquisition of n-pixel images for the compressive-imaging imaging device, where n is less than or equal to a number N of light modulating elements in a light modulation unit to be included in the compressive-imaging device.

At 2770, the computer system may determine (e.g., compute) a value for each of variables $R_P$, L and n such that $R_P/f(n/L)$ is greater than or equal to the target effective rate $R_I$, where $R_P$ is a maximum pattern modulation rate of the light modulation unit, where L is a number of light sensing devices to be included in the compressive-imaging device, where f is a function that maps a positive integer value v to a corresponding number f(v), where f(v) is greater than or equal to a minimum number of compressive sensing samples required to reconstruct a v-pixel image. The function f may have any of the features or any combination of the features described above.

At 2780, the computer system may store the determined values of the variables $R_P$, L and n in a memory. In some embodiments, the method 2750 may also include displaying one or more of the determined values, e.g., at least the determined value of the variable L.

In some embodiments, the action of determining a value for each of the variables $R_P$, L and n includes: receiving input (e.g., user input) specifying the values for $R_P$, L and N; and selecting (or computing) a maximum value of the variable n subject to the condition that $R_P/f(n/L)$ is greater than or equal to rate $R_I$ and the condition that n is less than or equal to N.

In some embodiments, the action of determining a value for each of the variables $R_P$, L and n includes: receiving input (e.g., user input) specifying the values for $R_P$ and n; and selecting a minimum value of the variable L subject to the condition that $R_P/f(n/L)$ is greater than or equal to rate $R_I$.

In some embodiments, the action of determining a value for each of the variables $R_P$, L and n includes: receiving input specifying the values for L and n, where the specified value of L is greater than one; and selecting a minimum value of the variable $R_P$ subject to the condition that $R_P/f(n/L)$ is greater than or equal to rate $R_I$.

In some embodiments, the function f depends on a selection of a class of spatial patterns to be used by the compressive-imaging device. In one embodiment, the method 2750 includes receiving user input specifying the class of spatial patterns.

In some embodiments, the function f depends on a target accuracy with which the n-pixel images are to be reconstructed. In one embodiment, the method 2750 also includes receiving user input specifying the target accuracy.

In some embodiments, the function f depends on a specified sparsity index value $K_n$ for the n-pixel images. In one embodiment, the method 2750 includes receiving user input specifying the sparsity index value $K_n$.

In some embodiments, the method 2750 may also include constructing the compressive-imaging device so that the compressive-imaging device includes: the light modulation unit with N light modulating elements, and the determined number L of light sensing devices. Each of the determined number L of light sensing devices is configured to receive light from a corresponding subset (or subregion) of the N light modulating elements, e.g., as variously described above.

Method for Designing a CI Device when Limited by Sample Group Rate from an Array of Light Sensing Devices In one set of embodiments, a computer-implemented method 2800 for designing a compressive-imaging device may involve the actions shown in FIG. 28A. The method 2800 may be performed by a computer system, e.g., a computer system including one or more microprocessors.

At 2810, the computer system may receive information (e.g., user input) specifying a target effective rate $R_I$ of acquisition of N-pixel images for the compressive-imaging device, where N is a number of light modulating elements in a light modulation unit to be included in the compressive-imaging device.

At 2820, the computer system may determine a value for each of variables $R_G$ and L such that $R_G/f(N/L)$ is greater than or equal to $R_I$, where $R_G$ is a maximum number of sample groups per second to be acquired from an array of L light sensing devices to be included in the compressive-imaging device, where each sample group by definition includes one sample from each of the L light sensing devices. The function f is a function that maps a positive integer value v to a corresponding number f(v), where f(v) is greater than or equal to a minimum number of compressive sensing samples required to reconstruct a v-pixel image. The function f may have any of the features or any combination of the features described above. In one embodiment, the function f may be the identity function: f(v)=v. The identity function may be used, e.g., when n/L is small.

At 2830, the computer system may store the determined values of the variables $R_G$ and L in a memory. The determined values of $R_G$ and L at least partially specify a design for the compressive-imaging device.

In some embodiments, the method 2850 may also include displaying the determined value of the variable L and/or the determined value of the variable $R_G$.

In some embodiments, the action of determining a value for each of the variables $R_G$ and L may include: receiving input (e.g., user input) specifying the value for $R_G$; and selecting a minimum value of the variable L subject to the condition that $R_G/f(N/L)$ is greater than or equal to rate $R_I$.

In some embodiments, the action of determining a value for each of the variables $R_G$ and L may include: receiving input (e.g., user input) specifying the value for L, where the specified value of L is greater than one; and selecting a minimum value of the variable $R_G$ subject to the condition that $R_G/f(N/L)$ is greater than or equal to rate $R_I$.

In some embodiments, the function f depends on a selection of a class of spatial patterns to be used by the compressive-imaging device. In one embodiment, the method 2800 also includes receiving user input specifying the class of spatial patterns.

In some embodiments, the function f depends on a target accuracy with which the N-pixel images are to be reconstructed. In one embodiment, the method 2800 also includes receiving user input specifying the target accuracy.

In some embodiments, the method 2800 may also include constructing (assembling or manufacturing) the compressive-imaging device so that the compressive-imaging device includes: the light modulation unit with the N light modulating elements, and the array of L light sensing devices, where the value of L agrees with the determined value of L. Each of the L light sensing devices is configured to receive light from a corresponding subset (or subregion) of the N light modulating elements, e.g., as variously described above.

Method 2850

In one set of embodiments, a computer-implemented method 2850 for designing a compressive-imaging device may involve the actions shown in FIG. 28B. The method 2850 may be performed by a computer system.

At 2860, the computer system may receive information (e.g., user input) specifying a target effective rate $R_T$ of acquisition of n-pixel images for the compressive-imaging device, where n is less than or equal to N, where N is a number of light modulating elements in a light modulation unit to be included in the compressive-imaging device.

At 2870, the computer system may determine a value for each of variables $R_G$, L and n such that $R_G/f(n/L)$ is greater than or equal to $R_T$, where $R_G$ is a maximum number of sample groups per second to be acquired from an array of L light sensing devices to be included in the compressive-imaging device, where each sample group by definition includes one sample from each of the L light sensing devices. The function f is a function that maps a positive integer value v to a corresponding number f(v), where f(v) is greater than or equal to a minimum number of compressive sensing samples required to reconstruct a v-pixel image. The function f may have any of the features or any combination of the features described above.

At 2880, the computer system may store the determined values of the variables $R_G$, L and n in a memory.

In some embodiments, the method 2850 may also include displaying one or more of the determined values.

In some embodiments, the action of determining a value for each of the variables $R_G$, L and n may include: receiving input (e.g., user input) specifying the values for $R_G$, L and N; and selecting a maximum value of the variable n subject to the condition that $R_G/f(n/L)$ is greater than or equal to rate $R_T$ and the condition that n is less than or equal to N.

In some embodiments, the action of determining a value for each of the variables $R_G$, L and n may include: receiving input (e.g., user input) specifying the values for $R_G$ and n; and selecting a minimum value of the variable L subject to the condition that $R_G/f(n/L)$ is greater than or equal to rate $R_T$.

In some embodiments, the action of determining a value for each of the variables $R_G$, L and n may include: receiving input (e.g., user input) specifying the values for L and n, where the specified value of L is greater than one; and selecting a minimum value of the variable $R_G$ subject to the condition that $R_G/f(n/L)$ is greater than or equal to rate $R_T$.

In some embodiments, the function f depends on a selection of a class of spatial patterns to be used by the compressive-imaging device. In one embodiment, the method 2850 includes receiving user input specifying the class of spatial patterns.

In some embodiments, the function f depends on a target accuracy with which the n-pixel images are to be reconstructed. In one embodiment, the method 2850 also includes receiving user input specifying the target accuracy.

In some embodiments, the method 2850 may also include constructing the compressive-imaging device so that the compressive-imaging device includes: the light modulation unit with the N light modulating elements, and the array of L light sensing devices, where the value of L agrees with the determined value of L, where each of the L light sensing devices is configured to receive light from a corresponding subset (or subregion) of the N light modulating elements, e.g., as variously described above.

Parallel Light Modulation Units Operating on Subregions of the Incident Beam

Figure 29A:
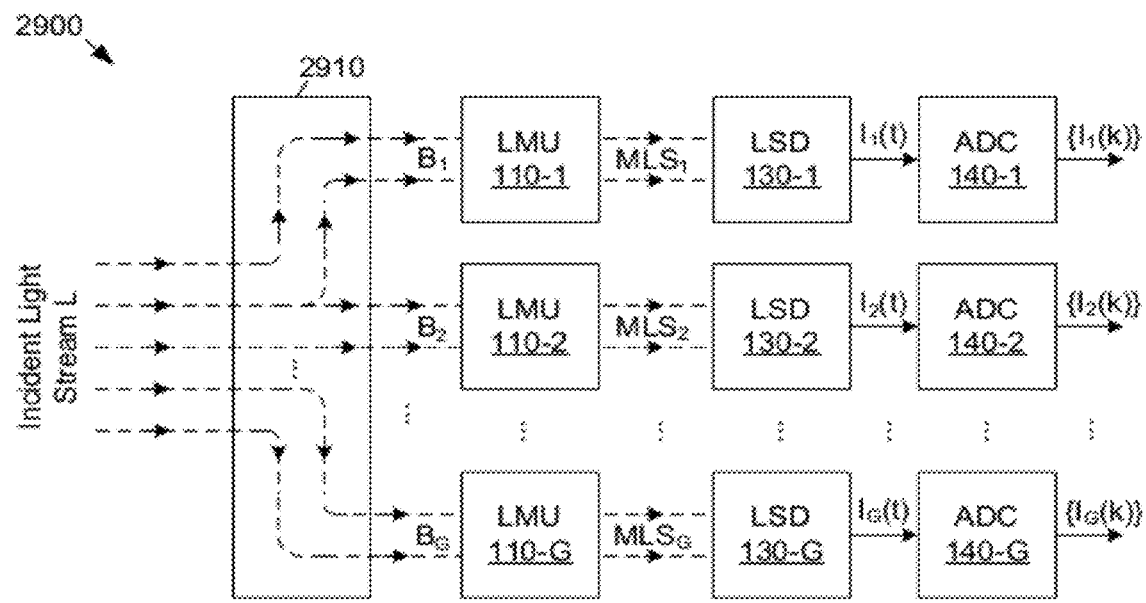
FIG. 29A illustrates one embodiment of a system 2900 that involve spatially separating the incident light beam to a number of sub-streams prior to modulation.

In one set of embodiments, a system 2900 for operating on light may be configured as shown in FIG. 29A. The system may include of a pre-modulation optical subsystem 2910, a plurality of light modulation units 110-1 through 110-G, a plurality of light sensing devices 130-2 through 130G, and a plurality of analog-to-digital converters (ADCs) 140-1 through 140-G. (In addition, system 2900 may include any subset of the features, embodiments and elements discussed above.)

The pre-modulation optical subsystem 2910 may be configured to receive an incident light stream and separate the incident light stream into a plurality of light substreams $B_1$, $B_2$, ..., $B_G$. The light substreams correspond respectively to non-overlapping regions of the incident light stream. The regions may cover the cross section of the incident light stream. Each of the regions of the incident light stream may be a contiguous region (or a simply connected region as described above).

In some embodiments, the pre-modulation optical subsystem 2910 includes one or more mirrors. In some embodiments, the pre-modulation optical subsystem includes one or more prisms. In some embodiments, the pre-modulation optical subsystem includes one or more beam splitters. In some embodiments, the pre-modulation optical subsystem includes an optical device having a plurality of facets. In some embodiments, the pre-modulation optical subsystem includes one or more mirrors, and/or, one or more prisms, and/or, one or more beam splitters, and/or, one or more faceted optical devices.

The light modulation units 110-1 through 110-G may be configured to respectively modulate the light substreams in order to generate respective modulated light substreams $MLS_1$, $MLS_2$, ..., $MLS_G$. Each of the light modulation units is configured to modulate the respective light substream with a respective sequence of spatial patterns in order to produce the respective modulated light substream. Each of the light modulation units includes a respective array of light modulating elements, e.g., as variously described above. Each of the light modulation units may be a copy of (or similar to) the light modulation unit 110, as variously described above.

In some embodiments, the sequences of spatial patterns are identical sequences, i.e., each light modulation unit uses the same sequence of spatial patterns. Alternatively, each of the sequences may be different. The light sensing devices 130-1 through 130-G may be configured to respectively receive the modulated light substreams and generate respective electrical signals $I_1(t)$, $I_2(t)$, ..., $I_G(t)$. The electrical signal generated by each light sensing device represents intensity of the respective modulated light substream as a function of time.

Each of the ADCs 140-1 through 140-G may be configured to configured to capture a sequence of samples of the electrical signal generated by a respective one of the light sensing devices. The sample sequence captured by each ADC is usable to construct a respective sub-image representing a respective one of the regions of the incident light stream. The sub-images may be joined together to form a final image that represents the incident light stream over the time interval of acquisition.

Since the final image is divided into sub-images, each sub-image can be treated independently, that is, measured and reconstructed in parallel. Since each sub-image has fewer pixels than the entire image, fewer measurements are required, reducing data acquisition time. Reconstruction computations may be performed in parallel so that computation time is not increased.

In some embodiments, the system 2900 may also include a plurality of post-modulation optical subsystems configured to direct light from respective ones of the modulated light substreams onto respective ones of the light sensing devices. For example, each optical subsystem may be configured as described above in connection with optical subsystem 117.

In some embodiments, each of the light sensing devices 130-1 through 130-G is realized by a corresponding plurality (or array) of light sensing elements. Thus, each post-modulation optical subsystem may be configured as described above in connection with optical subsystem 640 in order to deliver light from subsets of the corresponding modulated light stream onto the respective light sensing elements, as variously described above.

Figure 29B:
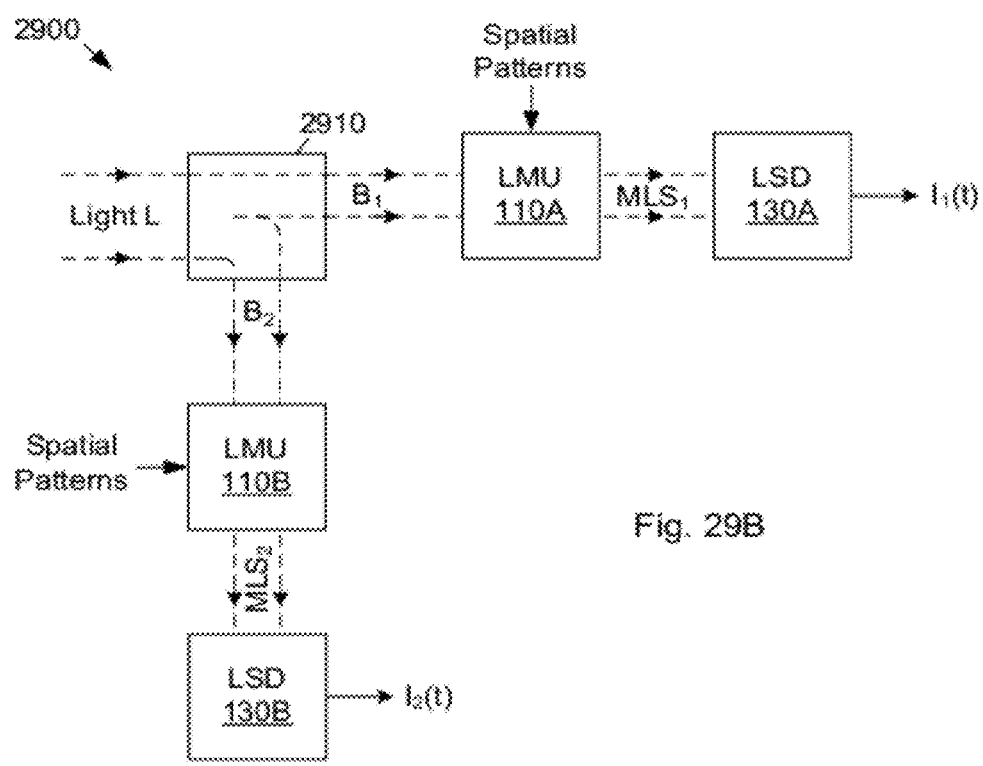
FIG. 29B illustrates an embodiment of system 2900 where the incident beam is separated into two sub-streams.

FIG. 29B shows a special case of system 2900 in the case G=2.

Figure 30A:
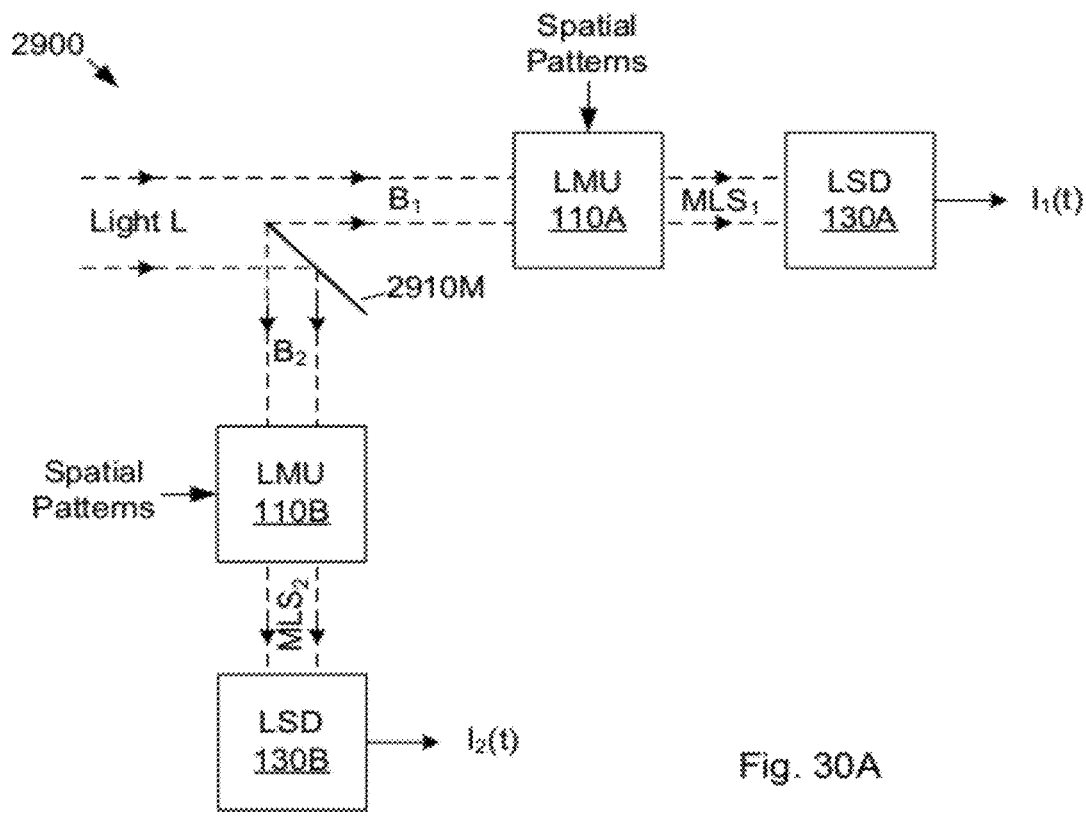
FIG. 30A shows a mirror 2910M being used to separate the incident light stream into two sub-streams.
Figure 30B:
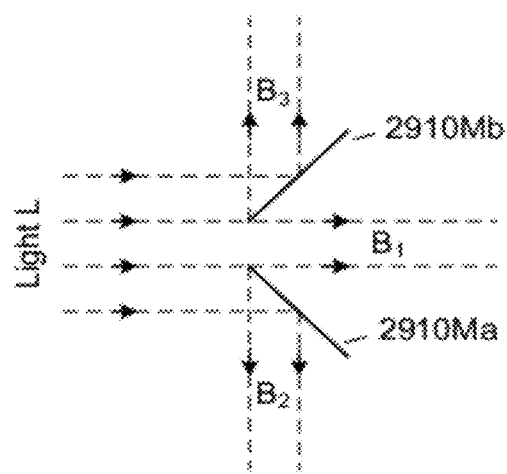
FIG. 30B shows mirrors 2910Ma and 2910Mb being used to separate the incident light stream into three sub-streams.

FIG. 30A shows the premodulation optical subsystem 2910 being realized by a mirror 2910M that is positioned so that it intercepts half of the incident light stream L. The other half passes unimpeded. The intercepted half is reflected to light modulation unit 110B. The other half is supplied to light modulation unit 110A. This principle generalizes to any number of mirrors. For example, FIG. 30B shows two mirrors 2910Ma and 2910Mb uses to separate the incident light stream L into three portions. Also, a set of two or more mirrors may be used to achieve multiple stages of separation. For example, the sub-stream $B_1$ in FIG. 30B may be further separated by one or more additional mirrors.

Figure 31A:
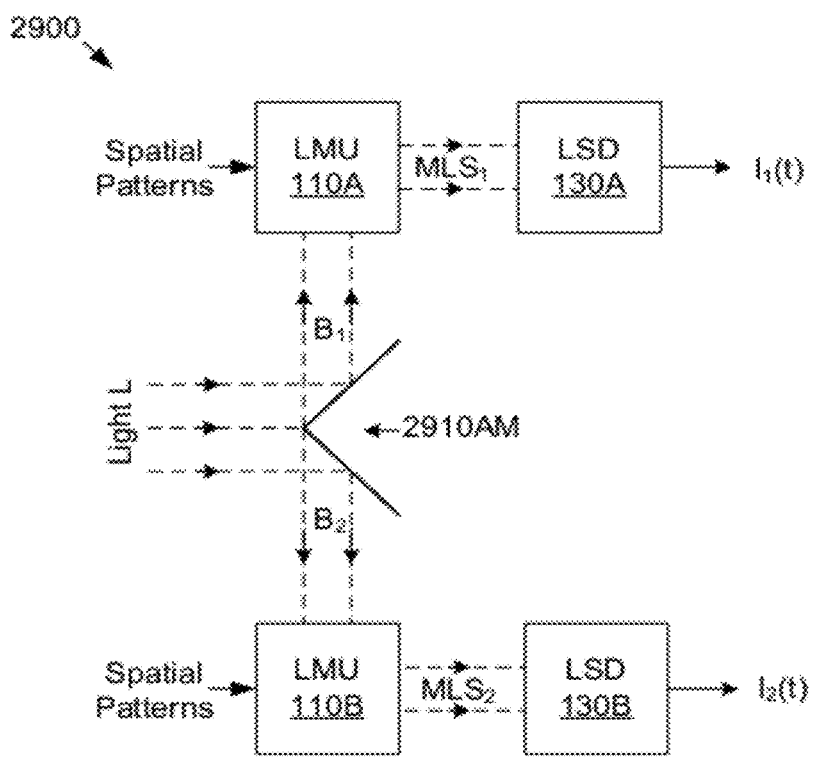
FIG. 31A shows an angled mirror being used to separate the incident light stream into two sub-streams.
Figure 31B:
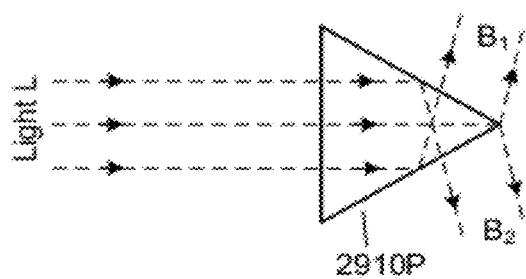
FIGS. 31B and 31C show two different ways prisms might be used to separate the incident light stream into two sub-streams.
Figure 31C:
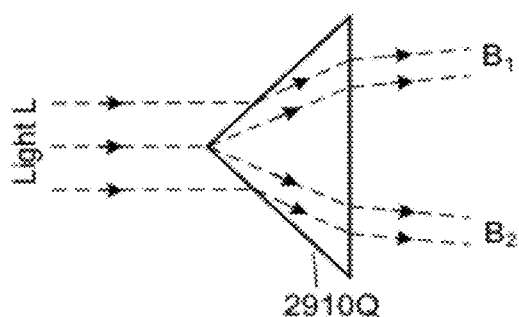

FIG. 31A shows premodulation optical subsystem 2910 being realized by an angled mirror 2910AM configured to separate the incident light stream into two light sub-streams. FIG. 31B shows an alternative embodiment where prism 2910P separates the incident light beam based on total internal reflection at two surfaces of the prism. FIG. 31 C shows another alternative based on a prism 2910Q.

FIG. 32A shows premodulation optical subsystem 2910 being realized by an object (or device) 2910C having reflective faces (or facets) that meet at a point P. For example, a cube having three mirrored faces meeting at point P may be used to separate the incident light stream L into three light sub-streams. Representative rays $R_1$, $R_2$ and $R_3$ are shown being reflected from corresponding faces. FIG. 32B shows the pattern of separation as seen along the axis of the incident light stream. This principle of separation generalizes to objects having more than three faces meeting at a point. For example, a tetrahedron has four faces meeting an apex, and thus, may be used to separate the incident light stream into four substreams.

In one set of embodiments, a method 3300 for operating on light may involve the actions shown in FIG. 33.

Action 3310 includes separating an incident light stream into a plurality of light substreams, e.g., as variously described above. The light substreams correspond respectively to non-overlapping regions of the incident light stream, e.g., as variously described above.

Action 3320 includes modulating the light substreams in order to produce respective modulated light substreams. Each of the light substreams is modulated by a respective one of a plurality of light modulation units, e.g., light modulation units as variously described above. Each of the light modulation units includes a corresponding array of light modulating elements. The action of modulating the light substreams includes modulating each of the light substreams with a respective sequence of spatial patterns (e.g., as variously described above) in order to produce the respective modulated light substream.

Action 3330 includes directing light from each of the modulated light substreams onto a respective one of a plurality of light sensing devices (e.g., light sensing devices as variously described above). Various techniques for directing light are described above.

Action 3340 includes generating electrical signals, e.g., as variously described above. Each of the electrical signals is generated by a respective one of the light sensing devices. The electrical signal generated by each light sensing device represents intensity of the respective modulated light stream as a function of time.

Action 3350 includes acquiring from each of the light sensing devices a respective sequence of samples of the respective electrical signal. Each sample sequence is usable to construct a respective sub-image representing a respective one of the regions of the incident light stream.

Figure 34A:
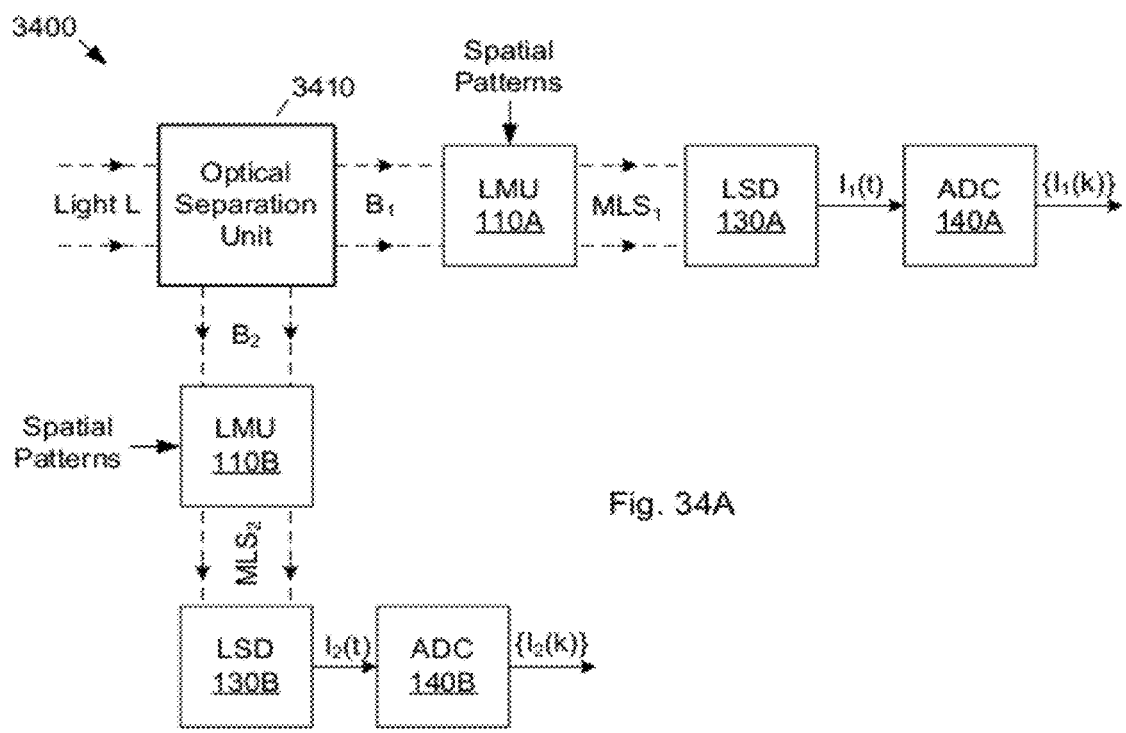
FIG. 34A illustrates one embodiment of a system 3400 that splits the incident light stream into two streams that contain the same image information, and parallelizes the acquisition of samples for the common image.

Pre-Modulation Separation of the Incident Light Stream into Multiple Streams that Carry the Same Image as the Incident Light Stream In one set of embodiments, a system 3400 may be configured as shown in FIG. 34A. System 3400 includes an optical separation unit 3410, light modulation units 110A and 100B, light sensing devices 130A and 130B, and ADCs 140A and 140B. (In addition, system 3400 may include any subset of the features, embodiments and elements discussed above in connection with system 100, system realization 200 and system 600.)

Optical separation unit 3410 separates the incident light stream L into two light streams $B_1$ and $B_2$. Each of the two light streams $B_1$ and $B_2$ may carry the same image carried by the incident light stream. In other words, each of the two light streams B1 and $B_2$ may carry a copy (at lower intensity) of the image present in the modulated light stream (perhaps up to a transformation such as mirror reflection or scaling).

In some embodiments, approximately 50% of the incident light power goes to each of streams $B_1$ and $B_2$. The light modulation units 110A and 110B respectively modulate the streams $B_1$ and $B_2$ with respective sequences of spatial patterns in order to obtain respective modulated light streams $MLS_1$ and $MLS_2$. The light sensing devices 130A and 130B respectively generate electrical signals $I_1(t)$ and $I_2(t)$. Each electrical signal represents intensity of the respective modulated light stream as a function of time. The ADCs 140A and 140B acquire samples of the respective electrical signals. Each ADC acquires a respective sequence of samples of the respective electrical signal. In other words, ADC 140A acquires a sequence of samples $\{I_1(k)\}$ of the electrical signal $I_1(t)$, and ADC 140B acquires a sequence of samples $\{I_2(k)\}$ of the electrical signal $I_2(t)$. The two sample sequences may be used to construct an image representing the incident light stream L over the time interval of acquisition. (The image construction operation may be performed by system 3400 or by some other remote system.) If the image carried by light stream $B_j$, j=1 or 2, is related to the image in the incident light stream by a given transformation (e.g., mirror reflection), the image construction algorithm may be configured to account for that transformation, e.g., by applying the inverse transformation to the corresponding sequence of spatial patterns, i.e., to the spatial patterns that produce the sample sequence $\{I_j(k)\}$.

In some embodiments, each light modulation unit may have the same number N of light modulating elements. (However, alternative embodiments are contemplated where this is not the case.) Thus, the reconstructed image may be of pixel count N or less. Recall that a light modulating element with N light modulating elements may be operated at a lower effective resolution n<N, if desired.

The two post-separation branches (each comprising a light modulation unit, light sensing device and ADC) may operate in parallel. For example, each light modulation unit may modulate its respective light stream with spatial patterns at a common pattern rate, e.g., being driven by a common pattern clock. Furthermore, each ADC may acquire samples at a common sampling rate.

Because system 3400 has two post-separation branches, with each branch acquiring compressive-sensing samples (inner products) of the same image, the amount of time required to acquire the compressed representation of the image is decreased by a factor of two, provided each light modulation unit uses different spatial patterns. In other words, the two sequences of spatial patterns preferably have no (or only a small percentage of) spatial patterns in common.

In alternative embodiments, light streams $B_1$ and $B_2$ carry different spectral portions of the image carried by the incident light stream.

Figure 34B:
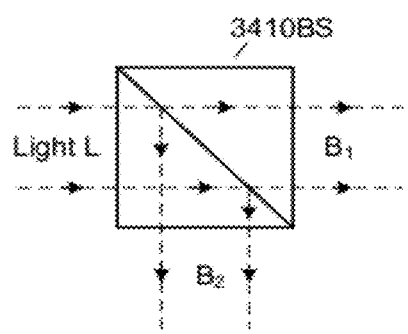
FIG. 34B illustrates one embodiment of the optical separation unit 3410, as a beam splitter.

FIG. 34B shows the optical separation unit 3410 being realized as a beam splitter 3410BS. However, a wide variety of other realizations are possible. For example, in other embodiments, optical separation unit 3410 may be realized by one or more of the following: branched fiber-optic bundles, color separation prisms, holographic optical elements, diffraction gratings, Dammann gratings and Fourier array generators.

System 3500

Figure 35:
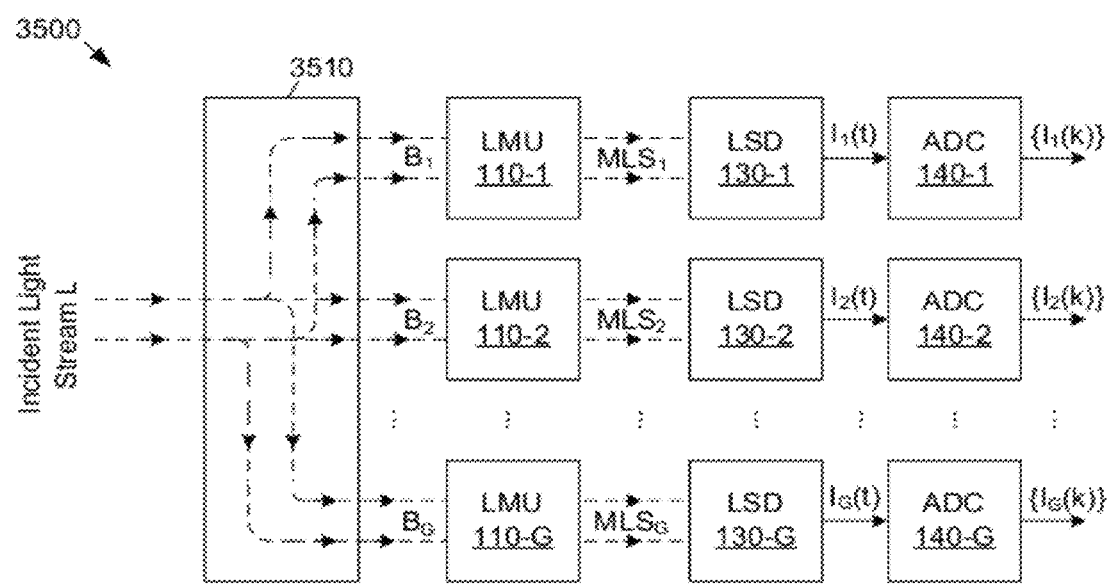
FIG. 35 illustrates one embodiment of a system 3500 that splits the incident light stream into G streams that contain the same image information, and parallelizes the acquisition of samples for the common image.

In one set of embodiments, a system 3500 may be configured as shown in FIG. 35. System 3500 includes a pre-modulation optical separation unit 3510, light modulation units 110-1 through 110-G, light sensing devices 130-1 through 130-G, and ADCs 140-1 through 140-G. (In addition, system 3500 may include any subset of the features, embodiments and elements discussed above in connection with system 100, system realization 200, system 600 and system 3400.)

Optical separation unit 3510 separates the incident light stream L into light streams $B_1$ through $B_G$. However, the separation is not a separation into spatial portions as is the case with pre-modulation optical subsystem 2910. Instead, each light stream $B_j$ carries (at lower power) the same image present in the incident light stream L.

In some embodiments, each light stream $B_j$ receives approximately the same fraction (1/G) of the power present in the incident light stream.

The light modulation units 110-1 through 110-G respectively modulate the streams $B_1$ through $B_G$ with respective sequences of spatial patterns in order to obtain respective modulated light streams $MLS_1$ through $MLS_G$. The light sensing devices 130-1 through 130-G respectively generate electrical signals $I_1(t)$ through $I_G(t)$. Each electrical signal $I_j(t)$ represents intensity of the respective modulated light stream $MLS_j$ as a function of time. The ADCs 140-1 through 140-G acquire samples of the respective electrical signals $I_1(t)$ through $I_G(t)$. Each ADC acquires a respective sequence of samples of the respective electrical signal. In other words, ADC 140-$j$ acquires a sequence of samples $\{I_j(k)\}$ of the electrical signal $I_j(t)$. The G sample sequences may be used to construct an image representing the incident light stream L over the time interval of acquisition. (The image construction operation may be performed by system 3500 or by some other remote system.) If the image carried by light stream $B_j$ is related to the image in the incident light stream by a given transformation (e.g., mirror reflection), the image construction algorithm may be configured to account for that transformation, e.g., by applying the inverse transformation to the corresponding sequence of spatial patterns, i.e., the spatial patterns that correspond the sample sequence $\{I_j(k)\}$. (The transformations may be known by calibration.) The image may be constructed using the union of the sample sequences $\{I_1(k)\}, \{I_2(k)\}, \{I_G(k)\}$ and the union of the corresponding sets of (possibly transformed) spatial patterns.

The system 3500 preferably operates in a compressive fashion, where the total number of samples in the union of the samples sets $\{I_1(k)\}, \{I_2(k)\}, \{I_G(k)\}$ is smaller than the number of pixels N in the constructed image.

In some embodiments, each light modulation unit may have the same number N of light modulating elements. (However, alternative embodiments are contemplated where this is not the case.) Thus, the reconstructed image may be of pixel count N or less. Recall that a light modulating element with N light modulating elements may be operated at a lower effective resolution n<N, if desired.

The G post-separation branches (each comprising a light modulation unit, light sensing device and ADC) may operate in parallel. For example, each light modulation unit may modulate its respective light stream with spatial patterns at a common pattern rate, e.g., being driven by a common pattern clock. Furthermore, each ADC may acquire samples at a common sampling rate, perhaps driven by a common sampling clock.

Because system 3500 has G post-separation branches, with each branch acquiring compressive-sensing samples (inner products) of the same image, the amount of time required to acquire the compressed representation of the image is decreased by a factor of G, provided each light modulation unit uses different spatial patterns. In other words, the set of spatial patterns used by any one of the light modulation units and the set of spatial patterns used by any other of the light modulation unit are preferably disjoint sets or sets having only a small percentage of overlap (intersection).

In some embodiments, system 3500 includes the optical subsystem 105 as described above. The optical subsystem 105 may positioned before the optical separation unit 3510. In other words, the incident light stream L passes through the optical subsystem 105 before encountering the optical separation unit. The optical subsystem 105 and the light modulation units 110-1 through 110-G may be positioned so that the respective light streams $B_1$ through $B_G$ are in focus at the respective light modulation units. Alternatively, or additionally, system 3500 may include optical subsystems interposed between optical separation unit 3510 and the respective light modulation units.

In some embodiments, any (or all) of the post-separation branches may include the optical subsystem 117 (in any of its various embodiments) or the optical subsystem 620 (in any of its various embodiments) intervening between the light modulation and the light sensing device of that branch.

Various Embodiments of Systems and Methods

Embodiments of various systems and methods are described in the following numbered paragraphs.

1.1. A system comprising:

a light modulation unit configured to modulate an incident stream of light with a sequence of spatial patterns in order to produce a modulated light stream, wherein the light modulation unit includes an array of light modulating elements;

a plurality of light sensing devices;

an optical subsystem configured to deliver light from each of a plurality of spatial subsets of the modulated light stream onto a respective one of the plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream, wherein the light sensing devices are configured to generate respective electrical signals, wherein each of the electrical signals represents intensity of the respective spatial subset of the modulated light stream as a function of time; and a sampling subsystem configured to acquire samples of the electrical signals, wherein the samples include sample subsets that correspond respectively to the electrical signals, wherein each sample subset includes a plurality of samples of the respective electrical signal.

1.2 The system of paragraph 1.1, wherein each of the sample subsets is usable to construct a respective sub-image of an image, wherein each sub-image represents a respective one of the spatial subsets of the incident light stream.

1.3. The system of paragraph 1.2, wherein N is the number of the light modulating elements, wherein L is the number of the light sensing devices, wherein n is the number of pixels in said image, wherein n is less than or equal to N, wherein the light modulation unit is configured to modulate the incident light stream with the spatial patterns at a maximum rate of $R_P$ spatial patterns per unit time, wherein $m_{SS}$ is the number of samples in each sample subset, wherein a minimum number $m_{n/L}$ of compressive-sensing samples required to reconstruct an n/L-pixel image with given accuracy decreases as L increases, wherein $m_{SS}$ and L are selected so that $m_{SS}$ is greater than or equal to $m_{n/L}$, and $m_{SS}/R_P$ is less than or equal to a target acquisition time.

1.4 The system of paragraph 1.2, wherein N is the number of the light modulating elements, wherein L is the number of the light sensing devices, wherein n is the number of pixels in said image, wherein n is less than or equal to N, wherein each sample subset is usable to construct the respective sub-image with n/L pixels, wherein the sampling subsystem is configured so that the number of samples in each sample subset is dynamically programmable to allow different tradeoffs between image quality and acquisition time of the samples of the electrical signals.

1.5. The system of paragraph 1.2, further comprising a processing unit configured to operate on each sample subset to construct the respective sub-image.

1.6 The system of paragraph 1.1, wherein the sampling subsystem is configured to acquire the samples of the electrical signals in groups, wherein each of the groups includes at least one sample of each of the electrical signals, wherein each of the groups corresponds to a respective one of the spatial patterns.

1.7. The system of paragraph 1.6, wherein said sampling subsystem is configured to acquire the groups of samples of the electrical signals at a maximum group rate of $R_G$ groups per unit time, wherein $m_{SS}$ is the number of samples in each sample subset, wherein N is the number of the light modulating elements, wherein n is less than or equal to N, wherein L is the number of the light sensing devices, wherein a number $m_{n/L}$ of the compressive sensing samples required to reconstruct an n/L-pixel image decreases as L increases, wherein L is selected so that $m_{SS}$ is greater than or equal to $m_{n/L}$, and, $m_{SS}/R_G$ is less than or equal to a target acquisition time.

1.8. The system of paragraph 1.1, wherein the sampling subsystem includes a plurality of analog-to-digital converters (ADCs), wherein each of the ADCs is configured to acquire the samples of the electrical signal generated by a respective one of the light sensing devices.

1.9. The system of paragraph 1.8, wherein at least a first and a second of the ADCs have different bit resolutions.

1.10. The system of paragraph 1.1, wherein the optical subsystem includes a plurality of lenses, wherein each of the lenses is configured to direct the light from a respective one of the spatial subsets of the modulated light stream onto a light sensing surface of a respective one of the light sensing devices.

1.11. The system of paragraph 1.1, wherein the optical subsystem includes a fiber coupling device and a plurality of fiber bundles, wherein the fiber coupling device is configured to couple the light from each of the spatial subsets of the modulated light stream onto a respective one of the fiber bundles.

1.12. The system of paragraph 1.1, wherein the optical subsystem includes a plurality of light pipes whose internal surfaces are reflective.

1.13. The system of paragraph 1.1, wherein the optical subsystem includes a focusing lens, wherein the plurality of light sensing devices are located at an image plane of the focusing lens.

1.14.The system of paragraph 1.1, wherein the subsets of the array of the light modulating elements are contiguous subsets.

1.15. The system of paragraph 1.1, wherein at least a first and a second of the light sensing devices have different light sensitivities.

1.16. The system of paragraph 1.1, wherein the plurality of light sensing devices are arranged in an array.

1.17 The system of paragraph 1.16, wherein the array is a two-dimensional rectangular array, wherein the sampling subsystem includes one analog-to-digital converter per column of the array.

1.18. The system of paragraph 1.1, wherein the plurality of light sensing devices are incorporated into a first integrated circuit.

1.19. The system of paragraph 1.18, wherein the sampling subsystem includes a readout integrated circuit, wherein the readout integrated circuit is coupled to the first integrated circuit.

1.20. The system of paragraph 1.19, wherein the readout integrated circuit is bump bonded to the first integrated circuit.

1.21. A method comprising:

modulating an incident stream of light with a sequence of spatial patterns in order to produce a modulated light stream, where said modulating is performed by an array of light modulating elements;

delivering light from each of a plurality of spatial subsets of the modulated light stream onto a respective one of a plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream;

generating electrical signals, wherein each of the electrical signals is generated by a respective one of the light sensing devices, wherein each of the electrical signals represents intensity of a respective one of the spatial subsets of the modulated light stream as a function of time; and acquiring samples of the electrical signals, wherein the samples include sample subsets that correspond respectively to the electrical signals, wherein each sample subset includes a plurality of samples of the respective electrical signal.

1.22 The method of paragraph 1.21, wherein each of the sample subsets is usable to construct a respective sub-image of an image, wherein each sub-image represents a respective one of the spatial subsets of the incident light stream.

1.23. The method of paragraph 1.22, wherein N is the number of the light modulating elements, wherein L is the number of the light sensing devices, wherein n is the number of pixels in said image, wherein n is less than or equal to N, wherein the incident light stream is modulated with the spatial patterns at a maximum rate of $R_P$ spatial patterns per unit time, wherein $m_{SS}$ is the number of samples in each sample subset, wherein a minimum number $m_{n/L}$ of compressive-sensing samples required to reconstruct an n/L-pixel image with given accuracy decreases as L increases, wherein $m_{SS}$ and L are selected so that $m_{SS}$ is greater than or equal to $m_{n/L}$, and $m_{SS}/R_P$ is less than or equal to a target acquisition time.

1.24 The method of paragraph 1.21, further comprising: operating on the sample subsets to construct the respective sub-images.

1.25 The method of paragraph 1.21, further comprising: transmitting the sample subsets to a receiver through a communication channel.

1.26 The method of paragraph 1.21, wherein said acquiring the samples of the electrical signals includes acquiring the samples in groups, wherein each of the groups includes at least one sample of each of the electrical signals, wherein each of the groups corresponds to a respective one of the spatial patterns.

1.27. The method of paragraph 1.26, wherein the groups are acquired at a rate of $R_G$ groups per unit time, wherein N is the number of the light modulating elements, wherein n is less than or equal to N, wherein L is the number of the light sensing devices, wherein $m_{SS}$ is the number of samples in each sample subset, wherein a number $m_{n/L}$ of the compressive sensing samples required to reconstruct an n/L-pixel image decreases as L increases, wherein L is selected so that $m_{SS}$ is greater than or equal to $m_{n/L}$, and, $m_{SS}/R_G$ is less than or equal to a target acquisition time.

2.1. A system comprising:
a light modulation unit configured to modulate an incident stream of light with a sequence of spatial patterns in order to produce a modulated light stream, wherein the light modulation unit includes an array of light modulating elements;
a plurality of light sensing devices;
an optical subsystem configured to direct spatial subsets of the modulated light stream to respective ones of the light sensing devices, wherein the spatial subsets of the modulated light stream are produced by respective non-overlapping regions of the array of light modulating elements, wherein each region of the array of light modulating elements produces the respective spatial subset of the modulated light stream by modulating a respective spatial subset of the incident light stream, wherein each of the light sensing devices is configured to generate a respective electrical signal that represents intensity of the respective spatial subset of the modulated light stream as a function of time;
a plurality of analog-to-digital converters (ADCs), wherein each of the ADCs is configured to capture a respective sequence of samples of the electrical signal generated by a respective one of the light sensing devices, wherein the sequence of samples captured by each of the ADCs is usable to construct a respective sub-image that represents the corresponding spatial subset of the incident light stream.

2.2. The system of paragraph 2.1, wherein the optical subsystem includes a plurality of lenses, wherein each of the lenses is configured to direct a respective one of the spatial subsets of the modulated light stream onto a light sensing surface of a respective one of the light sensing devices.

2.3. The system of paragraph 2.1, wherein the optical subsystem includes a fiber coupling device and a plurality of fiber bundles, wherein the fiber coupling device is configured to couple light from each of the spatial portions of the modulated light stream onto a respective one of the fiber bundles, wherein each of the fiber bundles is configured to deliver the light from the respective spatial subset of the modulated light stream onto a light sensing surface of a respective one of the light sensing devices.

2.4. The system of paragraph 2.1, wherein the plurality of light sensing devices are incorporated into a single integrated circuit.

2.5. The system of paragraph 2.1, wherein the optical subsystem includes a focusing lens, wherein the plurality of light sensing devices are located at an image plane of the focusing lens.

2.6. The system of paragraph 2.1, wherein the plurality of ADCs are configured to capture their respective sample sequences synchronously.

2.7. The system of paragraph 2.1, wherein the plurality of light sensing devices are arranged in an array.

2.8. The system of paragraph 2.1, wherein each of the sample sequences has a sample size that is smaller than the number of pixels in the respective sub-image.

3.1. A system comprising:
a light modulation unit configured to modulate an incident stream of light with a sequence of spatial patterns in order to produce a modulated light stream, wherein the light modulation unit includes an array of N light modulating elements;
an array of L light sensing elements, wherein L is greater than one but less than N;
an optical subsystem configured to focus light from each of a plurality of spatial portions of the modulated light stream onto a respective one of the array of light sensing elements, wherein the spatial portions of the modulated light stream are produced by respective non-overlapping regions of the array of light modulating elements, wherein each region of the array of light modulating elements produces the respective spatial portion of the modulated light stream by modulating a respective spatial portion of the incident light stream, wherein the L light sensing elements are configured to generate respective electrical signals, wherein each of the electrical signals represents intensity of the respective spatial portion of the modulated light stream as a function of time; and
circuitry configured to read groups of samples from the array of L light sensing elements, wherein each group of samples includes L samples, wherein the L samples of each group include one sample for each of the electrical signals.

3.2. The system of paragraph 3.1, wherein the circuitry is configured to read the groups at a maximum rate of $R_G$ groups per unit time, wherein each of the groups corresponds to a respective one of the spatial patterns, wherein the sequence of spatial patterns is configured so that M of said groups are usable to construct an N-pixel image representing the incident light stream, wherein M is greater than one and less than or equal to N/L.

3.3. The system of paragraph 3.2, wherein L is selected to achieve an acquisition time for the M groups that is less than or equal to a target acquisition time.

3.4. The system of paragraph 3.2, wherein M is less than N/L.

3.5. The system of paragraph 3.1, wherein the circuitry is configured to read the groups at a maximum rate of $R_G$ groups per unit time, wherein each of the groups corresponds to a respective one of the spatial patterns, wherein the sequence of spatial patterns is configured so that subsets of the groups, each subset of groups being M groups in length, are usable to construct respective N-pixel images, wherein M is greater than one and less than or equal to N/L, wherein L is selected so that a rate of acquisition of the group subsets is greater than or equal to a target acquisition rate.

3.6. The system of paragraph 3.1, wherein the circuitry is included in a readout integrated circuit, wherein the array of L light sensing elements are included in a second integrated circuit.

3.7. The system of paragraph 3.6, wherein the readout integrated circuit is bump bonded to the second integrated circuit.

3.8. The system of paragraph 3.1, wherein the circuitry and the light sensing elements are included in a single integrated circuit.

4.1. A computer-implemented method for designing a compressive-imaging device, the method comprising:

utilizing a computer to perform: receiving information specifying a target effective rate $R_I$ of acquisition of N-pixel images for the compressive-imaging device, wherein N is a number of light modulating elements in a light modulation unit to be included in the compressive-imaging device; determining a value for each of variables $R_P$ and L such that $R_P/f(N/L)$ is greater than or equal to the target effective rate $R_I$, wherein $R_P$ is a maximum pattern modulation rate of the light modulation unit, wherein L is a number of light sensing devices to be included in the compressive-imaging device, wherein f is a function that maps a positive integer value v to a corresponding number f(v), wherein f(v) is greater than or equal to a minimum number of compressive sensing samples required to reconstruct a v-pixel image; and storing the determined values of the variables $R_P$ and L in a memory.

4.2 The method of paragraph 4.1, further comprising displaying one or more of the determined values.

4.3. The method of paragraph 4.1, wherein said determining a value for each of the variables $R_P$ and L includes: receiving input specifying the value for the variable $R_P$; and selecting a minimum value of the variable L subject to the condition that $R_P/f(N/L)$ is greater than or equal to rate $R_I$.

4.4. The method of paragraph 4.1, wherein said determining a value for each of the variables $R_P$ and L includes: receiving input specifying the value for the variable L; and selecting a minimum value of the variable $R_P$ subject to the condition that $R_P/f(N/L)$ is greater than or equal to rate $R_I$.

4.5. The method of paragraph 4.1, wherein the function f depends on a selection of a class of spatial patterns to be used by the compressive-imaging device.

4.6. The method of paragraph 4.1, wherein the function f depends on a target accuracy with which the N-pixel images are to be reconstructed.

4.7. The method of paragraph 4.6 further comprising receiving user input specifying the target accuracy.

4.8. The method of paragraph 4.1, further comprising: constructing the compressive-imaging device so that the compressive-imaging device includes: the light modulation unit with the N light modulating elements, and the determined number L of light sensing devices, wherein each of the determined number L of light sensing devices is configured to receive light from a corresponding subset of the N light modulating elements.

5.1. A method for designing a compressive-imaging device, the method comprising:

utilizing a computer to perform: receiving information specifying a target effective rate $R_I$ of acquisition of N-pixel images for the compressive-imaging device, wherein N is a number of light modulating elements in a light modulation unit to be included in the compressive-imaging device; determining a value for each of variables $R_G$ and L such that $R_G/f(N/L)$ is greater than or equal to $R_I$, wherein $R_G$ is a maximum number of sample groups per second to be acquired from an array of L light sensing devices to be included in the compressive-imaging device, wherein each sample group by definition includes one sample from each of the L light sensing devices, wherein f is a function that maps a positive integer value v to a corresponding number f(v), wherein f(v) is greater than or equal to a minimum number of compressive sensing samples required to reconstruct a v-pixel image; and storing the determined values of the variables $R_G$ and L in a memory.

5.2 The method of paragraph 5.1, further comprising displaying one or more of the determined values.

5.3. The method of paragraph 5.1, wherein said determining a value for each of the variables $R_G$ and L includes: receiving input specifying the value for the variable $R_G$; and selecting a minimum value of the variable L subject to the condition that $R_G/f(N/L)$ is greater than or equal to rate $R_I$.

5.4. The method of paragraph 5.1, wherein said determining a value for each of the variables $R_G$ and L includes: receiving input specifying the value for the variable L; and selecting a minimum value of the variable $R_G$ subject to the condition that $R_G/f(N/L)$ is greater than or equal to rate $R_I$.

5.5. The method of paragraph 5.1, wherein the function f depends on a selection of a class of spatial patterns to be used by the compressive-imaging device.

5.6. The method of paragraph 5.1, wherein the function f depends on a target accuracy with which the N-pixel images are to be reconstructed 5.7. The method of paragraph 5.6 further comprising receiving user input specifying the target accuracy.

5.8. The method of paragraph 5.1, further comprising constructing the compressive-imaging device so that the compressive-imaging device includes: the light modulation unit with the N light modulating elements, and the array of L light sensing devices, wherein the value of L agrees with the determined value of L, wherein each of the L light sensing devices is configured to receive light from a corresponding subset of the N light modulating elements.

6.1. A system comprising:

a pre-modulation optical subsystem configured to receive an incident light stream and separate the incident light stream into a plurality of light substreams, wherein the light substreams correspond respectively to non-overlapping regions of the incident light stream;

a plurality of light modulation units configured to respectively modulate the light substreams in order to generate respective modulated light substreams, wherein each of the light modulation units is configured to modulate the respective light substream with a respective sequence of spatial patterns in order to produce the respective modulated light substream, wherein each of the light modulation units includes a respective array of light modulating elements;

a plurality of light sensing devices configured to respectively receive the modulated light substreams and generate respective electrical signals, wherein the electrical signal generated by each light sensing device represents intensity of the respective modulated light substream as a function of time;

a plurality of analog-to-digital converters (ADCs), wherein each of the ADCs is configured to configured to capture a sequence of samples of the electrical signal generated by a respective one of the light sensing devices, wherein the sample sequence captured by each ADC is usable to construct a respective sub-image representing a respective one of the regions of the incident light stream.

6.2 The system of paragraph 6.1, further comprising: a plurality of post-modulation optical subsystems configured to direct light from respective ones of the modulated light substreams onto respective ones of the light sensing devices.

6.3 The system of paragraph 6.1, wherein a number of the samples in each sample sequence is smaller than a number of pixels in the respective sub-image.

6.4 The system of paragraph 6.1, wherein the pre-modulation optical subsystem includes one or more mirrors.

6.6 The system of paragraph 6.1, wherein the pre-modulation optical subsystem includes a beam splitter.

6.7 The system of paragraph 6.1, wherein the pre-modulation optical subsystem includes an optical device having a plurality of facets.

6.8 The system of paragraph 6.1, wherein the sequences of spatial patterns are identical sequences.

6.9 The system of paragraph 6.1, wherein each of the regions of the incident light stream is a contiguous region.

6.10. A method comprising:

separating an incident light stream into a plurality of light substreams, wherein the light substreams correspond respectively to non-overlapping regions of the incident light stream;

modulating the light substreams in order to produce respective modulated light substreams, wherein each of the light substreams is modulated by a respective one of a plurality of light modulation units, wherein said modulating the light substreams includes modulating each of the light substreams with a respective sequence of spatial patterns in order to produce the respective modulated light substream;

directing light from each of the modulated light substreams onto a respective one of a plurality of light sensing devices;

generating electrical signals, wherein each of the electrical signals is generated by a respective one of the light sensing devices, wherein the electrical signal generated by each light sensing device represents intensity of the respective modulated light stream as a function of time; and acquiring from each of the light sensing devices a respective sequence of samples of the respective electrical signal, wherein each sample sequence is usable to construct a respective sub-image representing a respective one of the regions of the incident light stream.

Computer System 3600

Figure 36:
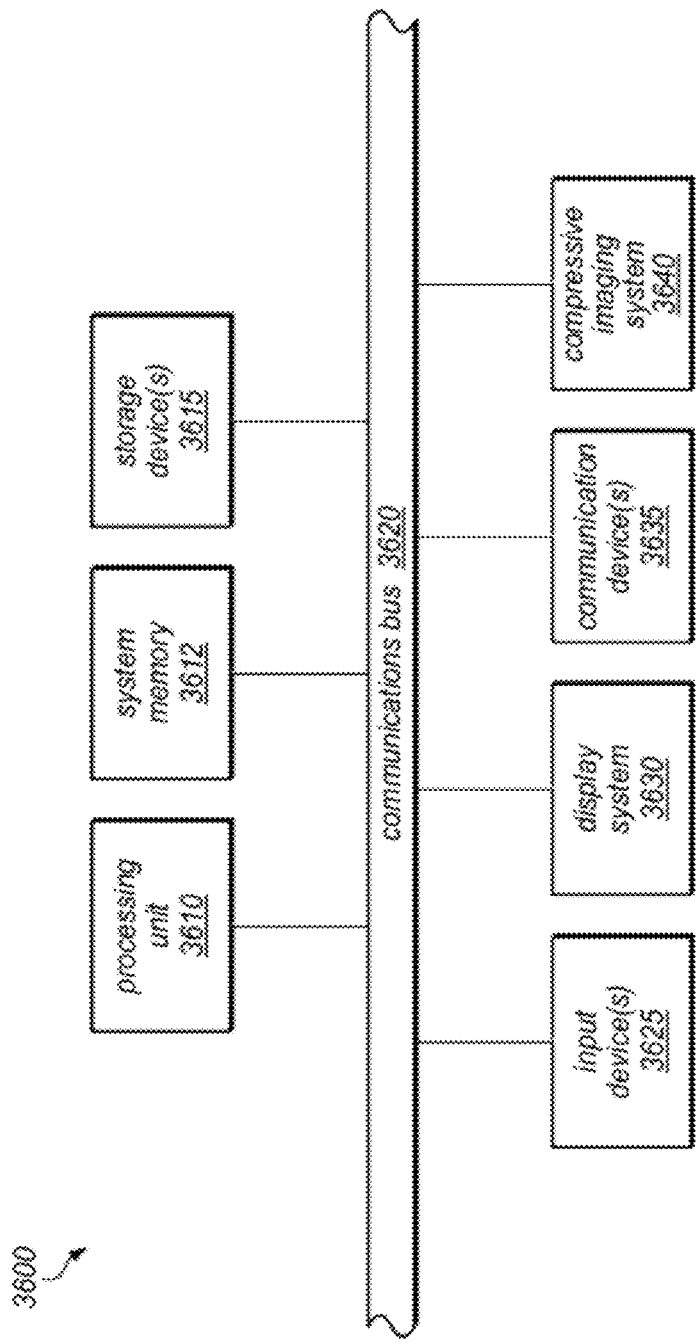
FIG. 36 illustrates one embodiment of a computer system 3600 configured to execute computer programs, e.g., programs implementing any of the various methods described herein.

FIG. 36 illustrates one embodiment of a computer system 3600 that may be used to perform any of the method embodiments described herein, or, any combination of the method embodiments described herein, or any subset of any of the method embodiments described herein, or, any combination of such subsets.

Computer system 3600 may include a processing unit 3610, a system memory 3612, a set 3615 of one or more storage devices, a communication bus 3620, a set 3625 of input devices, and a display system 3630.

System memory 3612 may include a set of semiconductor devices such as RAM devices (and perhaps also a set of ROM devices).

Storage devices 3615 may include any of various storage devices such as one or more memory media and/or memory access devices. For example, storage devices 3615 may include devices such as a CD/DVD-ROM drive, a hard disk, a magnetic disk drive, magnetic tape drives, etc.

Processing unit 3610 is configured to read and execute program instructions, e.g., program instructions stored in system memory 3612 and/or on one or more of the storage devices 3615. Processing unit 3610 may couple to system memory 3612 through communication bus 3620 (or through a system of interconnected busses). The program instructions configure the computer system 3600 to implement a method, e.g., any of the method embodiments described herein, or, any combination of the method embodiments described herein, or, any subset of any of the method embodiments described herein, or, any combination of such subsets.

Processing unit 3610 may include one or more processors (e.g., microprocessors).

One or more users may supply input to the computer system 3600 through the input devices 3625. Input devices 3625 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof The display system 3630 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 3600 may include other devices, e.g., devices such as one or more graphics accelerators, one or more speakers, a sound card, a video camera and a video card.

In some embodiments, computer system 3600 may include one or more communication devices 3635, e.g., a network interface card for interfacing with a computer network.

The computer system may be configured with a software infrastructure including an operating system, one or more compilers for one or more corresponding programming languages, and perhaps also one or more graphics APIs (such as OpenGL®, Direct3D, Java 3D™). Any or all of the compilers may be configured to perform expression rearrangement according to any or all of the method embodiments described herein.

In some embodiments, the computer system 3600 may be configured for coupling to a compressive imaging system 3640, e.g., any of the various system embodiments described herein. Computer system 3600 may be configured to receive samples from the compressive imaging system and operate on the samples to produce images.

Any of the various embodiments described herein may be combined to form composite embodiments. Furthermore, any of the various embodiments described in U.S. Provisional Application No. 61/372,826, U.S. application Ser. No. 13/193,553 and U.S. application Ser. No. 13/193,556 may be combined with any of the various embodiments described herein to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a light modulation unit configured to modulate an incident stream of light with a sequence of spatial patterns in order to produce a modulated light stream, wherein the light modulation unit includes an array of light modulating elements;
a plurality of light sensing devices;
an optical subsystem configured to deliver light from each of a plurality of spatial subsets of the modulated light stream onto a respective one of the plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream, wherein the light sensing devices are configured to generate respective electrical signals, wherein each of the electrical signals represents intensity of the respective spatial subset of the modulated light stream as a function of time; and a sampling subsystem configured to acquire samples of the electrical signals, wherein the samples include sample subsets that correspond respectively to the electrical signals, wherein each sample subset includes a plurality of samples of the respective electrical signal;

wherein the sampling subsystem is configured to acquire the samples of the electrical signals in groups, wherein each of the groups includes at least one sample of each of the electrical signals, wherein each of the groups corresponds to a respective one of the spatial patterns;

wherein said sampling subsystem is configured to acquire the groups of samples of the electrical signals at a maximum group rate of $R_G$ groups per unit time, wherein $m_{SS}$ is the number of samples in each sample subset, wherein N is the number of the light modulating elements, wherein n is less than or equal to N, wherein L is the number of the light sensing devices, wherein a number $m_{n/L}$ of the compressive sensing samples required to reconstruct an n/L-pixel image decreases as L increases, wherein L is selected so that $m_{SS}$ is greater than or equal to $m_{n/L}$, and, $m_{SS}/R_G$ is less than or equal to a target acquisition time.

2. The system of claim 1, further comprising a processing unit configured to operate on each sample subset to construct the respective sub-image.

3. The system of claim 1, wherein the sampling subsystem includes a plurality of analog-to-digital converters (ADCs), wherein each of the ADCs is configured to acquire the samples of the electrical signal generated by a respective one of the light sensing devices.

4. The system of claim 3, wherein at least a first and a second of the ADCs have different bit resolutions.

5. The system of claim 1, wherein the optical subsystem includes a plurality of lenses, wherein each of the lenses is configured to direct the light from a respective one of the spatial subsets of the modulated light stream onto a light sensing surface of a respective one of the light sensing devices.

6. The system of claim 1, wherein the optical subsystem includes a fiber coupling device and a plurality of fiber bundles, wherein the fiber coupling device is configured to couple the light from each of the spatial subsets of the modulated light stream onto a respective one of the fiber bundles.

7. The system of claim 1, wherein the optical subsystem includes a plurality of light pipes whose internal surfaces are reflective.

8. The system of claim 1, wherein the optical subsystem includes a focusing lens, wherein the plurality of light sensing devices are located at an image plane of the focusing lens.

9. The system of claim 1, wherein the subsets of the array of the light modulating elements are contiguous subsets.

10. The system of claim 1, wherein at least a first and a second of the light sensing devices have different light sensitivities.

11. The system of claim 1, wherein the plurality of light sensing devices are arranged in an array.

12. The system of claim 11, wherein the array is a two-dimensional rectangular array, wherein the sampling subsystem includes one analog-to-digital converter per column of the array.

13. The system of claim 1, wherein the plurality of light sensing devices are incorporated into a first integrated circuit.

14. The system of claim 13, wherein the sampling subsystem includes a readout integrated circuit, wherein the readout integrated circuit is coupled to the first integrated circuit.

15. The system of claim 14, wherein the readout integrated circuit is bump bonded to the first integrated circuit.

16. A method comprising:
modulating an incident stream of light with a sequence of spatial patterns in order to produce a modulated light stream, where said modulating is performed by an array of light modulating elements;

delivering light from each of a plurality of spatial subsets of the modulated light stream onto a respective one of a plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream;

generating electrical signals, wherein each of the electrical signals is generated by a respective one of the light sensing devices, wherein each of the electrical signals represents intensity of a respective one of the spatial subsets of the modulated light stream as a function of time; and acquiring samples of the electrical signals, wherein the samples include sample subsets that correspond respectively to the electrical signals, wherein each sample subset includes a plurality of samples of the respective electrical signal;

wherein said acquiring the samples of the electrical signals includes acquiring the samples in groups, wherein each of the groups includes at least one sample of each of the electrical signals, wherein each of the groups corresponds to a respective one of the spatial patterns;

wherein the groups are acquired at a rate of $R_G$ groups per unit time, wherein N is the number of the light modulating elements, wherein n is less than or equal to N, wherein L is the number of the light sensing devices, wherein $m_{SS}$ is the number of samples in each sample subset, wherein a number $m_{n/L}$ of the compressive sensing samples required to reconstruct an n/L-pixel image decreases as L increases, wherein L is selected so that $m_{SS}$ is greater than or equal to $m_{n/L}$, and, $m_{SS}/R_G$ is less than or equal to a target acquisition time.

17. The method of claim 16, further comprising:
operating on the sample subsets to construct the respective sub-images.

18. The method of claim 16, further comprising:
transmitting the sample subsets to a receiver through a communication channel.

19. A system comprising:
a light modulation unit configured to modulate an incident stream of light with a sequence of spatial patterns in order to produce a modulated light stream, wherein the light modulation unit includes an array of light modulating elements;

a plurality of light sensing devices;

an optical subsystem configured to direct spatial subsets of the modulated light stream to respective ones of the light sensing devices, wherein the spatial subsets of the modulated light stream are produced by respective non-overlapping regions of the array of light modulating elements, wherein each region of the array of light modulating elements produces the respective spatial subset of the modulated light stream by modulating a respective spatial subset of the incident light stream, wherein each of the light sensing devices is configured to generate a respective electrical signal that represents intensity of the respective spatial subset of the modulated light stream as a function of time;

a plurality of analog-to-digital converters (ADCs), wherein each of the ADCs is configured to capture a respective sequence of samples of the electrical signal generated by a respective one of the light sensing devices, wherein the sequence of samples captured by each of the ADCs is usable to construct a respective sub-image that represents the corresponding spatial subset of the incident light stream;

wherein the plurality of ADCs is configured to acquire the samples of the electrical signals in groups, wherein each of the groups includes at least one sample of each of the electrical signals, wherein each of the groups corresponds to a respective one of the spatial patterns;

wherein the plurality of ADCs is configured to acquire the groups of samples of the electrical signals at a maximum group rate of $R_G$ groups per unit time, wherein $m_{SS}$ is the number of samples in each sequence of samples, wherein N is the number of the light modulating elements, wherein n is less than or equal to N, wherein L is the number of the light sensing devices, wherein a number $m_{n/L}$ of compressive sensing samples required to reconstruct an n/L-pixel image decreases as L increases, wherein L is selected so that $m_{SS}$ is greater than or equal to $m_{n/L}$, and, $m_{SS}/R_G$ is less than or equal to a target acquisition time.

20. The system of claim 19, wherein the optical subsystem includes a plurality of lenses, wherein each of the lenses is configured to direct a respective one of the spatial subsets of the modulated light stream onto a light sensing surface of a respective one of the light sensing devices.

21. The system of claim 19, wherein the optical subsystem includes a fiber coupling device and a plurality of fiber bundles, wherein the fiber coupling device is configured to couple light from each of the spatial portions of the modulated light stream onto a respective one of the fiber bundles, wherein each of the fiber bundles is configured to deliver the light from the respective spatial subset of the modulated light stream onto a light sensing surface of a respective one of the light sensing devices.

22. The system of claim 19, wherein the plurality of light sensing devices are incorporated into a single integrated circuit.

23. The system of claim 19, wherein the optical subsystem includes a focusing lens, wherein the plurality of light sensing devices are located at an image plane of the focusing lens.

24. The system of claim 19, wherein the plurality of ADCs are configured to capture their respective sample sequences synchronously.

25. The system of claim 19, wherein the plurality of light sensing devices are arranged in an array.

26. The system of claim 19, wherein each of the sample sequences has a sample size that is smaller than the number of pixels in the respective sub-image.

27. A system comprising:

a light modulation unit configured to modulate an incident stream of light with a sequence of spatial patterns in order to produce a modulated light stream, wherein the light modulation unit includes an array of N light modulating elements;

an array of L light sensing elements, wherein L is greater than one but less than N;

an optical subsystem configured to focus light from each of a plurality of spatial portions of the modulated light stream onto a respective one of the array of light sensing elements, wherein the spatial portions of the modulated light stream are produced by respective non-overlapping regions of the array of light modulating elements, wherein each region of the array of light modulating elements produces the respective spatial portion of the modulated light stream by modulating a respective spatial portion of the incident light stream, wherein the L light sensing elements are configured to generate respective electrical signals, wherein each of the electrical signals represents intensity of the respective spatial portion of the modulated light stream as a function of time; and circuitry configured to read groups of samples from the array of L light sensing elements, wherein each group of samples includes L samples, wherein the L samples of each group include one sample for each of the electrical signals;

wherein the circuitry is configured to read the groups at a maximum rate of $R_G$ groups per unit time, wherein each of the groups corresponds to a respective one of the spatial patterns, wherein the sequence of spatial patterns is configured so that subsets of the groups, each subset of groups being M groups in length, are usable to construct respective N-pixel images, wherein M is greater than one and less than or equal to N/L, wherein L is selected so that a rate of acquisition of the group subsets is greater than or equal to a target acquisition rate.

28. The system of claim 27, wherein the circuitry is included in a readout integrated circuit, wherein the array of L light sensing elements are included in a second integrated circuit.

29. The system of claim 28, wherein the readout integrated circuit is bump bonded to the second integrated circuit.

30. The system of claim 27, wherein the circuitry and the light sensing elements are included in a single integrated circuit.

31. A system comprising:

a light modulation unit configured to modulate an incident stream of light with a sequence of spatial patterns in order to produce a modulated light stream, wherein the light modulation unit includes an array of light modulating elements;

a plurality of light sensing devices;

an optical subsystem configured to deliver light from each of a plurality of spatial subsets of the modulated light stream onto a respective one of the plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream, wherein the light sensing devices are configured to generate respective electrical signals, wherein each of the electrical signals represents intensity of the respective spatial subset of the modulated light stream as a function of time; and a sampling subsystem configured to acquire samples of the electrical signals, wherein the samples include sample subsets that correspond respectively to the electrical signals, wherein each sample subset includes a plurality of samples of the respective electrical signal;

wherein each of the sample subsets is usable to construct a respective sub-image of an image, wherein each sub-image represents a respective one of the spatial subsets of the incident light stream;

wherein N is the number of the light modulating elements, wherein L is the number of the light sensing devices, wherein n is the number of pixels in said image, wherein n is less than or equal to N, wherein the light modulation unit is configured to modulate the incident light stream with the spatial patterns at a maximum rate of $R_P$ spatial patterns per unit time, wherein $m_{SS}$ is the number of samples in each sample subset, wherein a minimum number $m_{n/L}$ of compressive-sensing samples required to reconstruct an n/L-pixel image with given accuracy decreases as L increases, wherein $m_{SS}$ and L are selected so that $m_{SS}$ is greater than or equal to $m_{n/L}$, and $m_{SS}/R_P$ is less than or equal to a target acquisition time.

32. A system comprising:

a light modulation unit configured to modulate an incident stream of light with a sequence of spatial patterns in order to produce a modulated light stream, wherein the light modulation unit includes an array of light modulating elements;

a plurality of light sensing devices;

an optical subsystem configured to deliver light from each of a plurality of spatial subsets of the modulated light stream onto a respective one of the plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream, wherein the light sensing devices are configured to generate respective electrical signals, wherein each of the electrical signals represents intensity of the respective spatial subset of the modulated light stream as a function of time; and a sampling subsystem configured to acquire samples of the electrical signals, wherein the samples include sample subsets that correspond respectively to the electrical signals, wherein each sample subset includes a plurality of samples of the respective electrical signal;

wherein each of the sample subsets is usable to construct a respective sub-image of an image, wherein each sub-image represents a respective one of the spatial subsets of the incident light stream;

wherein N is the number of the light modulating elements, wherein L is the number of the light sensing devices, wherein n is the number of pixels in said image, wherein n is less than or equal to N, wherein each sample subset is usable to construct the respective sub-image with n/L pixels, wherein the sampling subsystem is configured so that the number of samples in each sample subset is dynamically programmable to allow different tradeoffs between image quality and acquisition time of the samples of the electrical signals.

33. A method comprising:

modulating an incident stream of light with a sequence of spatial patterns in order to produce a modulated light stream, where said modulating is performed by an array of light modulating elements;

delivering light from each of a plurality of spatial subsets of the modulated light stream onto a respective one of a plurality of light sensing devices, wherein the spatial subsets of the modulated light stream are produced by respective subsets of the array of light modulating elements, wherein each subset of the array of light modulating elements produces the respective spatial subset of the modulated light stream by modulating a respective spatial subset of the incident light stream;

generating electrical signals, wherein each of the electrical signals is generated by a respective one of the light sensing devices, wherein each of the electrical signals represents intensity of a respective one of the spatial subsets of the modulated light stream as a function of time; and acquiring samples of the electrical signals, wherein the samples include sample subsets that correspond respectively to the electrical signals, wherein each sample subset includes a plurality of samples of the respective electrical signal;

wherein each of the sample subsets is usable to construct a respective sub-image of an image, wherein each sub-image represents a respective one of the spatial subsets of the incident light stream;

wherein N is the number of the light modulating elements, wherein L is the number of the light sensing devices, wherein n is the number of pixels in said image, wherein n is less than or equal to N, wherein the incident light stream is modulated with the spatial patterns at a maximum rate of $R_P$ spatial patterns per unit time, wherein $m_{SS}$ is the number of samples in each sample subset, wherein a minimum number $m_{n/L}$ of compressive-sensing samples required to reconstruct an n/L-pixel image with given accuracy decreases as L increases, wherein $m_{SS}$ and L are selected so that $m_{SS}$ is greater than or equal to $m_{n/L}$, and $m_{SS}/R_P$ is less than or equal to a target acquisition time.

34. A system comprising:

a light modulation unit configured to modulate an incident stream of light with a sequence of spatial patterns in order to produce a modulated light stream, wherein the light modulation unit includes an array of N light modulating elements;

an array of L light sensing elements, wherein L is greater than one but less than N;

an optical subsystem configured to focus light from each of a plurality of spatial portions of the modulated light stream onto a respective one of the array of light sensing elements, wherein the spatial portions of the modulated light stream are produced by respective non-overlapping regions of the array of light modulating elements, wherein each region of the array of light modulating elements produces the respective spatial portion of the modulated light stream by modulating a respective spatial portion of the incident light stream, wherein the L light sensing elements are configured to generate respective electrical signals, wherein each of the electrical signals represents intensity of the respective spatial portion of the modulated light stream as a function of time; and circuitry configured to read groups of samples from the array of L light sensing elements, wherein each group of samples includes L samples, wherein the L samples of each group include one sample for each of the electrical signals;

wherein the circuitry is configured to read the groups at a maximum rate of $R_G$ groups per unit time, wherein each of the groups corresponds to a respective one of the spatial patterns, wherein the sequence of spatial patterns is configured so that M of said groups are usable to construct an N-pixel image representing the incident light stream, wherein M is greater than one and less than or equal to N/L.

35. The system of claim 34, wherein L is selected to achieve an acquisition time for the M groups that is less than or equal to a target acquisition time.

36. The system of claim 34, wherein M is less than N/L.

* * * * *